(12) United States Patent
Liu et al.

(10) Patent No.: US 10,554,367 B2
(45) Date of Patent: Feb. 4, 2020

(54) NARROWBAND UPLINK RESOURCE CONFIGURATION

(71) Applicant: ZTE Corporation, Shenzhen, Guangdong (CN)

(72) Inventors: Kun Liu, Guangdong (CN); Bo Dai, Guangdong (CN); Zhaohua Lu, Guangdong (CN); Xianming Chen, Guangdong (CN); Weiwei Yang, Guangdong (CN); Huiying Fang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 24 days.

(21) Appl. No.: 15/872,944

(22) Filed: Jan. 16, 2018

(65) Prior Publication Data

US 2018/0145814 A1 May 24, 2018

Related U.S. Application Data

(63) Continuation of application No. PCT/CN2017/084008, filed on May 11, 2017.

(30) Foreign Application Priority Data

May 13, 2016 (CN) .......................... 2016 1 0322408

(51) Int. Cl.
*H04L 5/00* (2006.01)
*H04W 28/02* (2009.01)
(Continued)

(52) U.S. Cl.
CPC ....... *H04L 5/0053* (2013.01); *H04W 28/0289* (2013.01); *H04W 28/16* (2013.01);
(Continued)

(58) Field of Classification Search
CPC ..... H04L 5/0053; H04L 5/003; H04L 5/0037; H04L 5/0044; H04W 28/0289;
(Continued)

(56) References Cited

U.S. PATENT DOCUMENTS

2012/0230302 A1 9/2012 Calcev et al.
2012/0275305 A1 11/2012 Lin
(Continued)

FOREIGN PATENT DOCUMENTS

CN 104488206 A 4/2015
CN 105122673 A 12/2015

OTHER PUBLICATIONS

3GPP, Alcatel-Lucent, Alcatel-Lucent Shanghai Bell, "Simultaneous transmissions of RACH and PUCCH/PUSCH/SRS," TSG-RAN WG2 #76, San Francisco, California, USA, R2-116184, 4 pages, Nov. 2011.
(Continued)

*Primary Examiner* — Ricky Q Ngo
*Assistant Examiner* — Stephen N Steiner
(74) *Attorney, Agent, or Firm* — Perkins Coie LLP

(57) ABSTRACT

The present document provides a method, an apparatus and a base station for resource configuration. The method includes: performing, when resources for a first type of channel allocated to a first terminal and resources for a second type of channel allocated to a second terminal satisfy a specified condition, a time-domain position of a first resource among the resources for the second type of channel is postponed. In one aspect, the problem of avoiding collision occurring between channel resources configured for different terminals in the related art can be solved, thereby avoiding collisions of channel resources and improving the communication efficiency.

15 Claims, 36 Drawing Sheets

(51) Int. Cl.
  *H04W 28/16* (2009.01)
  *H04W 72/12* (2009.01)
  *H04W 74/08* (2009.01)
  *H04W 72/04* (2009.01)

(52) U.S. Cl.
  CPC ..... *H04W 72/1205* (2013.01); *H04W 74/085* (2013.01); *H04W 72/0446* (2013.01); *H04W 72/0453* (2013.01)

(58) Field of Classification Search
  CPC ............. H04W 28/16; H04W 72/1205; H04W 72/1268; H04W 74/085
  See application file for complete search history.

(56) References Cited

U.S. PATENT DOCUMENTS

2014/0023004 A1   1/2014   Kumar et al.
2017/0188352 A1*  6/2017   Lee .......................... H04L 1/18
2018/0115983 A1*  4/2018   Harada .................... H04J 11/00
2018/0219663 A1*  8/2018   Lin ....................... H04L 5/0053

OTHER PUBLICATIONS

European Search Report dated Feb. 1, 2019 for European Application No. 17795594.5, filed on May 11, 2017 (9 pages).
International Search Report and Written Opinion dated Jul. 31, 2017 for International Application No. PCT/CN2017/084008, filed on May 11, 2017 (16 pages).
Japanese Office Action dated Sep. 24, 2019 for Japanese Patent Application No. 2018-559997, filed May 11, 2017 (7 pages).
Catt, "The collision between measurement gap and HARQ feedback in ACK/NACK repetition," 3GPP TSG-RAN WG2#64bis, Ljubljana, Slovenia, R2-090417, 8 pages, Jan. 2009.
Wi Rapporteur (Ericsson), "RAN1 agreements for Rel-13 NB-IoT," 3GPP TSG-RAN WG1 Meeting #84bis, Susan, Korea, R1-163943, 28 pages, Apr. 2016.

* cited by examiner

NARROWBAND UPLINK RESOURCE CONFIGURATION

CROSS REFERENCE TO RELATED APPLICATIONS

This patent document is a continuation of and claims priority to International Patent Application No. PCT/CN2017/084008, filed on May 11, 2017, which claims the benefit of priority of Chinese Patent Application No. 201610322408.X, filed on May 13, 2016. The entire contents of the before-mentioned patent applications are incorporated by reference as part of the disclosure of this document.

TECHNICAL FIELD

The present disclosure relates to communication technology, and more particularly, to a method and an apparatus for resource configuration, and to a base station.

BACKGROUND

User Equipment (UE) (MTC UE) for Machine Type Communication (MTC) also referred to as Machine to Machine (M2M) user communication device, is currently a main form of application of Internet of Things (IoT). In the 3rd Generation Partnership Project (3GPP) Technical Report (TR) 45.820 V200, several techniques suitable for Cellular IoT are disclosed, among which a NB-IoT technique is a most attractive one.

Considering that a huge number of user communication devices will be supported in the IoT, a lot of types of terminals shall be supported, such as a terminal that only supports single sub-carrier baseband processing capability and a terminal that supports multiple sub-carrier baseband processing capability. If physical channel resources configured for different terminals come into collision, the Narrowband Internet of Things (NB-IoT) implementations need a feasible solution to address the collision issue.

In the related art, there is currently no feasible solution to the problem associated with avoiding the collision between channel resources configured for different terminals.

SUMMARY

The embodiments of the present disclosure provide a method and an apparatus for resource configuration and a base station, capable of solving at least the problem associated with collision between channel resources configured for different terminals in the related art.

According to an aspect of the embodiments of the present disclosure, a method for resource configuration is provided. The method includes: postponing a time-domain position of a first resource among resources for a second type of channel allocated to a second terminal, wherein the resources for the second type of channel and resources for a first type of channel allocated to a first terminal satisfy a specified condition.

Optionally, the first type of channel includes a random access channel; and/or the second type of channel comprises one of: an uplink data channel, an uplink traffic channel, an uplink control channel, a channel carrying a Hybrid Automatic Repeat reQuest (HARQ) response message, and a sounding channel.

Optionally, a transmission gap, Gap 1, for the first type of channel is configured in transmission on the first type of channel when the first type of channel is a random access channel. A number, R1, of repetitive transmissions of a random access signal transmitted on the random access channel is configured to be larger than or equal to a first threshold, R1set.

Optionally, R1set has a value determined by at least one of the following: using a default configuration for R1set; using a default configuration for R1set and selecting the value of R1set from a set of values of R1; configuring the value of R1set via signaling; configuring the value of R1set via signaling and selecting the value of R1set from a set of values of R1; setting R1set as a maximum integer satisfying a condition that T_Unit1*R1set is smaller than or equal to a second threshold T1 set, where T_Unit 1 is a time length corresponding to one transmission of the random access signal, wherein a default configuration is used for T1 set; or T1 set has a value configured via signaling; and selecting the value of R1set from the set of values of R1, and setting R1set as a maximum value in the set of values of R1 that satisfies a condition that T_Unit1*R1set is smaller than or equal to T1 set, where T_Unit1 is a time length corresponding to one transmission of the random access signal, wherein a default configuration is used for T1 set; or T1 set has a value configured via signaling.

Optionally, the specified condition comprises at least one of: the resources for the first type of channel and the resources for the second type of channel having an overlapping area; time-domain positions at which the resources for the first type of channel are located and time-domain positions at which the resources for the second type of channel are located overlapping or partially overlapping, and a frequency-domain position at which the resources for the first type of channel are located being contained in a frequency-domain position at which the resources for the second type of channel are located; the time-domain positions at which the resources for the first type of channel are located and the time-domain positions at which the resources for the second type of channel are located overlapping or partially overlapping, and a gap between the frequency-domain position at which the resources for the first type of channel are located being contained in the frequency-domain position at which the resources for the second type of channel are located being smaller than or equal to A Hz, where A is larger than 0; a ratio of an overlapping portion between the resources for the first type of channel and the resources for the second type of channel to a frequency-domain bandwidth of the second type of channel being larger than or equal to c %, where c % has a value configured by default or via signaling; and a ratio of a length of a time-domain overlapping area between the resources for the first type of channel and the resources for the second type of channel to a time-domain length of the resources for the second type of channel being larger than or equal to d %; wherein the length of the time-domain overlapping area equals to a number, W1, of a first metric unit; or the length of the time-domain overlapping area equals to a number, W2, of a time-domain length of resources occupied by one transmission of the second type of channel, each of W1 and W2 is an integer larger than 0, and d is larger than 0.

Optionally, A is a number, m, of a sub-carrier spacing, S1, of the first type of channel, where m is larger than 0.

Optionally, m is configured to be 1 or 2 by default; or m has a value configured via signaling and selected from {0, 1, 2, 3}, or from {0, 1, 2, 4}, or from {1, 2, 3, 4}.

Optionally, S1=3.75 kHz.

Optionally, A is a number, n, of a sub-carrier spacing S2 of the second type of channel, where n is larger than 0.

Optionally, n is configured to be 1 or 2 by default; or n has a value configured via signaling and selected from {0, 1, 2, 3}, or from {0, 1, 2, 4}, or from {1, 2, 3, 4}.

Optionally, S2=3.75 kHz.

Optionally, n is configured to be 1 or 2 by default; or n has a value configured via signaling and selected from {0, 1}, or from {1, 2}.

Optionally, S2=15 kHz.

Optionally, the delay process is performed on the time-domain position at which the first resource among the resources for the second type of channel is located by: setting start time of a postponed time-domain position at which the first resource among the resources for the second type of channel is located to be Start2, and Start2=m+k, where m is a first metric unit at which end time, End1, of transmission of the first type of channel is located or an index of the first metric unit, and k is an integer.

Optionally, when the first type of channel is a random access channel, the end time End1 of transmission of the first type of channel is located is at least one of time at which transmission of a random access signal on the random access channel ends; time at which Guard Time (GT) ends; time at which the last one of a plurality of GTs ends when the plurality of GTs is configured in transmission of the random access channel; time at which a transmission gap ends when the transmission gap is configured in transmission of the random access channel; time at which the transmission of the random access signal on the random access channel ends when the transmission gap is configured in transmission of the random access channel; time at which the GT ends when the transmission gap is configured in transmission of the random access channel; time at which the last GT ends when the transmission gap is configured in transmission of the random access channel; time at which the last one of a plurality of transmission gaps ends when the plurality of transmission gaps is configured in transmission of the random access channel; time at which the transmission of the random access signal on the random access channel ends when a plurality of transmission gaps is configured in transmission of the random access channel; time at which the GT ends when a plurality of transmission gaps is configured in transmission of the random access channel; and time at which the last GT ends when a plurality of transmission gaps is configured in transmission of the random access channel.

Optionally, the end time End1 of transmission of the first type of channel is located is determined based on start time, Start1, of the transmission of the first type of channel and a time length, T_Length1, of the transmission of the first type of channel.

Optionally, the time length T_Length1 of the transmission of the first type of channel is determined based on at least one of: a time length, T_Unit1, of an elementary unit for the transmission of the first type of channel; a number, R1, of repetitive transmissions of the elementary unit for the transmission of the first type of channel; and Guard Time, GT1, for the transmission of the first type of channel.

Optionally, the time length T_Length1 of the transmission of the first type of channel is determined based on at least one of: T_Length1=T_Unit1*R1; and T_Length1=T_Unit1*R1+GT.

Optionally, T_Length1 is determined based on at least one of: 1) T_Length1=T_Unit1*R1, when R1 is smaller than or equal to R1set or T_Unit1*R1 is smaller than or equal to T1 set; or T_Length1=T_Unit1*R1+GT; 2) T_Length1=$\Sigma_{j=1}^{j=Num}$ (T_Unit1×R1_subset$_j$+GT1$_j$+Gap1$_j$), when R1 is larger than or equal to R1set or T_Unit1*R1 is larger than or equal to T1 set, where Num=R1/R1set, R1_subset$_j$=R1set, j=1~Num, and Gap1$_j$=Gap1; and 3) T_Length1=$\Sigma_{j=1}^{j=Num}$ (T_Unit1×R1_subset$_j$+Gap1$_j$) when R1 is larger than or equal to R1set, or T_Unit1*R1 is larger than or equal to T1 set, where Num=R1/R1set, R1_subset$_j$=R1set, and j=1~Num; Gap1$_j$=Gap1, j=1~Num, or Gap1$_j$=GT1, j=Num.

Optionally, T_Length1 is further determined based on: 4) T_Length1=$\Sigma_{j=1}^{j=Num}$ (T_Unit1×R1_subset$_j$+GT1$_j$+Gap1$_j$), when R1 is larger than or equal to R1set, or T_Unit1*R1 is larger than or equal to T1 set, where Num=⌈R1/R1set⌉, R1_subset$_j$=R1set, and j=1~Num−1; or R1_subset$_j$=R1−R1set*(Num−1), and j=Num.

Optionally, when R1 is not divisible by R1set: Gap1$_j$=Gap1, and j=1~Num−1; or Gap1$_j$=0, and j=Num.

Optionally, when R1_subset$_j$ is smaller than R1set, Gap1$_j$=0, and j=Num.

Optionally, when R1_subset$_j$ is smaller than or equal to e×R1set, Gap1$_j$=0, and j=Num, where e is a constant.

Optionally, 0<e<1, or 0≤e≤1.

Optionally, the first resources comprise a number, N−j, of resource units from a resource unit RU(j) having an index of j to a resource unit RU(N−1) having an index of N−1, wherein the resources for the second type of channel consist of N RUs having respective indices of 0~N−1.

Optionally, RU(j) is the first RU or a RU having a minimum index among RUs satisfying the specified condition.

Optionally, the RU has a time-domain length that is a number, P, of a first metric unit, or a time-dome length of resources occupied by one transmission of the second type of channel, where P is a positive integer.

Optionally, P has a value that is one of 1 ms, 2 ms, 4 ms, 8 ms, 16 ms, and 32 ms.

Optionally, P=32 ms when a frequency-domain sub-carrier spacing allocated for the second type of channel is 3.75 kHz; P=8 ms when the frequency-domain sub-carrier spacing allocated for the second type of channel is 15 kHz; P=32 ms when the frequency-domain sub-carrier spacing allocated for the second type of channel is 3.75 kHz and the second type of channel is transmitted over one signal carrier; P=8 ms when the frequency-domain sub-carrier spacing allocated for the second type of channel is 15 kHz and the second type of channel is transmitted over one signal carrier; P=1 ms, 2 ms, or 4 ms when the frequency-domain sub-carrier spacing allocated for the second type of channel is 15 kHz and the second type of channel is transmitted over a plurality of carriers; P=8 ms when the frequency-domain sub-carrier spacing allocated for the second type of channel is 3.75 kHz and the second type of channel is transmitted over one signal carrier; and P=2 ms, when the frequency-domain sub-carrier spacing allocated for the second type of channel is 15 kHz and the second type of channel is transmitted over one signal carrier.

Optionally, the RU has a frequency-domain length of a number, Q, of sub-carriers or sub-channels.

Optionally, Q has a value that is at least one of 1, 3, 6, 9 and 12.

Optionally, Q has a value that equals to a number of sub-carriers or the sub-channels allocated for the second type of channel.

Optionally, when a transmission gap of the second type of channel is to be configured for transmission of the second type of channel, the N RUs constituting the resources for the second type of channel comprises the RU occupied by the transmission gap of the second type of channel.

Optionally, RU(j) comprises: the first RU that satisfies the specified condition and is not the RU occupied by the transmission gap of the second type of channel; and the RU having a minimum index that satisfies the specified condition and is not the RU occupied by the transmission gap of the second type of channel.

Optionally, RU(j) is the first RU or the RU having a minimum index among RUs satisfying the specified condition when a transmission gap of the first type of channel is to be configured for transmission of the first type of channel, wherein the resources for the first type of channel do not include resources occupied by the transmission gap of the first type of channel.

Optionally, the method further includes: refraining from postponing transmission of the second type of channel when RU(j) is not present.

Optionally, the delay process is performed on the time-domain position at which the first resource among the resources for the second type of channel is located by: setting start time of a postponed time-domain position at which the first resource among the resources for the second type of channel is located to be Start2, and Start2 =m+k, when the transmission gap Gap1 configured in the first type of channel, where m is a first metric unit at which start time of the first transmission gap Gap1 after end time, End2, of the resources for the second type of channel is located, or an index of the first metric unit, and k is larger than or equal to 0; or setting start time of a postponed time-domain position at which the first resource among the resources for the second type of channel is located to be Start2, and Start2 =m+k, when the transmission gap Gap1 is configured in the first type of channel, where m is a first metric unit at which start time of the first transmission gap after Gap1 end time of the resource unit RU(j) is located, or an index of the first metric unit, and k is larger than or equal to 0.

Optionally, when the resources for the first type of channel and the resources for the second type of channel partially overlap, one of data, traffic, information, and signal carried on the second type of channel is transmitted over resources for the second type of channel that do not overlap the resources for the first type of channel.

Optionally, when a ratio of an overlapping portion between a frequency-domain bandwidth occupied by the second type of channel and frequency-domain resources for the first type of channel to a frequency-domain bandwidth configured to the second type of channel is smaller than or equal to c1%, one of data, traffic, information, and signal carried on the second type of channel is transmitted over resources for the second type of channel that do not overlap the resources for the first type of channel, where c1 is larger than or equal to 0.

Optionally, when the specified condition is satisfied and a ratio of a length of a time-domain overlapping area between the resources for the first type of channel and the resources for the second type of channel to a time-domain length of the resources for the second type of channel is smaller than or equal to d %, transmission of the second type of channel is not postponed, where d is larger than or equal to 0.

Optionally, the length of the time-domain overlapping area equals to a number, W1, of a first metric unit; or the length of the time-domain overlapping area equals to a number, W2, of a time-domain length of resources occupied by one transmission of the second type of channel.

Optionally, when the specified condition is satisfied and a level index of the second terminal is larger than or equal to a predetermined level index, transmission of the second type of channel is not postponed, wherein the predetermined level index is configured by default or via signaling.

Optionally, when the specified condition is satisfied and a number of repetitive transmissions of the second type of channel is larger than or equal to a predetermined value, transmission of the second type of channel is not postponed, wherein the predetermined value is configured by default or via signaling.

Optionally, the second type of channel is a channel carrying a Hybrid Automatic Repeat reQuest (HARQ) response message.

Optionally, the first terminal comprises one or more terminals when the first type of channel is a random access channel.

Optionally, when the first terminal includes a plurality of terminals, the plurality of terminals satisfies one of the following: the plurality of terminals having a same coverage enhancement level; the plurality of terminals having a same level of repetitive transmission of a random access signal; and the plurality of terminals having a same number of repetitive transmissions of the random access signal.

According to another aspect of the embodiments of the present disclosure, an apparatus for resource configuration is provided. The apparatus includes: a postponing module configured to perform, when resources for a first type of channel allocated to a first terminal and resources for a second type of channel allocated to a second terminal satisfy a specified condition, a delay process on a time-domain position at which a first resource among the resources for the second type of channel is located.

Optionally, the first type of channel comprises a random access channel; and/or the second type of channel comprises one of: an uplink data channel, an uplink traffic channel, an uplink control channel, a channel carrying a Hybrid Automatic Repeat reQuest (HARQ) response message, and a sounding channel.

Optionally, the specified condition comprises at least one of: the resources for the first type of channel and the resources for the second type of channel having an overlapping area; time-domain positions at which the resources for the first type of channel are located and time-domain positions at which the resources for the second type of channel are located overlapping or partially overlapping, and a frequency-domain position at which the resources for the first type of channel are located being contained in a frequency-domain position at which the resources for the second type of channel are located; the time-domain positions at which the resources for the first type of channel are located and the time-domain positions at which the resources for the second type of channel are located overlapping or partially overlapping, and a gap between the frequency-domain position at which the resources for the first type of channel are located being contained in the frequency-domain position at which the resources for the second type of channel are located being smaller than or equal to A Hz, where A is larger than 0; a ratio of an overlapping portion between the resources for the first type of channel and the resources for the second type of channel to a frequency-domain bandwidth of the second type of channel being larger than or equal to c %, where c % has a value configured by default or via signaling; and a ratio of a length of a time-domain overlapping area between the resources for the first type of channel and the resources for the second type of channel to a time-domain length of the resources for second type of channel being larger than or equal to d %; wherein the length of the time-domain overlapping area equals to a number, W1, of a first metric unit; or the length of the time-domain overlapping area equals to a number, W2, of a time-domain length of resources occupied by one transmission of the second type of channel, each of W1 and W2 is an integer larger than 0, and d is larger than 0.

According to another aspect of the embodiments of the present disclosure, a base station is provided. The base station includes any of the apparatus for resource configuration as provided above.

According to yet another aspect of the embodiments of the present disclosure, a storage medium is provided. The storage medium is configured to store program code for performing the following steps of: performing, when resources for a first type of channel allocated to a first terminal and resources for a second type of channel allocated to a second terminal satisfy a specified condition, a delay process on a time-domain position at which a first resource among the resources for the second type of channel is located.

With the embodiments of the present disclosure, when resources for a first type of channel and resources for a second type of channel of different terminals satisfy a specified condition, a delay process is performed on a time-domain position at which a first resource among the resources for the second type of channel is located. This can avoid performing simultaneous processing on resources configured for different terminals. In this way, the problem associated with avoiding collision occurred between channel resources configured for different terminals in the related art can be solved, thereby avoiding collisions of channel resources and improving the communication efficiency.

BRIEF DESCRIPTION OF THE DRAWINGS

The present disclosure can be further understood with reference to the figures described below, which constitute a part of the present disclosure. The illustrative embodiments of the present disclosure and descriptions thereof are provided for explaining, rather than limiting, the present disclosure. In the figures.

DETAILED DESCRIPTION OF THE EMBODIMENTS

In the following, the present disclosure will be described in detail with reference to the figures, taken in conjunction with the embodiments. The embodiments, and the features thereof, can be combined with each other, provided that they do not conflict.

It is to be noted that, the terms such as "first", "second" and so on in the description, claims and figures are used for distinguishing among similar objects and do not necessarily imply any particularly order or sequence.

Embodiment 1

Figure 1:
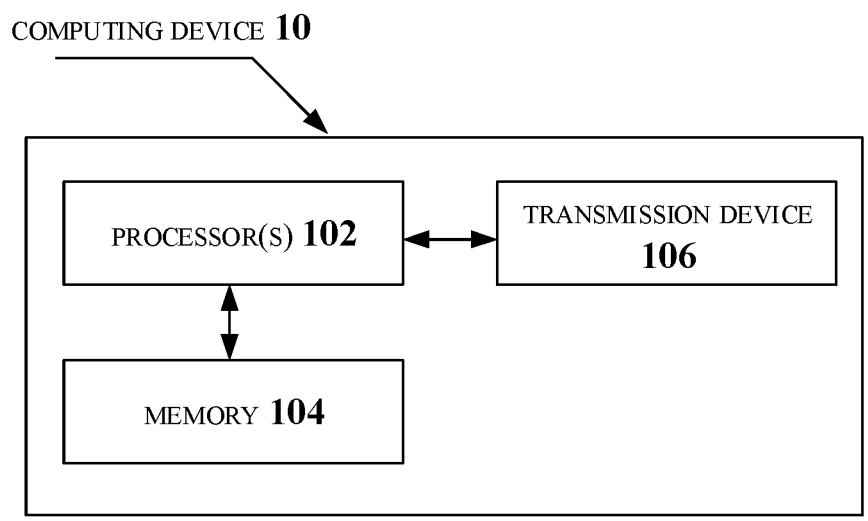
FIG. 1 is a block diagram showing a hardware structure according to an embodiment of the present disclosure.

The method provided according to Embodiment 1 of the present disclosure can be performed in a computing device, a computer terminal or a similar computing device. When the method is performed in a computing device for example, FIG. 1 is a block diagram showing a hardware structure of a computing device in which a method for resource configuration can be applied according to an embodiment of the present disclosure. As shown in FIG. 1, the computing device 10 can include: one or more processors 102 (only one is shown, which includes, but not limited to, a processing device like a microprocessor such as MCU or a programmable logic device such as FPGA), a memory 104 for storing data, and a transmission device 106 for providing communication functions. Those ordinarily skilled in the art can understand that the structure shown in FIG. 1 is illustrative only, and the structure of the above electronic device is not limited thereto. For example, the computing device 10 can include more or less components than those shown in FIG. 1, or have a different configuration from that shown in FIG. 1.

The memory 104 can store software programs and modules of software application, e.g., program instructions/modules associated with the method for resource configuration according to an embodiment of the present disclosure. The processor 102 performs various functional applications and data processing operations, i.e., performing the above method, by executing the software programs and modules stored in the memory 104. The memory 104 can include a random cache or non-volatile memory such as one or more magnetic storage devices, flash memories or other non-volatile solid-state memories. In some examples, the memory 104 can further include one or more memories which are remote from the processor 102 and can be connected to the computing device 10 via a network. Examples of such network include, but not limited to, Internet, an intranet of an enterprise, a Local Area Network (LAN), a mobile communication network, and any combination thereof.

The transmission device 106 can transmit or receive data via a network. The network can be e.g., a wireless network provided by a communication provider of the computing device 10. In an example, the transmission device 106 includes a network adaptor, or Network Interface Controller (NIC), which can be connected to other network devices via a base station for communication with Internet. In an example, the transmission device 106 can be a Radio Frequency (RF) module for communicating with Internet wirelessly.

Figure 2:
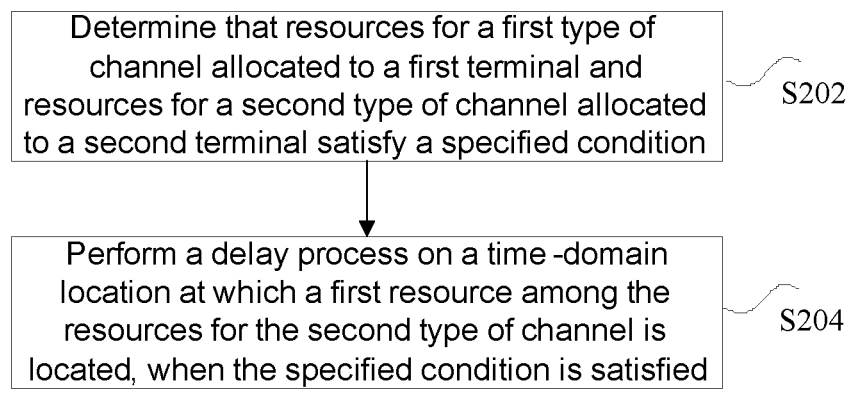
FIG. 2 is a flowchart illustrating a method for resource configuration according to an embodiment of the present disclosure.

In this embodiment, a method for resource configuration is provided. FIG. 2 is a first flowchart illustrating a method for resource configuration according to an embodiment of the present disclosure. As shown in FIG. 2, the process flow includes the following steps.

At step S202, it is determined that resources for a first type of channel allocated to a first terminal and resources for a second type of channel allocated to a second terminal satisfy a specified condition.

At step S204, if the specified condition is satisfied, a time-domain position of a first resource among the resources for the second type of channel is postponed.

With the above steps, if resources for a first type of channel and resources for a second type of channel of different terminals satisfy a specified condition, a time-domain position of a first resource among the resources for the second type of channel is postponed, thereby avoiding performing simultaneous processing on resources configured for different terminals. In this way, the problem associated with avoiding collision occurred between channel resources configured for different terminals in the related art can be solved, thereby avoiding collisions of channel resources and improving the communication efficiency.

It should be noted that step S202 is optional. That is, it is not necessary to perform this step every time, and it is possible to determine that the specified condition is satisfied in advance and then just perform step S204 every time.

Optionally, the above steps can be performed by, but not limited to, a base station, a terminal, etc.

Optionally, in this embodiment, the first type of channel can include a random access channel.

Furthermore, optionally, in this embodiment, the second type of channel can include one of: an uplink data channel, an uplink traffic channel, an uplink control channel, a channel carrying a Hybrid Automatic Repeat reQuest (HARM) response message, and a sounding channel.

In an embodiment of the present disclosure, when the first type of channel is a random access channel and a number, R1, of repetitive transmissions of a random access signal transmitted on the random access channel is larger than or equal to a first threshold, R1set, a transmission gap, Gap1, for the first type of channel is configured in transmission of the first type of channel.

In an embodiment of the present disclosure, R1set can have a value determined by at least one of the following manners.

Manner 1

A default configuration is used for R1set.

Manner 2

A default configuration is used for R1set and the value of R1set is from a set of values of R1.

Manner 3

The value of R1set is configured via signaling.

Manner 4

The value of R1set is configured via signaling and the value of R1set is selected from a set of values of R1.

Manner 5

R1set is set as a maximum integer satisfying a condition that T_Unit1*R1set is smaller than or equal to a second threshold T1 set.

In this manner, T_Unit1 is a time length corresponding to one transmission of the random access signal, and a default configuration is used for T1 set; or T1 set has a value configured via signaling.

Manner 6

The value of R1set is selected from the set of values of R1, and R1set is set as a maximum integer in the set of values of R1 that satisfies a condition that T_Unit1*R1set is smaller than or equal to T1 set.

In this manner, T_Unit1 is a time length corresponding to one transmission of the random access signal, and a default configuration is used for T1 set; or T1 set has a value configured via signaling.

In an embodiment of the present disclosure, the specified condition comprises at least one of the following conditions.

1. The resources for the first type of channel and the resources for the second type of channel have an overlapping area.

In specific, the resources for the first type of channel and the resources for the second type of channel include two dimensions, i.e., time domain and frequency domain. The overlapping area includes all or a part of the resources for the first type of channel, and/or all or a part of the resources for the second type of channel.

2. Time-domain positions at which the resources for the first type of channel are located and time-domain positions at which the resources for the second type of channel are located overlapping or partially overlapping, and a frequency-domain position at which the resources for the first type of channel are located is contained in a frequency-domain position at which the resources for the second type of channel are located.

3. The time-domain positions at which the resources for the first type of channel are located and the time-domain positions at which the resources for the second type of channel are located overlapping or partially overlapping, and a gap between the frequency-domain position at which the resources for the first type of channel are located and the frequency-domain position at which the resources for the second type of channel are located is smaller than or equal to A Hz. A is larger than 0.

4. A ratio of an overlapping portion between the resources for the first type of channel and the resources for the second type of channel to a frequency-domain bandwidth of the second type of channel is larger than or equal to c %. c % has a value configured by default or via signaling.

5. A ratio of a length of a time-domain overlapping area between the resources for the first type of channel and the resources for the second type of channel to a time-domain length of the resources for the second type of channel is larger than or equal to d %. The length of the time-domain overlapping area equals to a number, W1, of a first metric unit; or the length of the time-domain overlapping area equals to a number, W2, of a time-domain length of resources occupied by one transmission of the second type of channel. Each of W1 and W2 is an integer larger than 0, and d is larger than 0.

In an embodiment of the present disclosure, the second type of channel can support one or multiple repetitive transmissions.

In an embodiment of the present disclosure, A is multiplication of a sub-carrier spacing, S1, of the first type of channel by a factor m, where m is larger than 0.

Optionally, when A is multiplication of a sub-carrier spacing, S1, of the first type of channel by a factor m. m can be configured to be 1 or 2 by default, or m can have a value configured via signaling and selected from {0, 1, 2, 3}, or from {0, 1, 2, 4}, or from {1, 2, 3, 4}.In this case, optionally, S1=3.75 kHz.

In an embodiment of the present disclosure, A is multiplication of a sub-carrier spacing, S2, of the second type of channel by a factor n, where n is larger than 0.

Optionally, when A is multiplication of a sub-carrier spacing, S2, of the second type of channel by a factor n. n can be configured to be 1 or 2 by default, or n can have a value configured via signaling and selected from {0, 1, 2, 3}, or from {0, 1, 2, 4}, or from {1, 2, 3, 4}. In this case, optionally, S2=3.75 kHz.

Optionally, when A is multiplication of a sub-carrier spacing S2 of the second type of channel by a factor n, n can be configured to be 1 or 2 by default; or n has a value configured via signaling and selected from {0, 1}, or from {1, 2}. In this case, optionally, S2=15 kHz.

In an embodiment of the present disclosure, the postponing a time-domain position of a first resource among resources for a second type of channel is according to the following: setting start time of a postpone time-domain position of the first resource among the resources for the second type of channel as Start2, and Start2=m+k, wherein m is a first metric unit at which end time, End1, of transmission of the first type of channel is located or an index of the first metric unit, and k is an integer.

In this embodiment, End1 can be a decimal, i.e., cannot be an integer number of the first metric unit. The first metric unit can be second (s), millisecond (ms), subframe, frame, slot, or other time unit.

When the sub-carrier spacing of the second type of channel is 15 kHz, a slot has a length of 1 ms. When the sub-carrier spacing of the second type of channel is 15 kHz, a slot has a length of 2 ms.

In an embodiment of the present disclosure, when the first type of channel is a random access channel, the end time End1 of transmission of the first type of channel can be at least one of the following:

1. The time at which transmission of a random access signal on the random access channel ends;

2. The time at which Guard Time (GT) ends;

3. time at which the last one of a plurality of GTs ends when the plurality of GTs is configured in transmission of the random access channel;

4. time at which a transmission gap ends when the transmission gap is configured in transmission of the random access channel;

5. time at which the transmission of the random access signal on the random access channel ends when the transmission gap is configured in transmission of the random access channel;

6. time at which the GT ends when the transmission gap is configured in transmission of the random access channel;

7. time at which the last GT ends when the transmission gap is configured in transmission of the random access channel;

8. time at which the last one of a plurality of transmission gaps ends when the plurality of transmission gaps is configured in transmission of the random access channel;

9. time at which the transmission of the random access signal on the random access channel ends when a plurality of transmission gaps is configured in transmission of the random access channel;

10. time at which the GT ends when a plurality of transmission gaps is configured in transmission of the random access channel; and 11. time at which the last GT ends when a plurality of transmission gaps is configured in transmission of the random access channel.

Similarly, in this embodiment, End1 can be a decimal, i.e., cannot be an integer number of the first metric unit.

In an embodiment of the present disclosure, the end time End1 of transmission of the first type of channel is determined based on start time, Start1, of the transmission of the first type of channel and a time length, T_Length1, of the transmission of the first type of channel.

Optionally, in this embodiment, End1=Start1+T_Length1.

In an embodiment of the present disclosure, the time length T_Length1 of the transmission of the first type of channel is determined based on at least one of: a time length, T_Unit1, of an elementary unit for the transmission of the first type of channel; a number, R1, of repetitive transmissions of the elementary unit for the transmission of the first type of channel; and Guard Time, GT1, for the transmission of the first type of channel.

In an embodiment of the present disclosure, the time length T_Length1 of the transmission of the first type of channel is determined based on at least one of: T_Length1=T_Unit1*R1; and T_Length1=T_Unit1*R1+GT.

That is, the time length T_Length1 of the transmission of the first type of channel can be determined based on T_Length1=T_Unit1*R1 or T_Length1=T_Unit1*R1+GT.

In an embodiment of the present disclosure, the time length T_Length1 of the transmission of the first type of channel is determined based on at least one of: a time length, T_Unit1, of an elementary unit for the transmission of the first type of channel; a number, R1, of repetitive transmissions of the elementary unit for the transmission of the first type of channel; and Guard Time, GT1, for the transmission of the first type of channel.

In an embodiment of the present disclosure, T_Length1 is determined based on at least one of the following manner.

1) T_Length1=T_Unit1*R1, when R1 is smaller than or equal to R1set or T_Unit1 *R1 is smaller than or equal to T1 set; or T_Length1=T_Unit1*R1+GT.

R1 has a value configured by the base station via signaling.

R1set can have a value determined by at least one of: using a default configuration for R1set; using a default configuration for R1set and selecting the value of R1set from a set of values of R1; configuring the value of R1set via signaling; configuring the value of R1set via signaling and selecting the value of R1set from a set of values of R1; setting R1set as a maximum integer satisfying a condition that T_Unit1*R1set is smaller than or equal to T1 set; and selecting the value of R1set from the set of values of R1, and setting R1set as a maximum value in the set of values of R1 that satisfies a condition that T_Unit1*R1set is smaller than or equal to T1 set.

A default configuration is used for T1 set; or T1 set has a value configured via signaling.

2) $T\_Length = \sum_{j=1}^{j=Num} (T\_Unit1 \times R1\_subset_j + GT1_j + Gap1_j)$, when R1 is larger than or equal to R1set or T_Unit1*R1 is larger than or equal to T1 set, where Num=R1/R1set, R1_subset$_j$=R1set, j=1~Num, and Gap1=Gap1.

R1 has a value configured by the base station via signaling.

R1set can have a value determined by at least one of: using a default configuration for R1set; using a default configuration for R1set and selecting the value of R1set from a set of values of R1; configuring the value of R1set via signaling; configuring the value of R1set via signaling and selecting the value of R1set from a set of values of R1; setting R1set as a maximum integer satisfying a condition that T_Unit1*R1set is smaller than or equal to T1 set; and selecting the value of R1set from the set of values of R1, and setting R1set as a maximum value in the set of values of R1 that satisfies a condition that T_Unit1*R1set is smaller than or equal to T1 set.

A default configuration is used for T1 set; or T1 set has a value configured via signaling.

Optionally, in an embodiment of the present disclosure, Gap1=0 and j=Num.

3) $T\_Length1 = \Sigma_{j=1}^{j=Num} (T\_Unit1 \times R1\_subset_j + Gap1_j)$ when R1 is larger than or equal to R1set, or T_Unit1*R1 is larger than or equal to T1 set, where Num=R1/R1set, R1_subset$_j$=R1set, and j=1~Num.

R1 has a value configured by the base station via signaling.

R1set can have a value determined by at least one of: using a default configuration for R1set; using a default configuration for R1set and selecting the value of R1set from a set of values of R1; configuring the value of R1set via signaling; configuring the value of R1set via signaling and selecting the value of R1set from a set of values of R1; setting R1set as a maximum integer satisfying a condition that T_Unit1*R1set is smaller than or equal to T1 set; and selecting the value of R1set from the set of values of R1, and setting R1set as a maximum value in the set of values of R1 that satisfies a condition that T_Unit1*R1set is smaller than or equal to T1 set.

A default configuration is used for T1 set; or T1 set has a value configured via signaling.

Optionally, in an embodiment of the present disclosure, Gap1$_j$=GT1 and j=Num, or Gap1$_j$=Gap1, j=1~Num.

4) $T\_Length1 = \Sigma_{j=1}^{j=Num} (T\_Unit1 \times R1\_subset_j + GT1_j + Gap1_j)$, when R1 is larger than or equal to R1set, or T_Unit1*R1 is larger than or equal to T1 set, where Num=⌈R1/R1set⌉, R1_subset$_j$=R1set, and j=1~Num−1; or R1_subset$_j$=R1−R1set*(Num−1), and j=Num.

R1 has a value configured by the base station via signaling.

R1set can have a value determined by at least one of: using a default configuration for R1set; using a default configuration for R1set and selecting the value of R1set from a set of values of R1; configuring the value of R1set via signaling; configuring the value of R1set via signaling and selecting the value of R1set from a set of values of R1; setting R1set as a maximum integer satisfying a condition that T_Unit1*R1set is smaller than or equal to T1 set; and selecting the value of R1set from the set of values of R1, and setting R1set as a maximum value in the set of values of R1 that satisfies a condition that T_Unit1*R1set is smaller than or equal to T1 set.

A default configuration is used for T1 set; or T1 set has a value configured via signaling.

Optionally, in an embodiment of the present disclosure, when R1 is not divisible by R1set:Gap$_j$=Gap1, and j=1~Num−1; or Gap1$_j$=0, and j=Num.

In an embodiment of the present disclosure, when R1_subset$_j$ is smaller than R1set, Gap1$_j$=0, and j=Num.

In an embodiment of the present disclosure, when R1_subset$_j$ is smaller than or equal to e×R1set, Gap1$_j$=0, and j=Num, where e is a constant.

In an embodiment of the present disclosure, 0<e<1, or 0≤e≤1.

For example, e can be selected from {0/8, 1/8, 2/8, 3/8, 4/8, 5/8, 6/8, 7/8, 1}.

In an embodiment of the present disclosure, the time-domain position of the first resource among the resources for the second type of channel is to be postponed. In this case, the first resources includes a number, N−j, of resource units from a resource unit RU(j) having an index of j to a resource unit RU(N−1) having an index of N−1, wherein the resources for the second type of channel consist of N RUs having respective indices of 0~N−1.

In an embodiment of the present disclosure, RU(j) is the first RU or a RU having a minimum index among RUs satisfying the specified condition.

In an embodiment of the present disclosure, the RU has a time-domain length that is a number, P, of a first metric unit, or a time-dome length of resources occupied by one transmission of the second type of channel, where P is a positive integer.

It should be noted that the second type of channel can support one or multiple repetitive transmissions.

In an embodiment of the present disclosure, P has a value that is one of 1 ms, 2 ms, 4 ms, 8 ms, 16 ms, and 32 ms.

In an embodiment of the present disclosure, P=32 ms when a frequency-domain sub-carrier spacing allocated for the second type of channel is 3.75 kHz; P=8 ms when the frequency-domain sub-carrier spacing allocated for the second type of channel is 15 kHz; P=32 ms when the frequency-domain sub-carrier spacing allocated for the second type of channel is 3.75 kHz and the second type of channel is transmitted over one signal carrier; P=8 ms when the frequency-domain sub-carrier spacing allocated for the second type of channel is 15 kHz and the second type of channel is transmitted over one signal carrier; P=1 ms, 2 ms, or 4 ms when the frequency-domain sub-carrier spacing allocated for the second type of channel is 15 kHz and the second type of channel is transmitted over a plurality of carriers; P=8 ms when the frequency-domain sub-carrier spacing allocated for the second type of channel is 3.75 kHz and the second type of channel is transmitted over one signal carrier; and P=2 ms, when the frequency-domain sub-carrier spacing allocated for the second type of channel is 15 kHz and the second type of channel is transmitted over one signal carrier.

In an embodiment of the present disclosure, the RU has a frequency-domain length of a number, Q, of sub-carriers or sub-channels. The length of frequency-domain for RU is multiplication of the sub-carriers or sub-channels by a fact Q.

In an embodiment of the present disclosure, Q has a value that is at least one of 1, 3, 6, 9 and 12.

In an embodiment of the present disclosure, Q has a value that equals to a number of sub-carriers or the sub-channels allocated for the second type of channel.

In an embodiment of the present disclosure, when a transmission gap of the second type of channel is to be configured for transmission of the second type of channel, the N RUs constituting the resources for the second type of channel comprises the RU occupied by the transmission gap of the second type of channel.

In an embodiment of the present disclosure, RU(j) comprises: the first RU that satisfies the specified condition and is not the RU occupied by the transmission gap of the second type of channel; and the RU having a minimum index that satisfies the specified condition and is not the RU occupied by the transmission gap of the second type of channel.

In an embodiment of the present disclosure, RU(j) is the first RU or the RU having a minimum index among RUs satisfying the specified condition when a transmission gap of the first type of channel is to be configured for transmission of the first type of channel, wherein the resources for the first type of channel do not include resources occupied by the transmission gap of the first type of channel.

In an embodiment of the present disclosure, when RU(j) is not present, transmission of the second type of channel does not need to be postponed.

In an embodiment of the present disclosure, the time-domain position of the first resource among the resources for the second type of channel is postponed according to the following manner: setting start time of a postponed time-domain position of the first resource among the resources for the second type of channel to be Start2, and Start2=m+k, when the transmission gap Gap1 is configured in the first type of channel, where m is a first metric unit at which start time of the first transmission gap Gap1 is located, and Gap1 is after end time, End2, of the resources for the second type of channel, or m is an index of the first metric unit, and k is larger than or equal to 0; or setting start time of a postponed time-domain position of the first resource among the resources for the second type of channel to be Start2, and Start2=m+k, according to the transmission gap Gap1 is configured in the first type of channel, where m is a first metric unit at which start time of the first transmission gap Gap1 is located, wherein Gap1 is after end time of the resource unit RU(j), or m is an index of the first metric unit, and k is larger than or equal to 0.

It should be noted that resources for the second type of channel are those resources without any postponing operation.

In an embodiment of the present disclosure, when the resources for the first type of channel and the resources for the second type of channel partially overlap, one of data, traffic, information, and signal carried on the second type of channel is transmitted over resources for the second type of channel that do not overlap the resources for the first type of channel.

In an embodiment of the present disclosure, when a ratio of an overlapping portion between a frequency-domain bandwidth occupied by the second type of channel and frequency-domain resources for the first type of channel to a frequency-domain bandwidth configured to the second type of channel is smaller than or equal to c1%, one of data, traffic, information, and signal carried on the second type of channel is transmitted over resources for the second type of channel that do not overlap the resources for the first type of channel, where c1 is larger than or equal to 0.

In an embodiment of the present disclosure, if the specified condition is satisfied and a ratio of a length of a time-domain overlapping area between the resources for the first type of channel and the resources for the second type of channel to a time-domain length of the resources for the second type of channel is smaller than or equal to d %, transmission of the second type of channel is not postponed, where d is larger than or equal to 0.

In an embodiment of the present disclosure, the length of the time-domain overlapping area equals to a number, W1, of a first metric unit; or the length of the time-domain overlapping area equals to a number, W2, of a time-domain length of resources occupied by one transmission of the second type of channel.

It should be noted that the second type of channel can support one or multiple repetitive transmissions.

In an embodiment of the present disclosure, if the specified condition is satisfied and a level index of the second terminal is larger than or equal to a predetermined level index, transmission of the second type of channel is not postponed, wherein the predetermined level index is configured by default or via signaling.

Second terminals can be allocated to one or more sets. Second terminals belonging to different sets can send out different numbers of repetitive transmissions. Alternatively, the second terminal can belong to one or more sets, and when belonging to different sets, have different target coverage enhancement values (or target coverage enhancement intervals) corresponding to different numbers of repetitive transmissions for the second type of channel.

In an embodiment of the present disclosure, if the specified condition is satisfied and a number of repetitive transmissions of the second type of channel is larger than or equal to a predetermined value, transmission of the second type of channel is not postponed, wherein the predetermined value is configured by default or via signaling.

In an embodiment of the present disclosure, the second type of channel is a channel carrying a Hybrid Automatic Repeat reQuest(HARQ) response message.

In an embodiment of the present disclosure, the first terminal comprises one or more terminals when the first type of channel is a random access channel.

In an embodiment of the present disclosure, when the first terminal comprises a plurality of terminals, the plurality of terminals satisfies one of the following: the plurality of terminals having a same coverage enhancement level; the plurality of terminals having a same level of repetitive transmission of a random access signal; and the plurality of terminals having a same number of repetitive transmissions of the random access signal.

With the description of the above embodiments, it will be apparent to those skilled in the art that the method according to the above embodiments can be realized by means of software plus the necessary general hardware platform, and of course can be implemented via hardware, but in many cases the former is the better implementation. Based on this understanding, the technical solution of the present disclosure, in essence or in terms of parts contributing to the prior art, can be embodied in the form of a software product, which is stored in a storage medium (e.g., ROM/RAM, disc, CD-ROM) and includes a number of instructions for enabling a terminal device (which can be a mobile phone, a computer, a server, or a network device, etc.) to perform the method described in the various embodiments of the present disclosure.

Embodiment 2

According to an embodiment of the present disclosure, an apparatus for resource configuration is also provided. The apparatus can implement the above embodiments and preferably embodiments and details thereof will be omitted here. As used herein after, the term "module" can be software, hardware, or a combination thereof, capable of performing a predetermined function. While the apparatuses as described in the following embodiments are preferably implemented in software, it can be contemplated that they can also be implemented in hardware or a combination of software and hardware.

Figure 3:
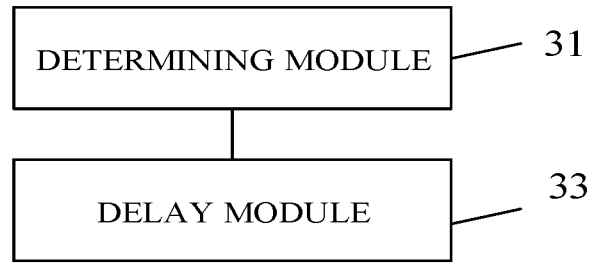
FIG. 3 is a block diagram showing a structure of an apparatus for resource configuration according to an embodiment of the present disclosure.

FIG. 3 is a block diagram showing a structure of an apparatus for resource configuration according to an embodiment of the present disclosure. As shown in FIG. 3, the apparatus includes:

a determining module 31 configured to determine whether resources for a first type of channel allocated to a first terminal and resources for a second type of channel allocated to a second terminal satisfy a specified condition; and a postponing module 33, connected to the determining module 31 and configured to, according to the specified condition is satisfied, postpone a time-domain position of a first resource among the resources for the second type of channel.

With the above module, if resources for a first type of channel and resources for a second type of channel of different terminals satisfy a specified condition, a time-domain position of a first resource among the resources for the second type of channel is postponed. This can avoid performing simultaneous processing on resources allocated to different terminals. In this way, the problem of collision occurred between channel resources allocated to different terminals in the related art can be avoided, thereby avoiding collisions of channel resources and improving the communication efficiency.

It should be noted that the determining module 31 is optional. That is, it is not necessary to invoke this module every time. Instead, it is possible to determine that the specified condition is satisfied before simply invoking the postponing module 33 every time.

Optionally, in this embodiment, the first type of channel comprises a random access channel.

Optionally, the second type of channel comprises one of: an uplink data channel, an uplink traffic channel, an uplink control channel, a channel carrying a Hybrid Automatic Repeat reQuest (HARQ) response message, and a sounding channel.

In an embodiment of the present disclosure, the specified condition comprises at least one of: the resources for the first type of channel and the resources for the second type of channel having an overlapping area; time-domain positions at which the resources for the first type of channel are located and time-domain positions at which the resources for the second type of channel are located overlapping or partially overlapping, and a frequency-domain position at which the resources for the first type of channel are located being contained in a frequency-domain position at which the resources for the second type of channel are located; the time-domain positions at which the resources for the first type of channel are located and the time-domain positions at which the resources for the second type of channel are located overlapping or partially overlapping, and a gap between the frequency-domain position at which the resources for the first type of channel are located being contained in the frequency-domain position at which the resources for the second type of channel are located being smaller than or equal to A Hz, where A is larger than 0; a ratio of an overlapping portion between the resources for the first type of channel and the resources for the second type of channel to a frequency-domain bandwidth of the second type of channel being larger than or equal to c %, where c % has a value configured by default or via signaling; and a ratio of a length of a time-domain overlapping area between the resources for the first type of channel and the resources for the second type of channel to a time-domain length of the resources for the second type of channel being larger than or equal to d %; wherein the length of the time-domain overlapping area equals to a number, W1, of a first metric unit; or the length of the time-domain overlapping area equals to a number, W2, of a time-domain length of resources occupied by one transmission of the second type of channel, each of W1 and W2 is an integer larger than 0, and d is larger than 0.

Embodiment 3

According to this embodiment, a base station is provided. The base station includes any of the apparatus for resource configuration as provided in the above embodiments.

Embodiment 4

Figure 4:
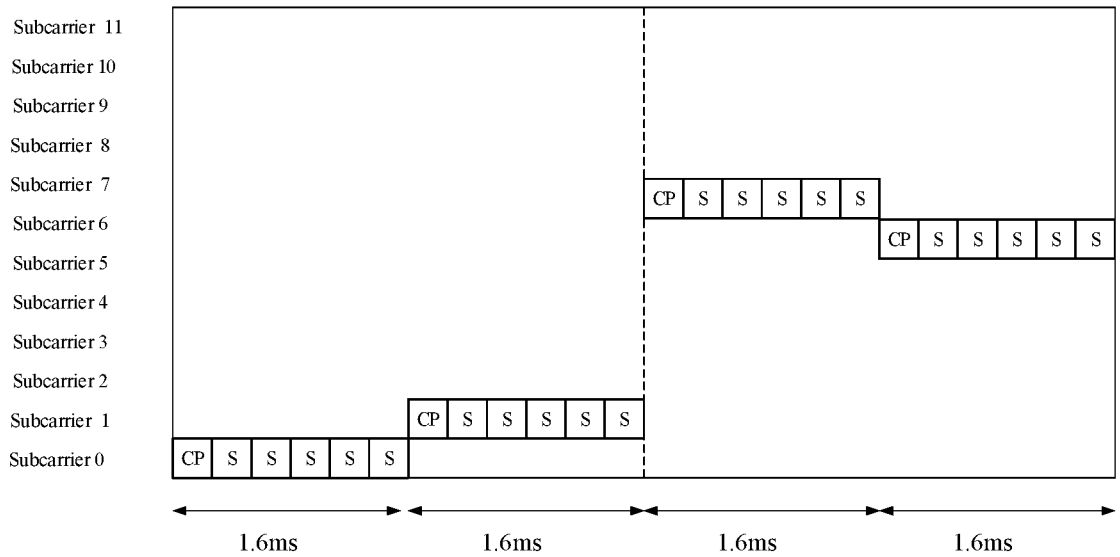
FIG. 4 is diagram 1 showing a structure of transmission of preamble elementary units according to an embodiment of the present disclosure.

In the NB-IoT system, the uplink system bandwidth is 180 kHz. As shown in FIG. 4, in this embodiment, the uplink bandwidth occupied by a random access channel (PRACH) configured by the base station is 45 kHz, a PRACH sub-carrier spacing $\Delta f$ is 3.75 kHz, and a total of 12 PRACH sub-carriers are configured, i.e., Subcarrier0~Subcarrier11.

$Group_1$~$Group_4$ are defined as elementary units that form a random access signal (Preamble). $Group_1$~$Group_4$ are transmitted over different sub-carriers Each Group includes one cyclic prefix (CP) and five Preamble symbols, and one Preamble symbol has a time-domain symbol length of $$T_k = \frac{1}{\Delta f} = 0.2667 \text{ ms}.$$

When CP has a length of 0.2667 ms, each Group has a length of 0.2667+0.2667*5=1.6 ms, and Unit has a length of 1.6*4=6.4 ms.

When CP has a length of 0.0667 ms, each Group has a length of 0.0667+0.2667*5=1.4 ms, and Unit has a length of 1.4*4=5.6 ms.

In this embodiment, CP has a length of 0.2667 ms, and then Unit has a length of 6.4 ms.

Indices of sub-carriers corresponding to $Group_2$, $Group_3$ and $Group_4$ can be determined based on an index of a sub-carrier corresponding to $Group_1$. When a terminal selects Subcarrier 0 for transmitting $Group_1$, $Group_2$ is transmitted over Subcarrier1, $Group_3$ is transmitted over Subcarrier7, and $Group_4$ is transmitted over Subcarrier6, as shown in FIG. 4.

A time length T_Unit1 of elementary units of preamble for a random access signal is 6.4 ms.

In this embodiment, a preamble for random access signal transmitted in PRACH can have a transmission period of 1280 ms, and a start position offset of transmitting the preamble is 128 ms.

A number, R1, of repetitive transmissions of elementary units of transmitting the preamble is selected from {1, 2, 4, 8, 16, 32, 64, 128}. In this embodiment, R1=64.

Guard Time, GT1, for transmitting the preamble is 1.2 ms, i.e., GT1=1.2 ms.

In this embodiment, 64 repetitive transmissions of elementary units of transmitting the preamble have a total length of 409.6 ms.

Figure 5:
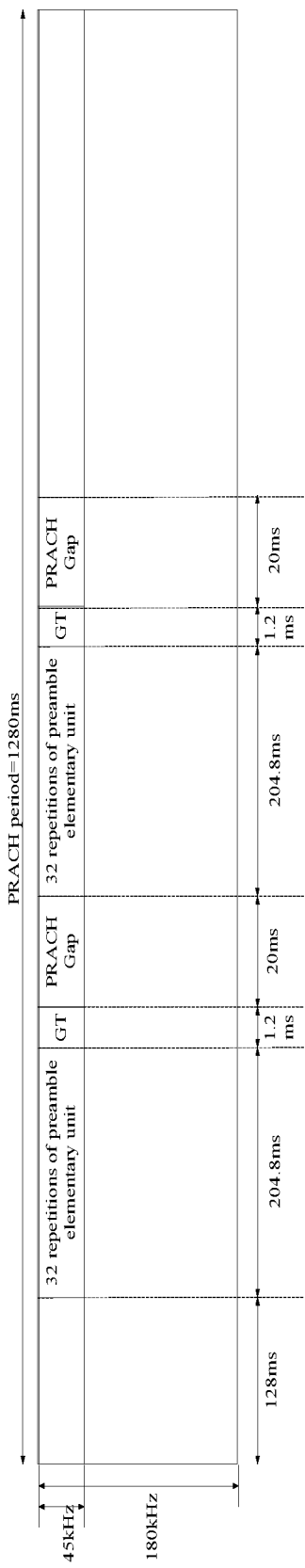
FIG. 5 is diagram 1 showing a structure of 64 repetitive transmissions of preamble elementary units according to an embodiment of the present disclosure.

When the number of repetitive transmissions of elementary units of transmitting the preamble is larger than R1set, after R1set transmissions of elementary units of Preamble are completed, it is needed to introduce a transmission gap, Gap1, for Preamble. During Gap1, Preamble is not transmitted. In this embodiment, R1set=32, Gap1=20 ms, and then a structure of the 64 repetitive transmissions of elementary units of Preamble is illustrated in FIG. 5. A time length, T_Length1, of the 64 repetitive transmissions of elementary units of Preamble can be calculated as the following formula:

$$T\_Length1 = \Sigma_{j=1}^{j=Num}(T\_Unit1 \times R1\_subset_j + GT1_j + Gap1_j),$$

where Num=R1/R1set=64/32=2;
R1_subset$_j$=R1set, where j=1~Num; and
Gap1$_j$=Gap1, where j=1~Num.

Figure 6:
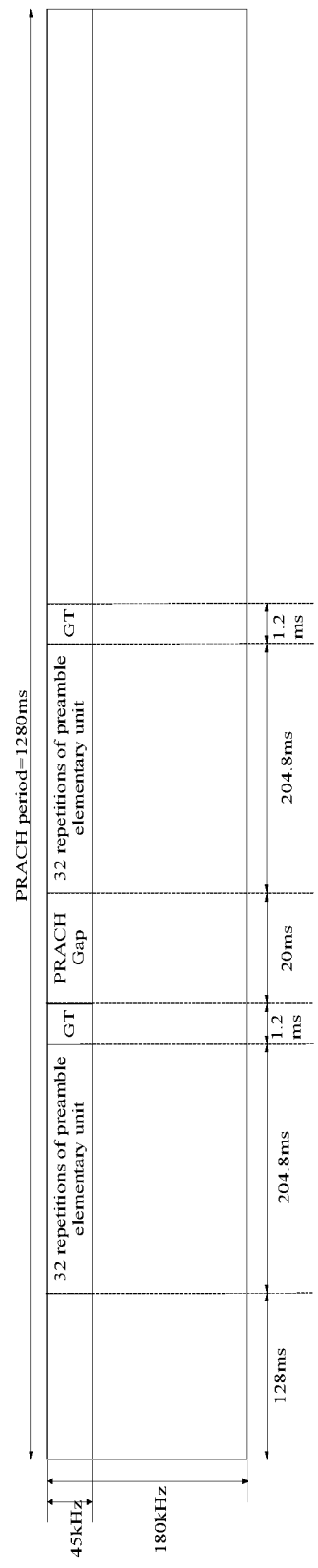
FIG. 6 is diagram 2 showing a structure of 64 repetitive transmissions of preamble elementary units according to an embodiment of the present disclosure.

In addition to this embodiment, FIG. 6 shows a structure of 64 repetitive transmissions of elementary units of Preamble. A time length, T_Length1, of the 64 repetitive transmissions of elementary units of Preamble can be calculated as the following formula:

$$T\_Length1 = \Sigma_{j=1}^{j=Num}(T\_Unit1 \times R1\_subset_j + GT1_j + Gap1_j),$$

where Num=R1/R1set=64/32=2;
R1_subset$_j$=R1set, where j=1~Num;
Gap1$_j$=Gap1, where j=1~Num−1; and
Gap1=0, where j=Num.

Embodiment 5

Figure 7:
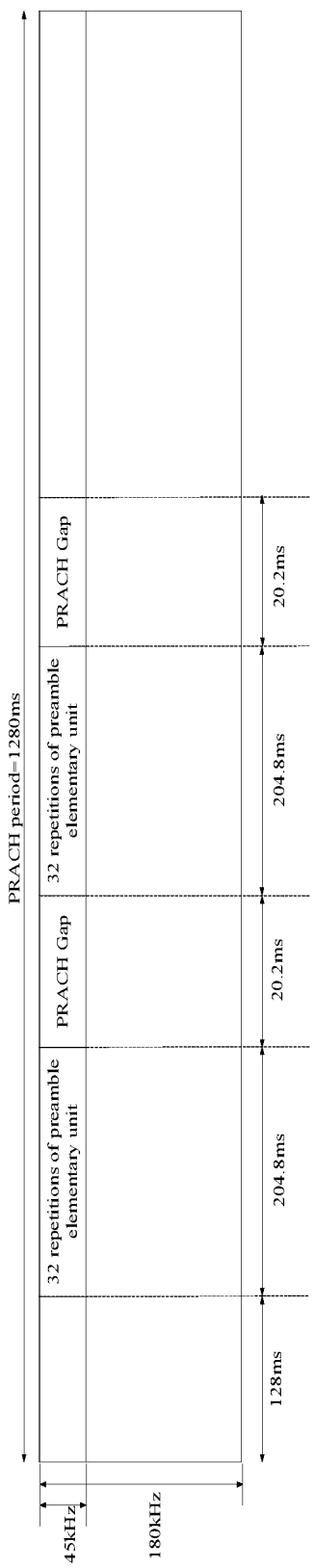
FIG. 7 is diagram 3 showing a structure of 64 repetitive transmissions of preamble elementary units according to an embodiment of the present disclosure.

In the NB-IoT system, the uplink system bandwidth is 180 kHz. As shown in FIG. 7, in this embodiment, the uplink bandwidth occupied by a random access channel (PRACH) configured by the base station is 45 kHz, a PRACH sub-carrier spacing is 3.75 kHz, and a total of 12 PRACH sub-carriers are configured.

A random access signal (Preamble) transmitted in PRACH can have a transmission period of 1280 ms.

A start position offset of transmitting the preamble is 128 ms.

A time length T_Unit1 of elementary units of transmitting the preamble is 6.4 ms.

A number, R1, of repetitive transmissions of elementary units of transmitting the preamble is selected from {1, 2, 4, 8, 16, 32, 64, 128}. In this embodiment, R1=64.

In this embodiment, 64 repetitive transmissions of elementary units of transmitting the preamble have a total length of 409.6 ms.

When the number of repetitive transmissions of elementary units of transmitting the preamble is larger than R1set, after R1set transmissions of elementary units of Preamble are completed, it is needed to introduce a transmission gap, Gap1, for Preamble. During Gap1, Preamble is not transmitted. In this embodiment, R1set=32, Gap1=20.2 ms, and then a structure of the 64 repetitive transmissions of elementary units of Preamble is illustrated in FIG. 7. A time length, T_Length1, of the 64 repetitive transmissions of elementary units of Preamble can be calculated as the following formula:

$$T\_Length1 = \Sigma_{j=1}^{j=Num}(T\_Unit1 \times R1\_subset_j + Gap1_j),$$

where Num=R1/R1set=64/32=2;
R1_subset$_j$=R1set, where j=1~Num;
Gap1$_j$=Gap1, where j=1~Num.

Figure 8:
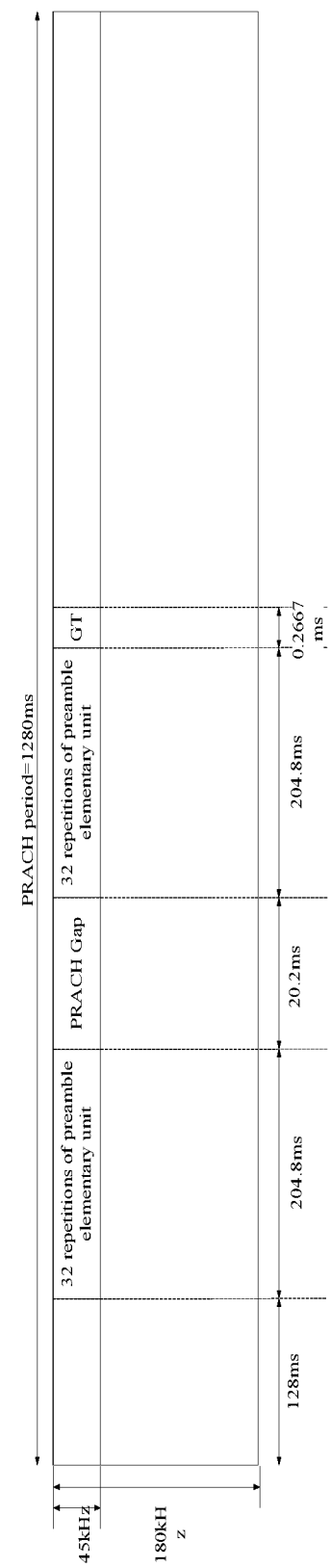
FIG. 8 is diagram 4 showing a structure of 64 repetitive transmissions of preamble elementary units according to an embodiment of the present disclosure.

In addition to this embodiment, FIG. 8 shows a structure of 64 repetitive transmissions of elementary units of Preamble. A time length, T_Length1, of the 64 repetitive transmissions of elementary units of Preamble can be calculated as the following formula:

$$T\_Length1 = \Sigma_{j=1}^{j=Num}(T\_Unit1 \times R1\_subset_j + Gap1_j),$$

where Num=R1/R1set=64/32=2;
R1_subset$_j$=R1set, where j=1~Num;
Gap1$_j$=Gap1, where j=1~Num−1; and
Gap1$_j$=GT, where j=Num.

In this embodiment, GT=0.2667 ms or 1.2 ms.

Embodiment 6

Figure 9:
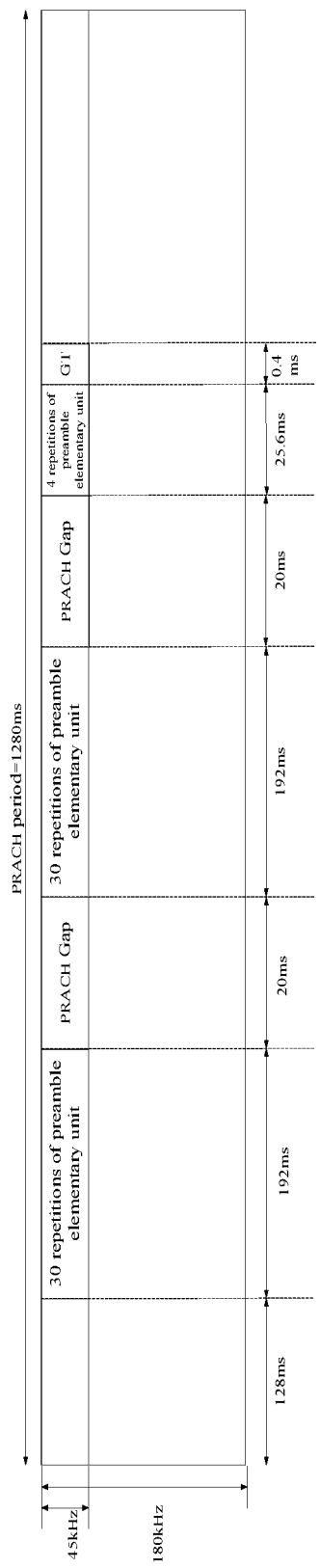
FIG. 9 is diagram 5 showing a structure of 64 repetitive transmissions of preamble elementary units according to an embodiment of the present disclosure.

In the NB-IoT system, the uplink system bandwidth is 180 kHz. As shown in FIG. 9, in this embodiment, the uplink bandwidth occupied by a random access channel (PRACH) configured by the base station is 45 kHz, a PRACH sub-carrier spacing is 3.75 kHz, and a total of 12 PRACH sub-carriers are configured.

A random access signal (Preamble) transmitted in PRACH can have a transmission period of 1280 ms.

A start position offset of transmitting the preamble is 128 ms.

A time length T_Unit1 of elementary units of transmitting the preamble is 6.4 ms.

A number, R1, of repetitive transmissions of elementary units of transmitting the preamble is selected from {1, 2, 4, 8, 16, 32, 64, 128}. In this embodiment, R1=64.

In this embodiment, 64 repetitive transmissions of elementary units of transmitting the preamble have a total length of 409.6 ms.

When the number of repetitive transmissions of elementary units of transmitting the preamble is larger than R1set, after R1set transmissions of elementary units of Preamble are completed, it is needed to introduce a transmission gap, Gap1, for Preamble. During Gap1, Preamble is not transmitted. In this embodiment, R1set=30, and then a structure of the 64 repetitive transmissions of elementary units of Preamble is illustrated in FIG. 9. A time length, T_Length1, of the 64 repetitive transmissions of elementary units of Preamble can be calculated as the following formula:

$$T\_Length1 = \Sigma_{j=1}^{j=Num}(T\_Unit1 \times R1\_subset_j + GT1_j + Gap1_j),$$

where Num=⌈R1/R1set⌉=64/30=3;
R1_subset$_j$=R1set, where j=1~Num−1;
R1_subset$_j$=R1−R1set*(Num−1), where j=Num; and
when R1 is not divisible by R1set:Gap1$_j$=Gap1=20 ms, and j=1~Num−1; or Gap1$_j$=GT=0.4 ms, and j=Num.

Embodiment 7

Figure 10:
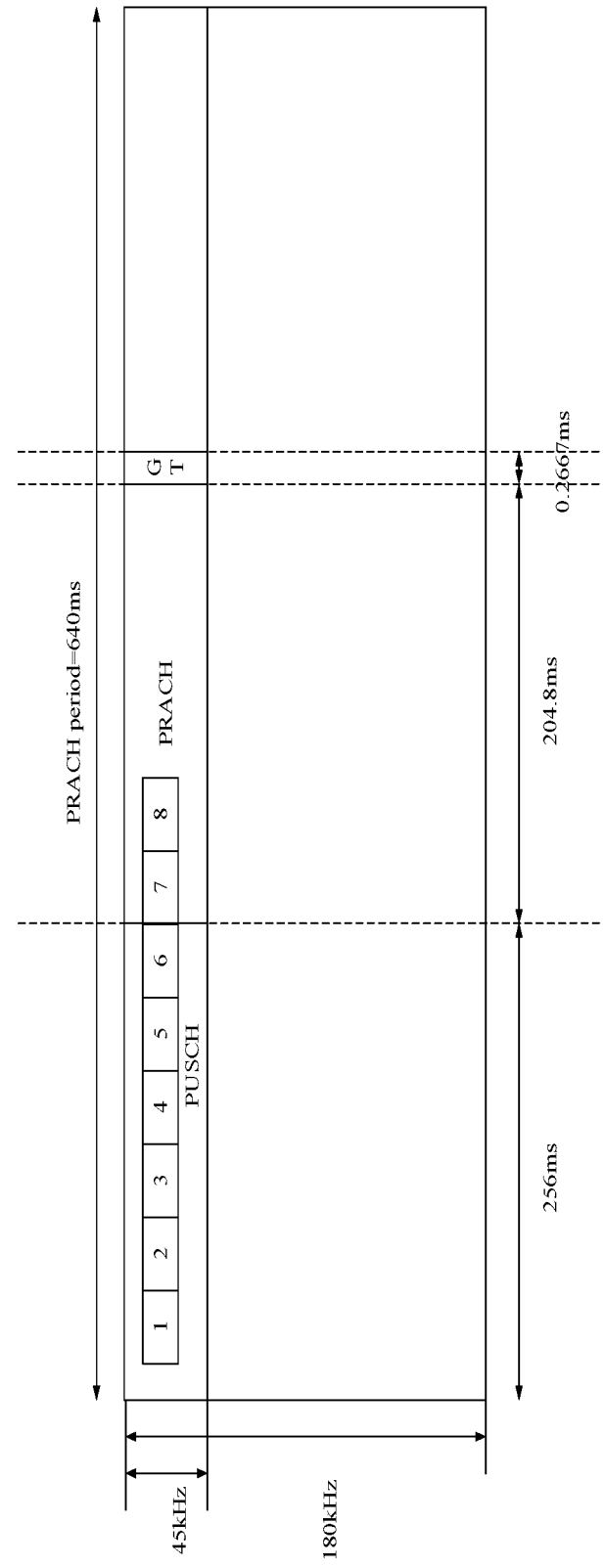
FIG. 10 is diagram 1 showing positions of PUSCH transmission according to an embodiment of the present disclosure.

In the NB-IoT system, the uplink system bandwidth is 180 kHz. As shown in FIG. 10, in this embodiment, the uplink bandwidth occupied by a random access channel (PRACH) configured by the base station is 45 kHz, a PRACH sub-carrier spacing is 3.75 kHz, and a total of 12 PRACH sub-carriers are configured. A random access signal (Preamble) transmitted in PRACH can have a transmission period of 640 ms. A start position offset of transmitting the preamble is 32 ms. A time length T_Unit1 of elementary units of a random access signal (Preamble) is 6.4 ms. Then, 32 repetitive transmissions of elementary units of transmitting the preamble have a total length of 204.8 ms. Guard Time, GT, is 0.2667 ms, i.e., GT=0.2667 ms.

In this embodiment, uplink traffic channel (PUSCH) configured for a terminal by the base station is transmitted by using a single sub-carrier. A sub-carrier spacing is 3.75 kHz. Resources for PUSCH allocated to the terminal by the base station include 8 units. Each unit has a size of one sub-carrier*32 ms. PUSCH allocated to the terminal by the base station occupies 8 units, i.e., Unit1-Unit8. Positions of PUSCH transmission is shown in FIG. 10.

Figure 11:
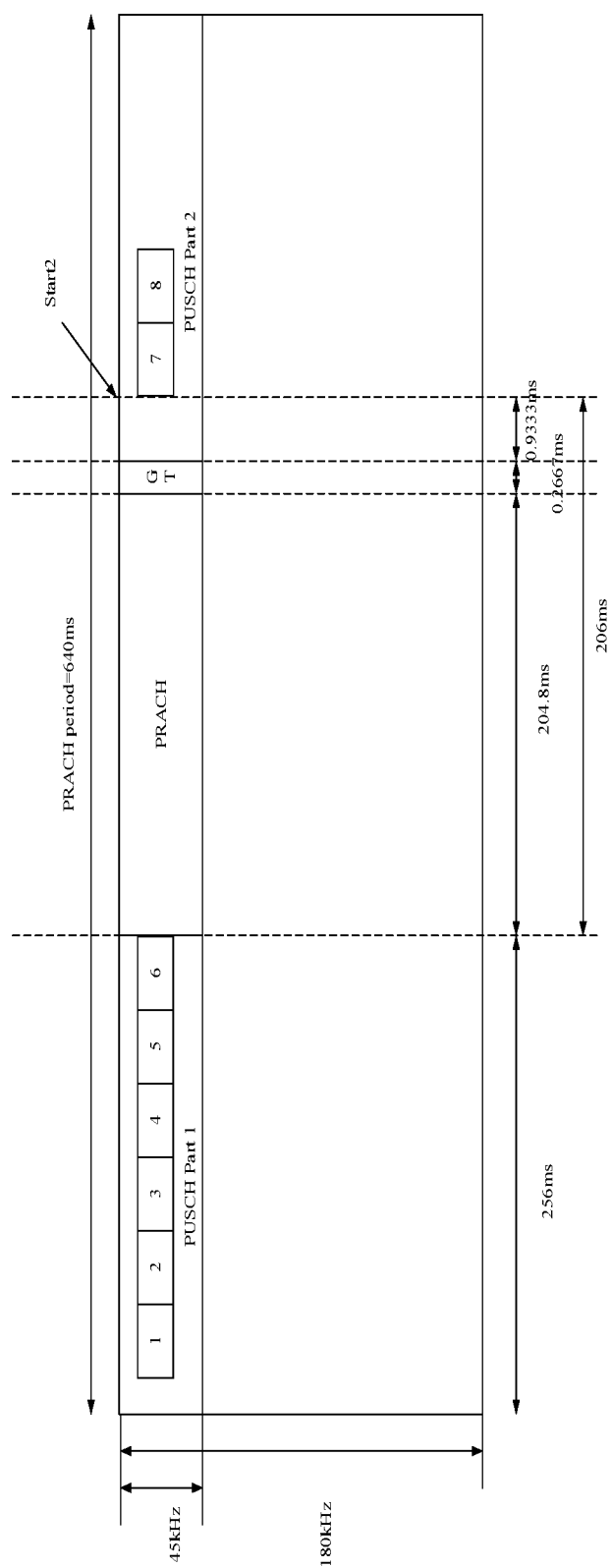
FIG. 11 is diagram 1 showing postponed PUSCH transmission according to an embodiment of the present disclosure.

Since Unit7 and Unit8 in the resources for PUSCH and resources for PRACH overlap, transmission of Unit7 and Unit8 is to be postponed. FIG. 11 shows the postponed PUSCH transmission. Start time of the postponed transmission of Unit7 and Unit8 is Start2, which is the first timing having an integer number of milliseconds after a time length, T_Length1, of PRACH.T_Length1=PRACH (204.8 ms)+GT (0.2667 ms).

Embodiment 8

Figure 12:
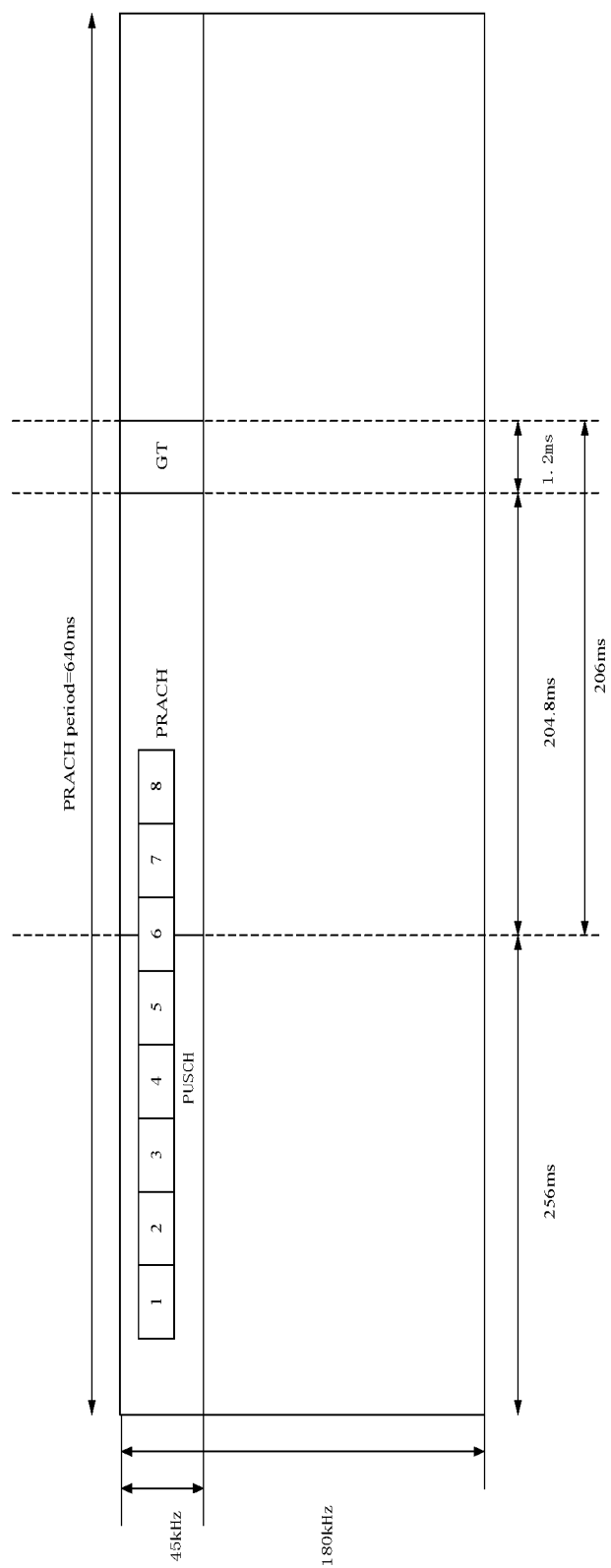
FIG. 12 is diagram 2 showing positions of PUSCH transmission according to an embodiment of the present disclosure.

In the NB-IoT system, the uplink system bandwidth is 180 kHz. As shown in FIG. 12, in this embodiment, the uplink bandwidth occupied by a random access channel (PRACH) configured by the base station is 45 kHz, a PRACH sub-carrier spacing is 3.75 kHz, and a total of 12 PRACH sub-carriers are configured. A random access signal (Preamble) transmitted in PRACH can have a transmission period of 640 ms. A start position offset of transmitting the preamble is 32 ms. A time length T_Unit1 of elementary units of a random access signal (Preamble) is 6.4 ms. Then, 32 repetitive transmissions of elementary units of transmitting the preamble have a total length of 204.8 ms. Guard Time, GT, is 1.2 ms, i.e., GT=1.2 ms.

In this embodiment, uplink traffic channel (PUSCH) configured for a terminal by the base station is transmitted by using a single sub-carrier. A sub-carrier spacing is 3.75 kHz. Resources for PUSCH allocated to the terminal by the base station include 8 units. Each unit has a size of one subcarrier*32 ms. PUSCH allocated to the terminal by the base station occupies 8 units, i.e., Unit1-Unit8. Positions of PUSCH transmission is shown in FIG. 12.

Figure 13:
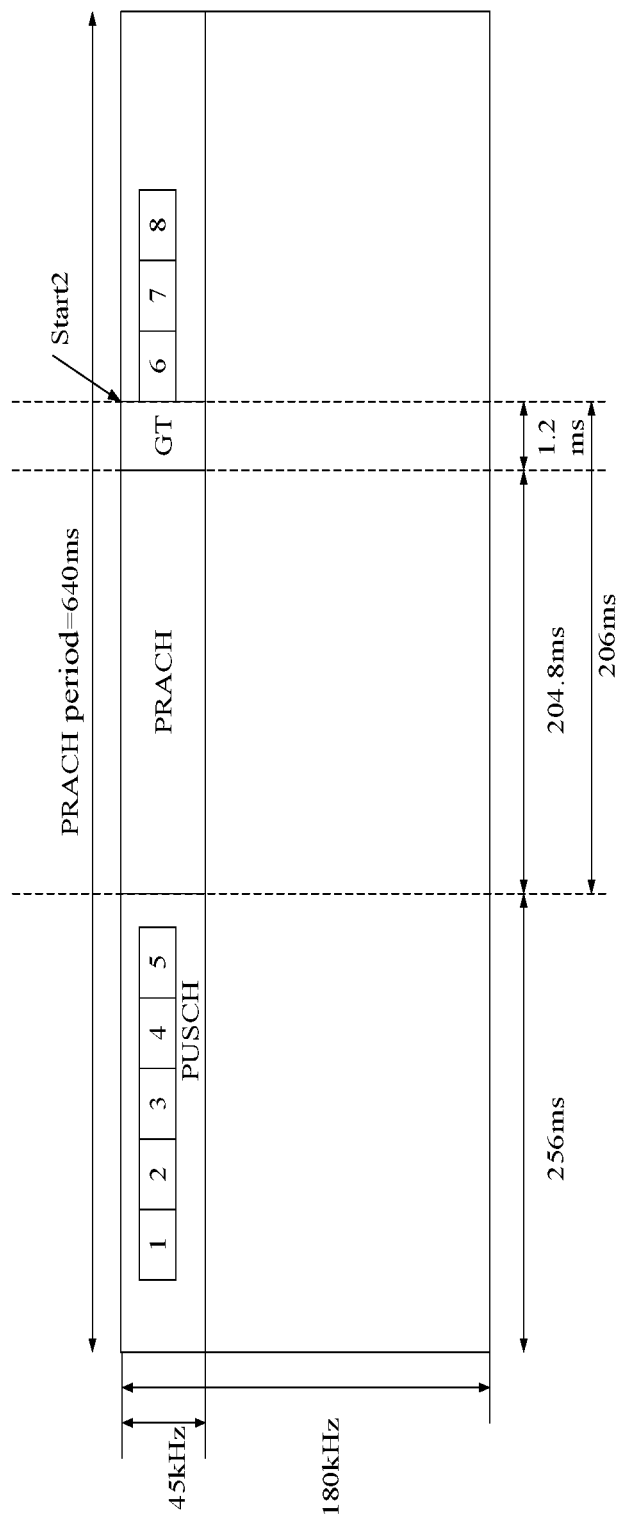
FIG. 13 is diagram 2 showing postponed PUSCH transmission according to an embodiment of the present disclosure.

Since Unit6, Unit7 and Unit8 in the resources for PUSCH and resources for PRACH overlap, transmission of Unit6, Unit7 and Unit8 is to be postponed. FIG. 13 shows the postponed PUSCH transmission. Start time of the postponed transmission of Unit6, Unit7 and Unit8 is Start2, which is the first timing having an integer number of milliseconds after a time length, T_Length1, of PRACH.T_Length1=PRACH (204.8 ms)+GT (1.2 ms).

Embodiment 9

Figure 14:
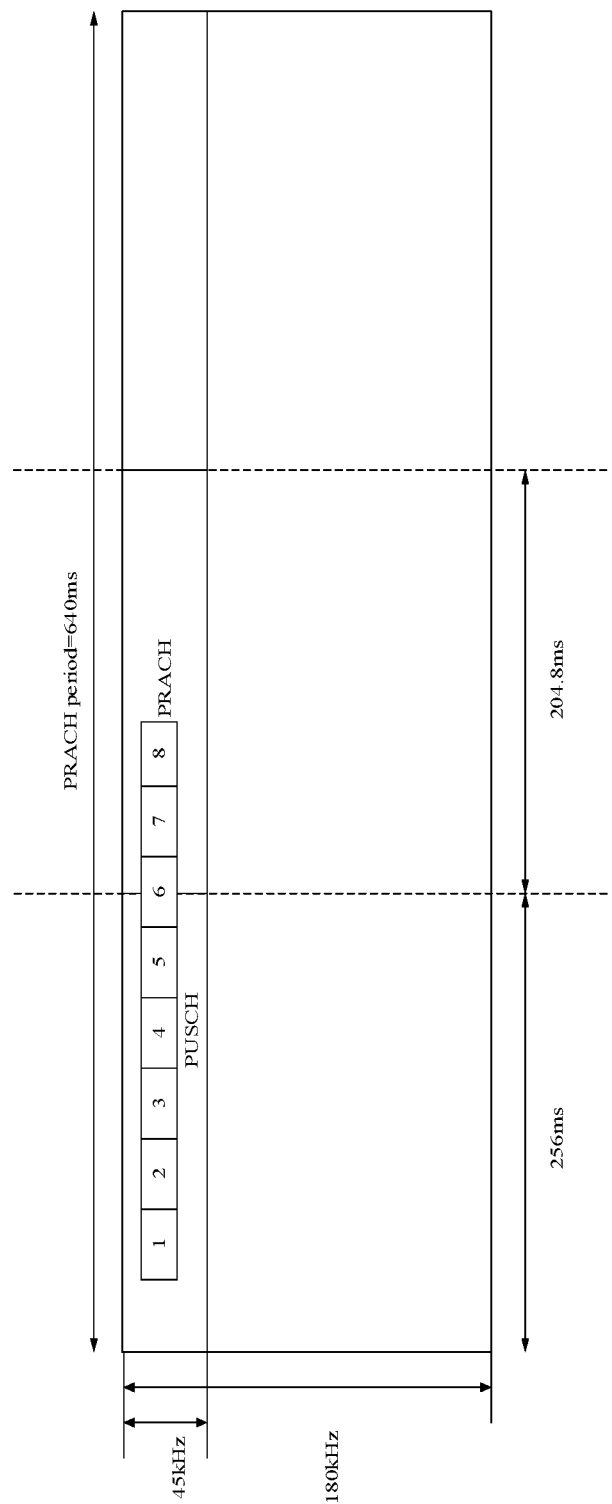
FIG. 14 is diagram 3 showing positions of PUSCH transmission according to an embodiment of the present disclosure.

In the NB-IoT system, the uplink system bandwidth is 180 kHz. As shown in FIG. 14, in this embodiment, the uplink bandwidth occupied by a random access channel (PRACH) configured by the base station is 45 kHz, a PRACH sub-carrier spacing 3.75 kHz, and a total of 12 PRACH sub-carriers are configured. A random access signal (Preamble) transmitted in PRACH can have a transmission period of 640 ms. A start position offset of transmitting the preamble is 32 ms. A time length T_Unit1 of elementary units of a random access signal (Preamble) is 6.4 ms. Then, 32 repetitive transmissions of elementary units of transmitting the preamble have a total length of 204.8 ms.

In this embodiment, uplink traffic channel (PUSCH) configured for a terminal by the base station is transmitted by using a single sub-carrier. A sub-carrier spacing is 3.75 kHz. Resources for PUSCH allocated to the terminal by the base station include 8 units. Each unit has a size of one sub-carrier*32 ms. PUSCH allocated to the terminal by the base station occupies 8 units, i.e., Unit1-Unit8. The Positions of PUSCH transmission is shown in FIG. 14.

Figure 15:
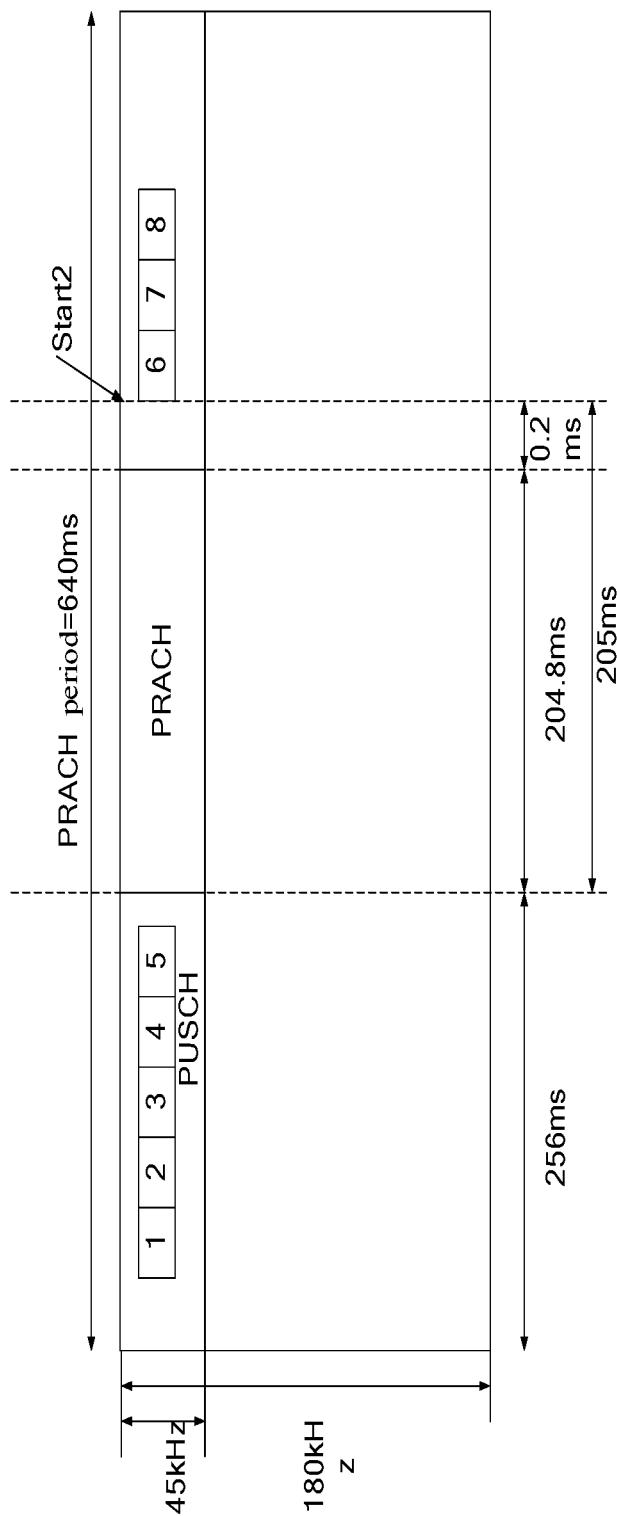
FIG. 15 is diagram 3 showing postponed PUSCH transmission according to an embodiment of the present disclosure.

Since Unit6, Unit7 and Unit8 in the resources for PUSCH and resources for PRACH overlap, transmission of Unit6, Unit7 and Unit8 is to be postponed. FIG. 15 shows the postponed PUSCH transmission. Start time of the postponed transmission of Unit6, Unit7 and Unit8 is Start2, which is the first timing having an integer number of milliseconds after a time length, T_Length1, of PRACH.T_Length1=PRACH (204.8 ms).

Embodiment 10

Figure 16:
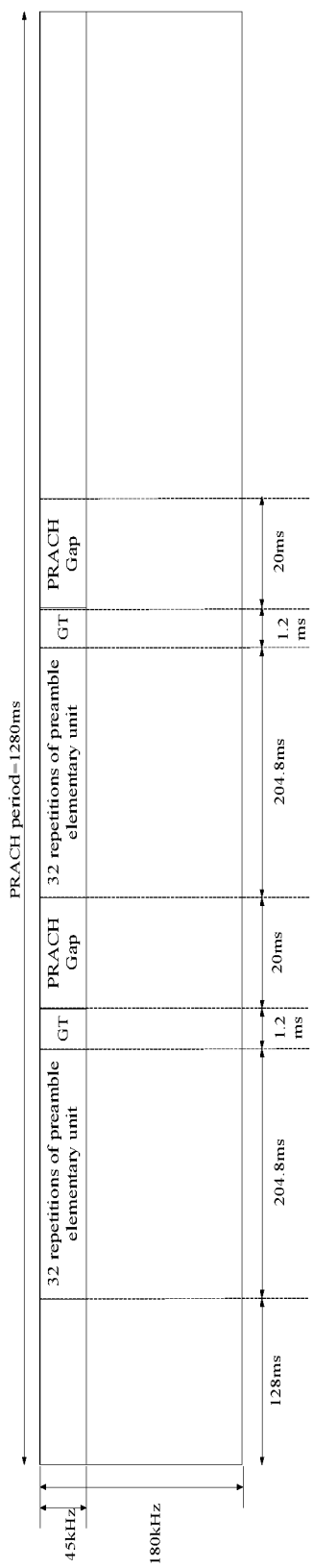
FIG. 16 is diagram 6 showing a structure of 64 repetitive transmissions of preamble elementary units according to an embodiment of the present disclosure.

In the NB-IoT system, the uplink system bandwidth is 180 kHz. As shown in FIG. 16, in this embodiment, the uplink bandwidth occupied by a random access channel (PRACH) configured by the base station is 45 kHz, a PRACH sub-carrier spacing is 3.75 kHz, and a total of 12 PRACH sub-carriers are configured.

A random access signal (Preamble) transmitted in PRACH can have a transmission period of 1280 ms.

A start position offset of transmitting the preamble is 128 ms.

A time length T_Unit1 of elementary units for transmitting the preamble is 6.4 ms.

A number, R1, of repetitive transmissions of elementary units of transmitting the preamble is selected from {1, 2, 4, 8, 16, 32, 64, 128}. In this embodiment, R1=64.the times, R, Guard Time, GT, for transmitting the preamble is 1.2 ms, i.e., GT=1.2 ms.

In this embodiment, 64 repetitive transmissions of elementary units of transmitting the preamble have a total length of 409.6 ms.

When the number of repetitive transmissions of elementary units of transmitting the preamble is larger than R1set, after R1set transmissions of elementary units of Preamble are completed, it is needed to introduce a transmission gap, Gap1, for Preamble. During Gap1, Preamble is not transmitted. In this embodiment, R1set=32, Gap1=20 ms, and then a structure of the 64 repetitive transmissions of elementary units of Preamble is illustrated in FIG. 16. A time length, T_Length1, of the 64 repetitive transmissions of elementary units of Preamble can be calculated as the following formula:

$$T\_Length1 = \sum_{j=1}^{j=Num}(T\_Unit1 \times R1\_subset_j + GT1_j + Gap1_j),$$

where Num=R1/R1set=64/32=2;
R1_subset$_j$=R1set, where j=1~Num; and
Gap1$_j$=Gap1, where j=1~Num.

Figure 17:
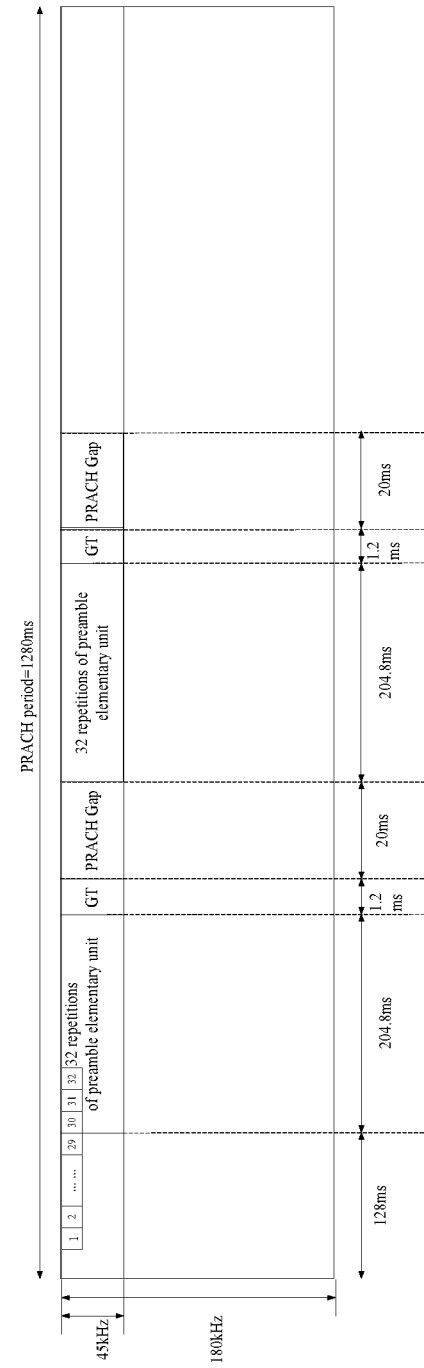
FIG. 17 is diagram 4 showing positions of PUSCH transmission according to an embodiment of the present disclosure.

In this embodiment, the uplink traffic channel (PUSCH) configured for a terminal by the base station is transmitted by using a single sub-carrier. A sub-carrier spacing is 3.75 kHz. Resources for PUSCH allocated to the terminal by the base station include 32 units. Each unit has a size of one sub-carrier*2 ms. PUSCH allocated to the terminal by the base station occupies 32 units, i.e., Unit1-Unit32. Positions of PUSCH transmission is shown in FIG. 17.

Figure 18:
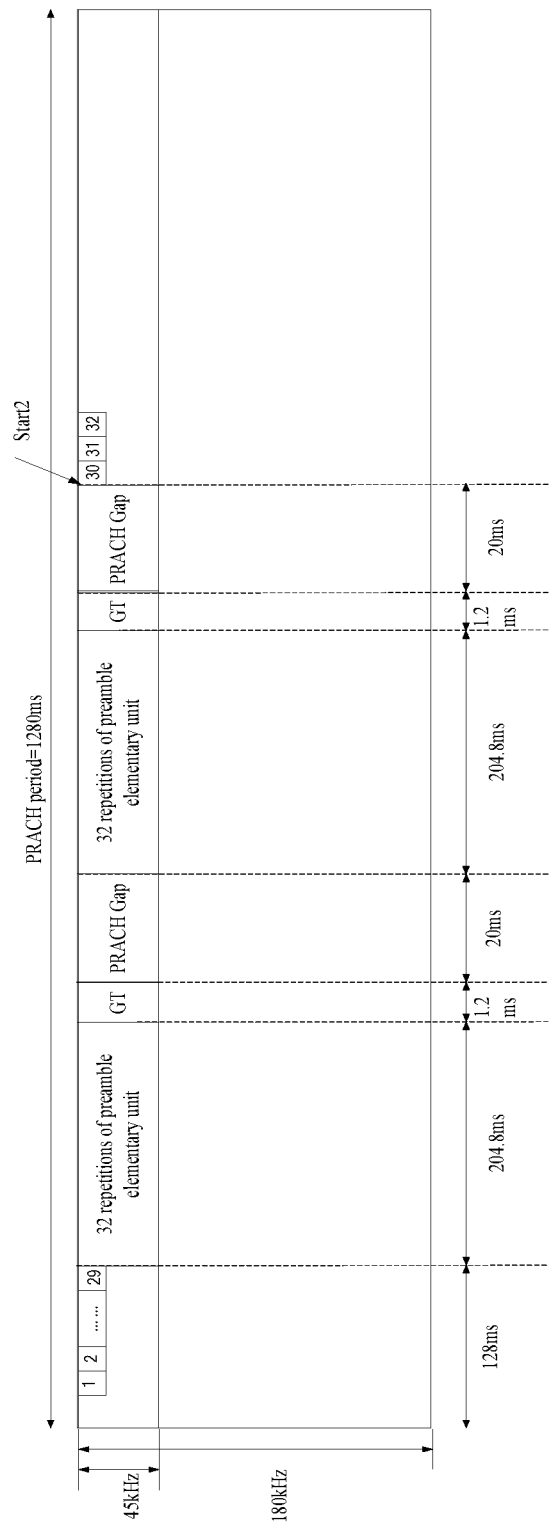
FIG. 18 is diagram 4 showing postponed PUSCH transmission according to an embodiment of the present disclosure.

Since Unit30-Unit32 in the resources for PUSCH and resources for PRACH overlap, transmission of Unit30-Unit32 is to be postponed. FIG. 18 shows the postponed PUSCH transmission. Start time of the postponed transmission of Unit30-Unit32 is Start2, which is the first timing having an integer number of milliseconds after a time length, T_Length1, of PRACH.

Embodiment 11

Figure 19:
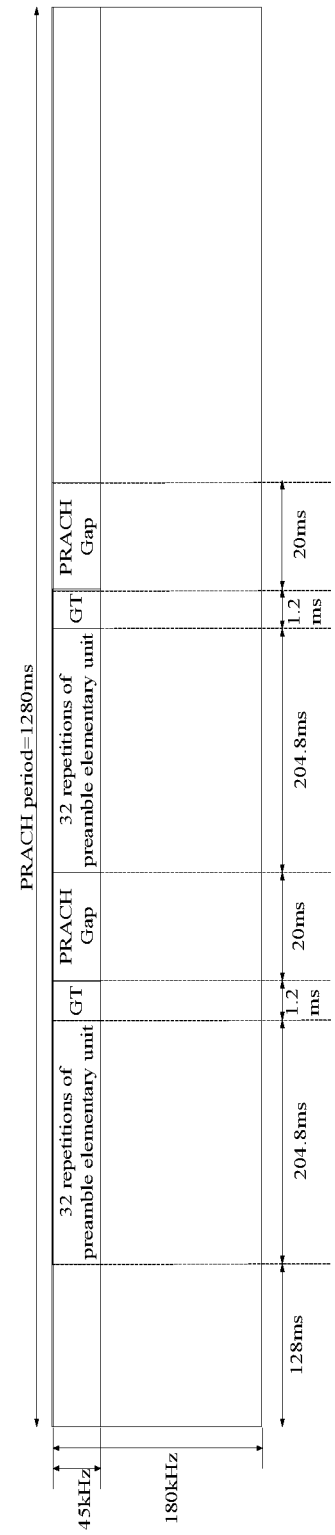
FIG. 19 is diagram 7 showing a structure of 64 repetitive transmissions of preamble elementary units according to an embodiment of the present disclosure.

In the NB-IoT system, the uplink system bandwidth is 180 kHz. As shown in FIG. 19, in this embodiment, the uplink bandwidth occupied by a random access channel (PRACH) configured by the base station is 45 kHz, a PRACH sub-carrier spacing is 3.75 kHz, and a total of 12 PRACH sub-carriers are configured.

A random access signal (Preamble) transmitted in PRACH can have a transmission period of 1280 ms.

A start position offset of transmitting the preamble is 128 ms.

CP of Preamble has a length of 0.2667 ms, and a time length T_Unit1 of elementary units of transmitting the preamble is 6.4 ms.

A number, R1, of repetitive transmissions of elementary units of transmitting the preamble is selected from {1, 2, 4, 8, 16, 32, 64, 128}. In this embodiment, R1=64.

Guard Time, GT1, for transmitting the preamble is 1.2 ms, i.e., GT1=1.2 ms.

In this embodiment, 64 repetitive transmissions of elementary units of transmitting the preamble have a total length of 409.6 ms.

When the number of repetitive transmissions of elementary units of transmitting the preamble is larger than R1set, after R1set transmissions of elementary units of Preamble are completed, it is needed to introduce a transmission gap, Gap1, for Preamble. During Gap1, Preamble is not transmitted. In this embodiment, R1set=32, Gap1=20 ms, and then a structure of the 64 repetitive transmissions of elementary units of Preamble is illustrated in FIG. 19. A time length, T_Length1, of the 64 repetitive transmissions of elementary units of Preamble can be calculated as the following formula:

$$T\_Length1 = \sum_{j=1}^{j=Num}(T\_Unit1 \times R1\_subset_j + GT1_j + Gap1_j),$$

where Num=R1/R1set=64/32=2;
R1_subset$_j$=R1set, where j=1~Num; and
Gap1$_j$=Gap1, where j=1~Num.

Figure 20:
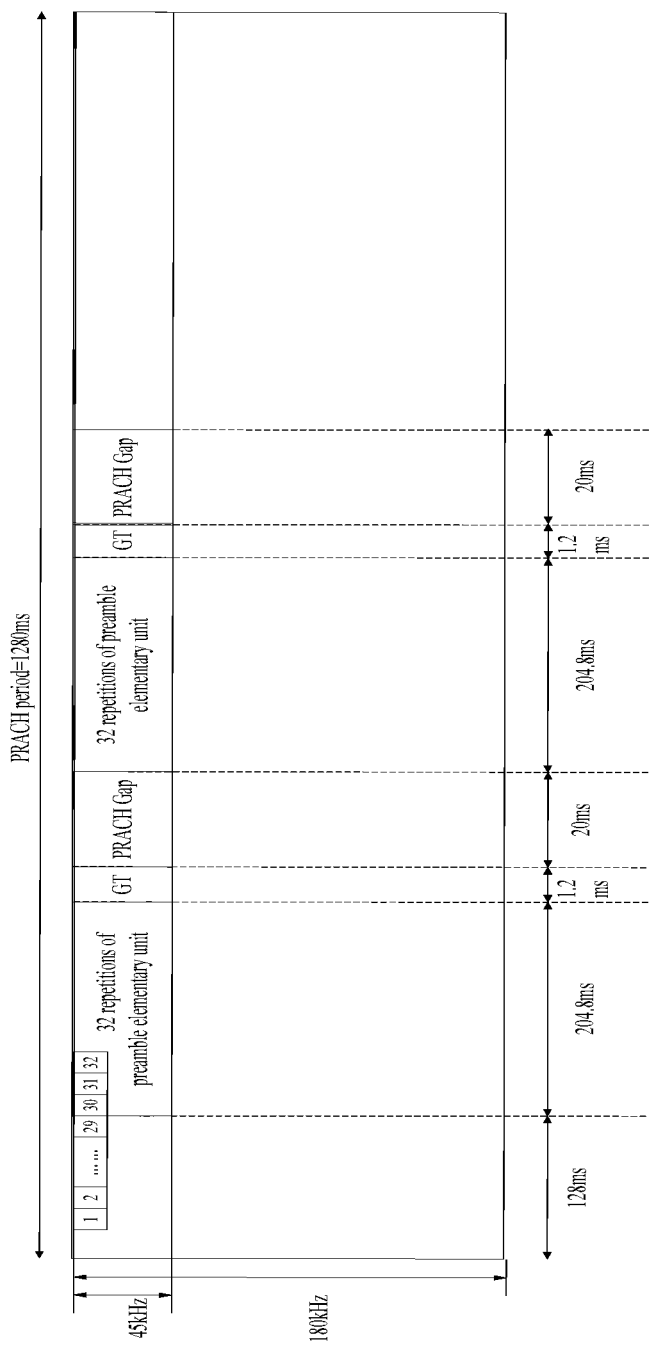
FIG. 20 is diagram 5 showing positions of PUSCH transmission according to an embodiment of the present disclosure.

In this embodiment, uplink traffic channel (PUSCH) configured for a terminal by the base station is transmitted by using a single sub-carrier. A sub-carrier spacing is 3.75 kHz. Resources for PUSCH allocated to the terminal by the base station include 32 units. Each unit has a size of one sub-carrier*2 ms. PUSCH allocated to the terminal by the base station occupies 32 units, i.e., Unit1-Unit32. Positions of PUSCH transmission is shown in FIG. 20.

Figure 21:
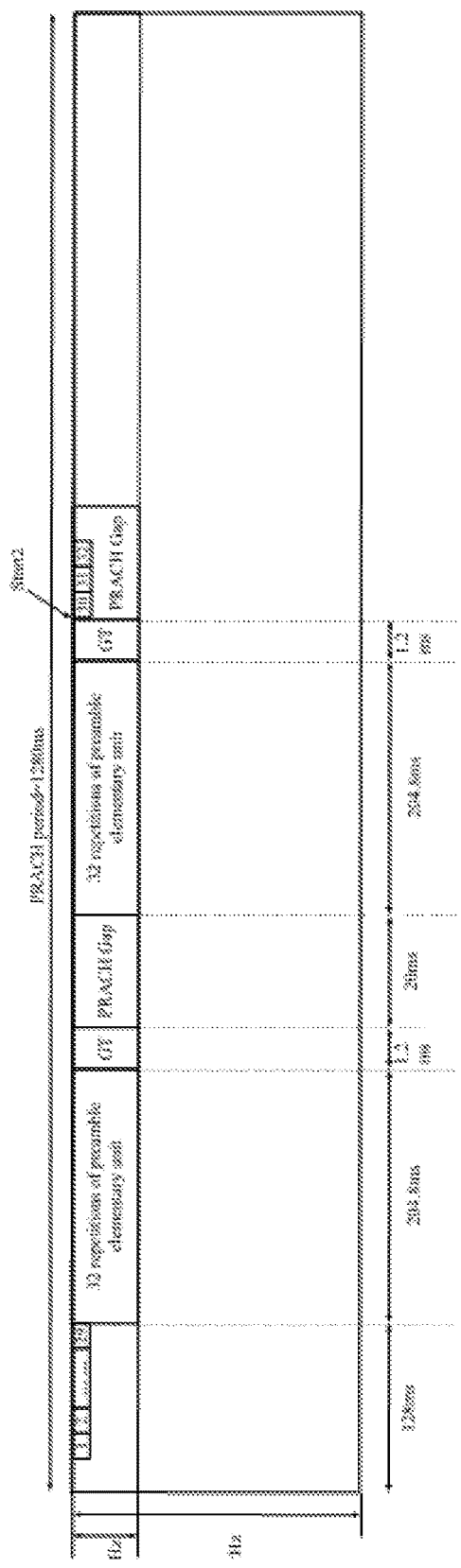
FIG. 21 is diagram 5 showing postponed PUSCH transmission according to an embodiment of the present disclosure.

Since Unit30-Unit32 in the resources for PUSCH and resources for PRACH overlap, transmission of Unit30-Unit32 is to be postponed. FIG. 21 shows the postponed PUSCH transmission. Start time of the postponed transmission of Unit30-Unit32 is Start2, which is the first timing having an integer number of milliseconds after the last GT.

Embodiment 12

Figure 22:
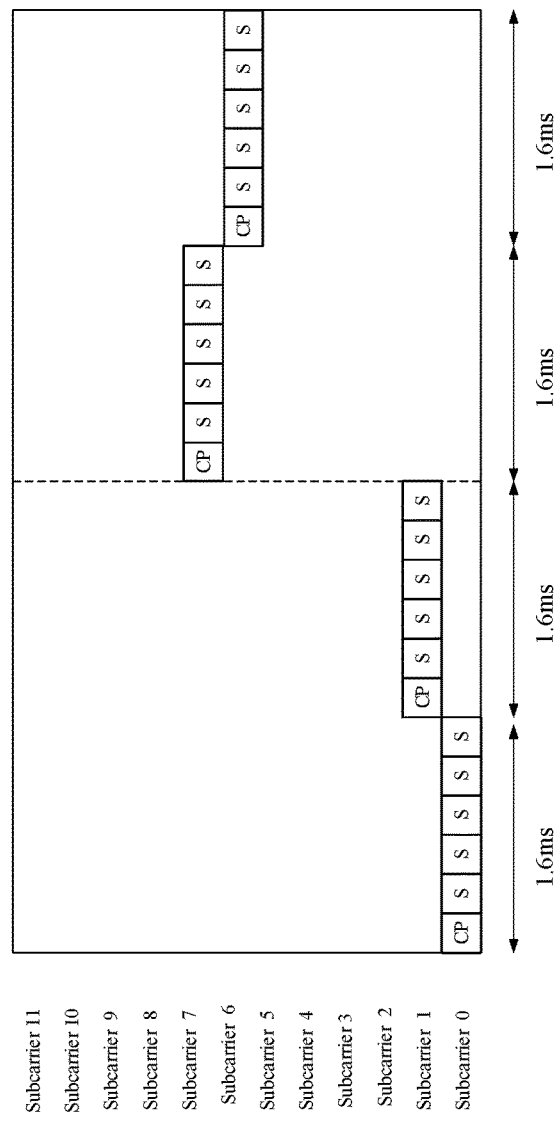
FIG. 22 is diagram 2 showing a structure of transmission of preamble elementary units according to an embodiment of the present disclosure.

In the NB-IoT system, the uplink system bandwidth is 180 kHz. As shown in FIG. 22, in this embodiment, the uplink bandwidth occupied by a random access channel (PRACH) configured by the base station is 45 kHz., a PRACH sub-carrier spacing $\Delta f$ is 3.75 kHz, and a total of 12 PRACH sub-carriers are configured, i.e., Subcarrier0~Subcarrier11.

The $Group_1$~$Group_4$ are defined as elementary units that form a preamble of random access signal. $Group_1$~$Group_4$ are transmitted over different sub-carriers Each Group includes one cyclic prefix (CP) and five Preamble symbols, and one Preamble symbol has a time-domain symbol length of $$T_k = \frac{1}{\Delta f} = 0.2667 \text{ ms.}$$

When CP has a length of 0.2667 ms, each Group has a length of 0.2667+0.2667*5=1.6 ms, and Unit has a length of 1.6*4=6.4 ms.

When CP has a length of 0.0667 ms, each Group has a length of 0.0667+0.2667*5=1.4 ms, and Unit has a length of 1.4*4=5.6 ms.

In this embodiment, CP has a length of 0.2667 ms, and then Unit has a length of 6.4 ms.

Indices of sub-carriers corresponding to $Group_2$, $Group_3$ and $Group_4$ can be determined based on an index of a sub-carrier corresponding to $Group_1$. When a terminal selects Subcarrier0 for transmitting $Group_1$, $Group_2$ is transmitted over Subcarrier1, $Group_3$ is transmitted over Subcarrier7, and $Group_4$ is transmitted over Subcarrier6, as shown in FIG. 22.

A time length T_Unit1 of elementary units of a random access signal (Preamble) is 6.4 ms.

A random access signal (Preamble) transmitted in PRACH can have a transmission period of 1280 ms.

A start position offset of transmitting the preamble is 128 ms.

A number, R1, of repetitive transmissions of elementary units of transmitting the preamble is selected from {1, 2, 4, 8, 16, 32, 64, 128}. In this embodiment, R1=64.

Guard Time, GT1, for transmitting the preamble is 1.2 ms, i.e., GT1=1.2 ms.

In this embodiment, 64 repetitive transmissions of elementary units of transmitting the preamble have a total length of 409.6 ms.

Figure 23:
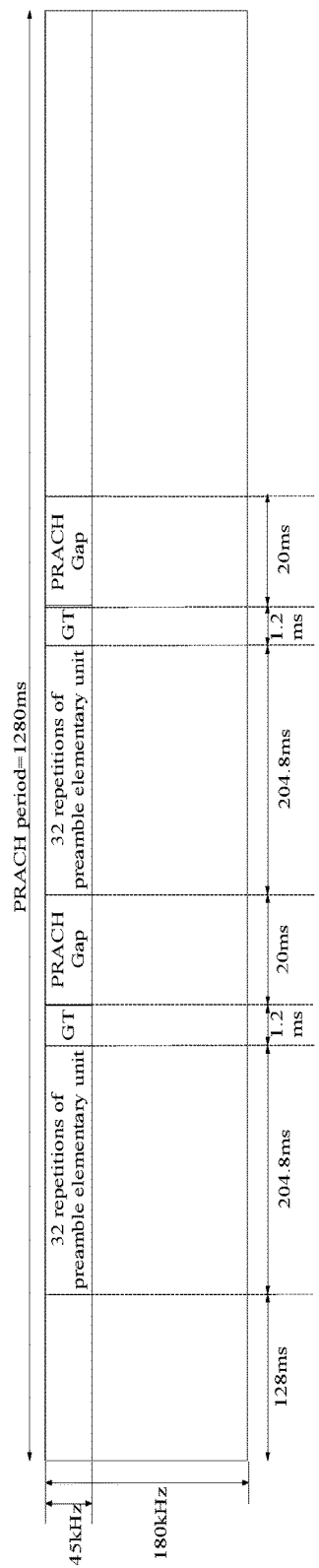
FIG. 23 is diagram 8 showing a structure of 64 repetitive transmissions of preamble elementary units according to an embodiment of the present disclosure.

When the number of repetitive transmissions of elementary units of transmitting the preamble is larger than R1set, after R1set transmissions of elementary units of Preamble are completed, it is needed to introduce a transmission gap, Gap1, for Preamble. During Gap1, Preamble is not transmitted. In this embodiment, R1set=32, Gap1=20 ms, and then a structure of the 64 repetitive transmissions of elementary units of Preamble is illustrated in FIG. 23. A time length, T_Length1, of the 64 repetitive transmissions of elementary units of Preamble can be calculated as the following formula:

$$T\_Length1 = \sum_{j=1}^{j=Num}(T\_Unit1 \times R1\_subset_j + GT1_j + Gap1_j),$$

where Num=R1/R1set=64/32=2;
$R1\_subset_j$=R1set, where j=1~Num; and
$Gap1_j$=Gap1, where j=1~Num.

Figure 24:
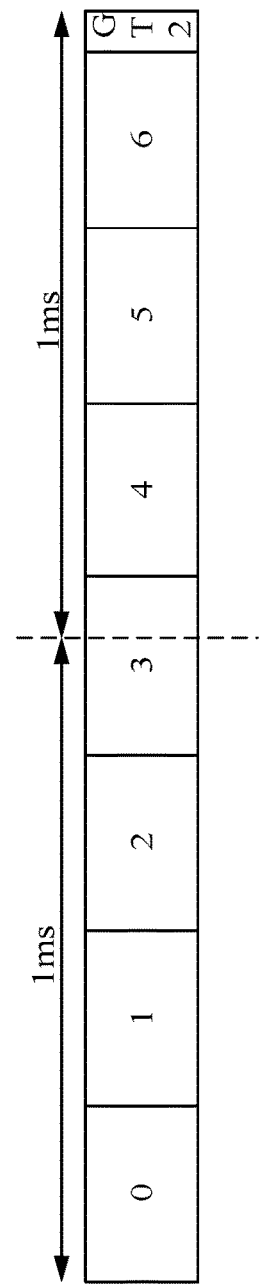
FIG. 24 is diagram 1 showing a slot structure according to an embodiment of the present disclosure.

When a time length of transmission of the uplink traffic channel (PUSCH) is larger than or equal to X slots, it is needed to introduce a transmission gap, Gap2, of PUSCH. Gap2 has a length of Y slots. During Gap2, PUSCH is not transmitted. When a sub-carrier spacing used by PUSCH is 3.75 kHz, a slot has a length of 2 ms. FIG. 24 shows a slot structure. As shown, one slot contains 7 symbols (symbol0-symbol6) and one guard time GTs. In this embodiment, X=100 and Y=10.

The uplink traffic channel (PUSCH) configured for a terminal by the base station is transmitted by using a single sub-carrier. A sub-carrier spacing is 3.75 kHz.

The uplink traffic channel (PUSCH) configured for a terminal by the base station is transmitted can occupy one resource unit (RU). Each RU has a size of one sub-carrier*32 ms. That is, a time-domain length of RU is 16slots. In this embodiment, PUSCH requires 8 repetitive transmissions, that is, a time-domain length of PUSCH transmission is 16*8=128slots.

Figure 25:
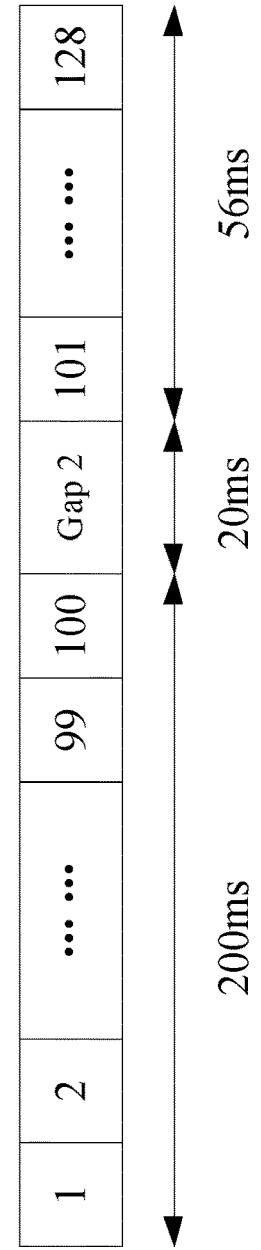
FIG. 25 is diagram 1 showing a structure of transmission of PUSCH according to an embodiment of the present disclosure.

In this embodiment, since the time-domain length of PUSCH transmission is larger than X=100slots, it is needed to introduce a transmission gap, Gap2, of PUSCH. Gap2 has a length of Y=10slots. FIG. 25 shows a structure of PUSCH transmission.

Figure 26:
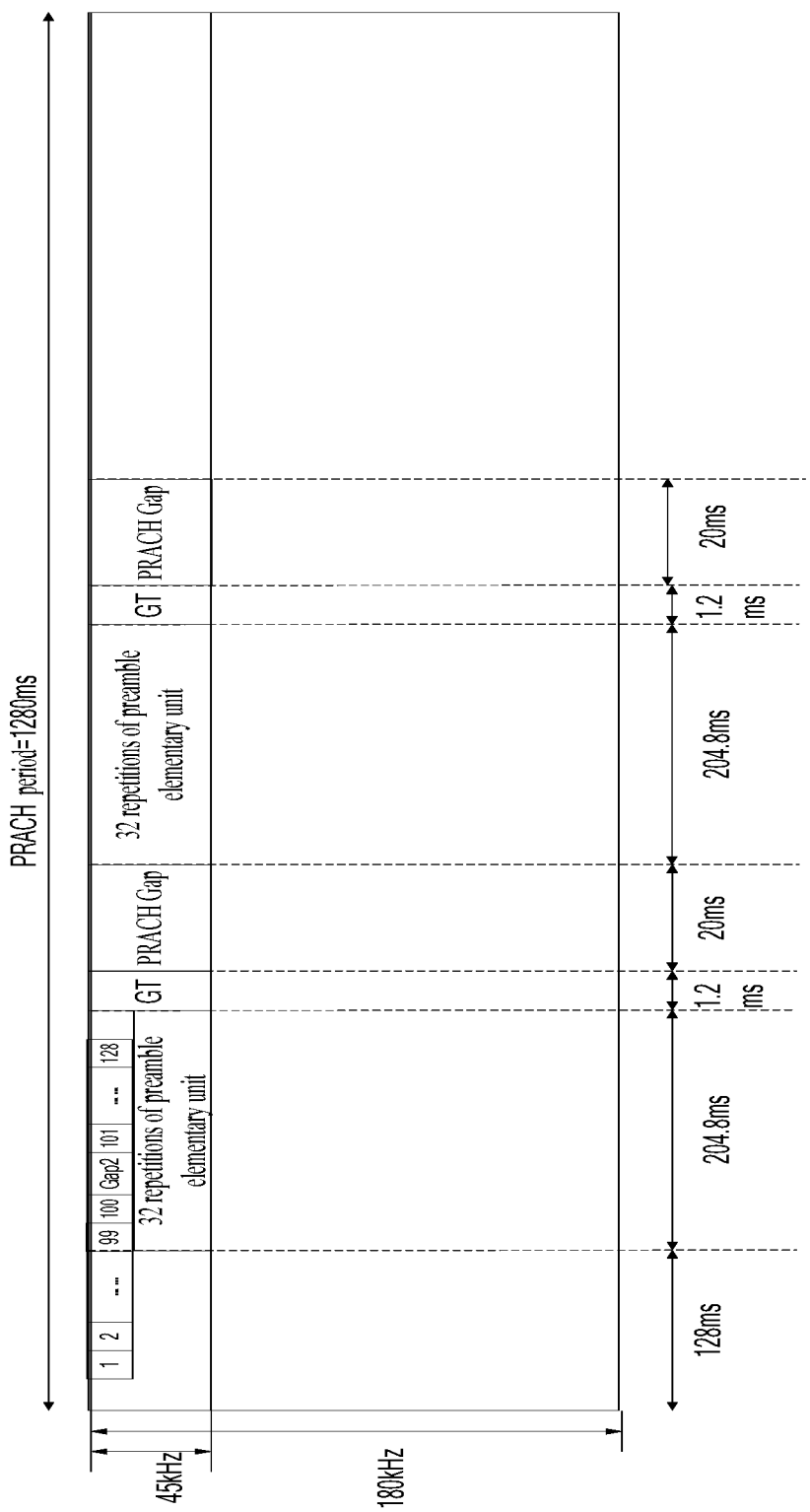
FIG. 26 is diagram 1 showing resources occupied by PUSCH and PARCH transmissions according to an embodiment of the present disclosure.

In this embodiment, resources occupied by PUSCH and PARCH transmissions are illustrated in FIG. 26.

Figure 27:
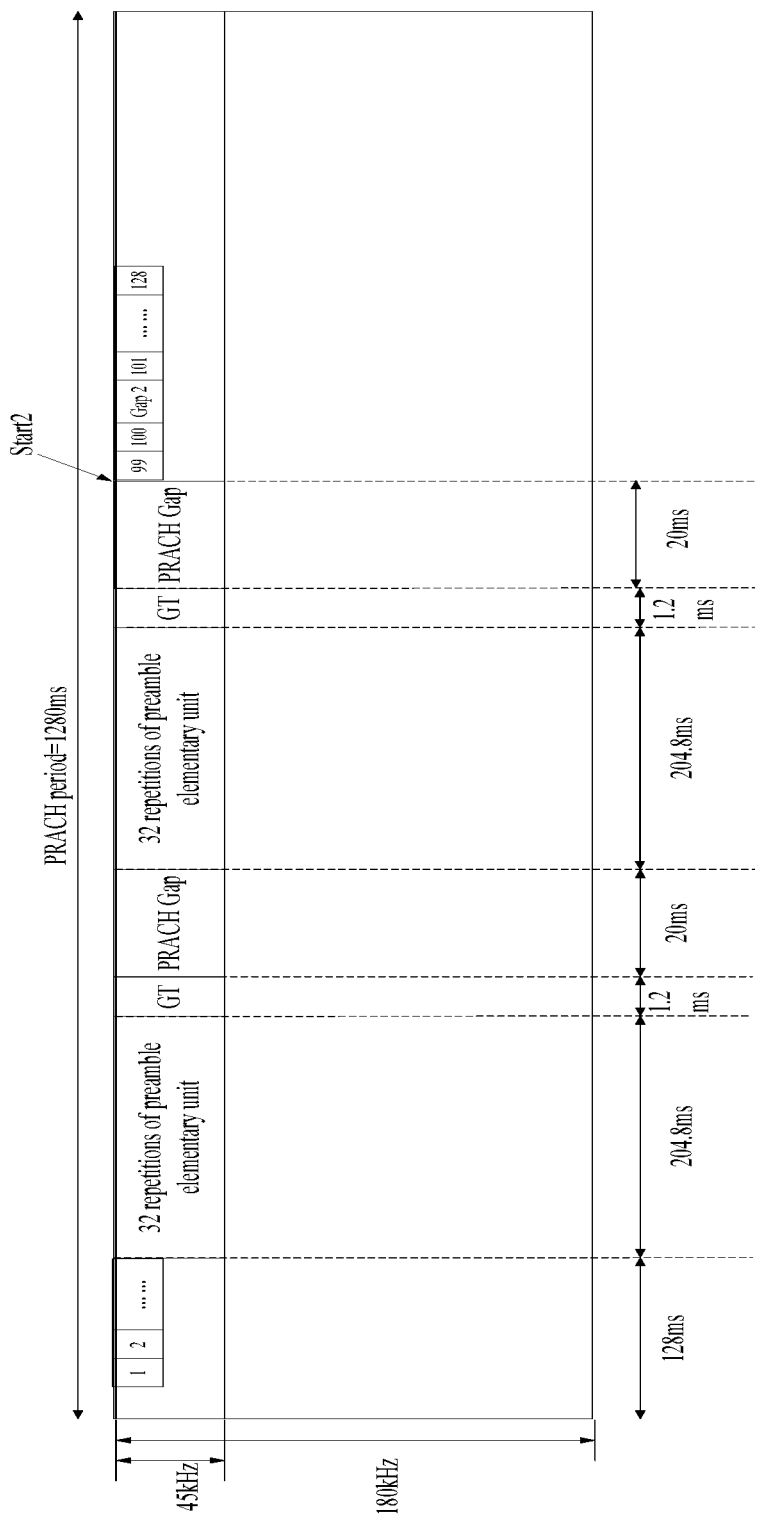
FIG. 27 is diagram 6 showing postponed PUSCH transmission according to an embodiment of the present disclosure.

Since slot99-slot128 in the resources for PUSCH and resources for PRACH overlap, transmission of slot99-slot128 is to be postponed. FIG. 27 shows the postponed PUSCH transmission. Start time of the postponed transmission of slot99-slot128 is Start2, where Start2=m+k, m is an index of a slot in which the last PRACH gap ends, and k=1. That is, Start2 is start time of the first slot after the last PRACH gap.

Figure 28:
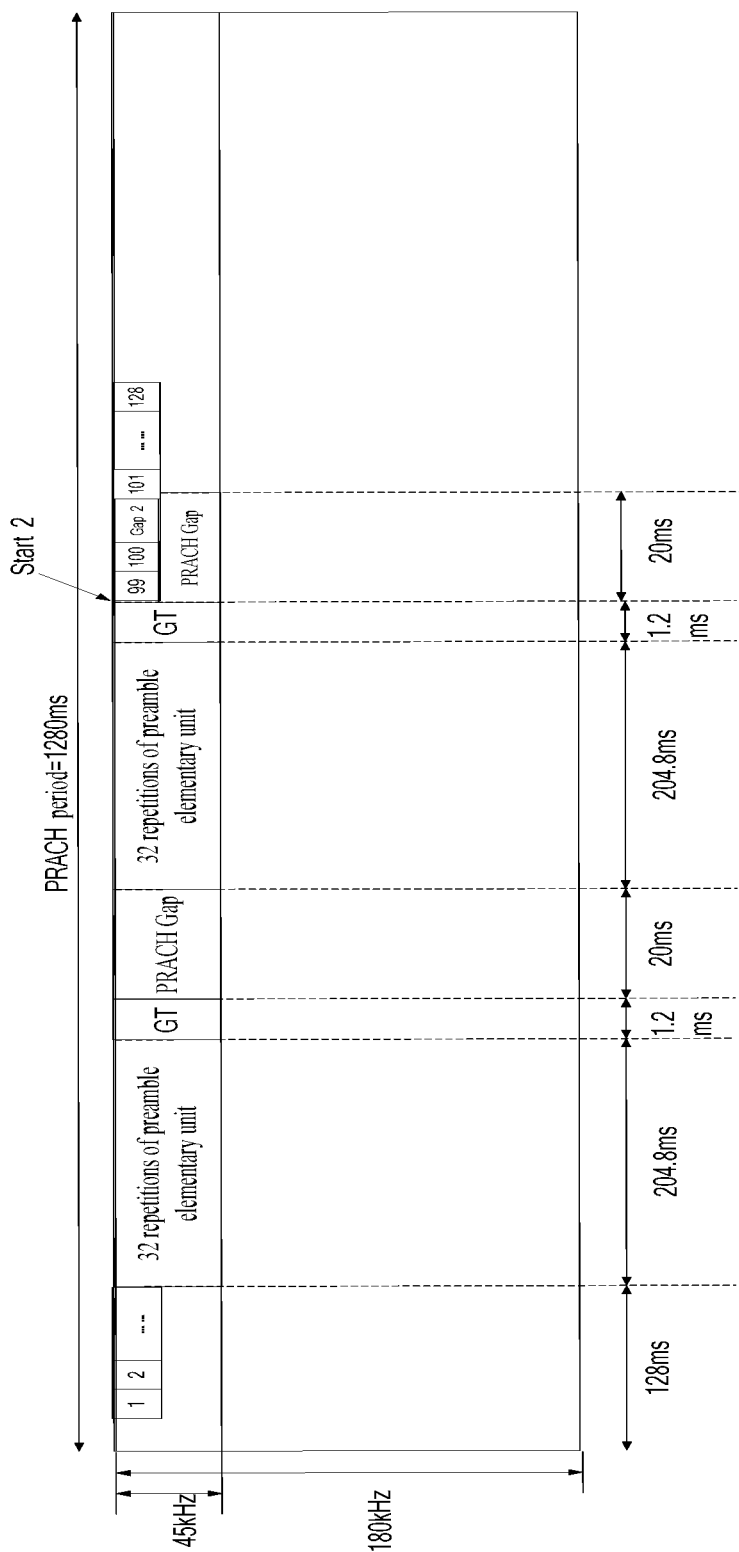
FIG. 28 is diagram 1 showing postponed transmission of slot99~slot128 according to an embodiment of the present disclosure.

In addition to this embodiment, FIG. 28 shows postponed transmission of slot99-slot128. As shown, start time of the postponed transmission of slot99-slot128 is Start2, which is start time of the first slot after the last GT.

Embodiment 13

Figure 29:
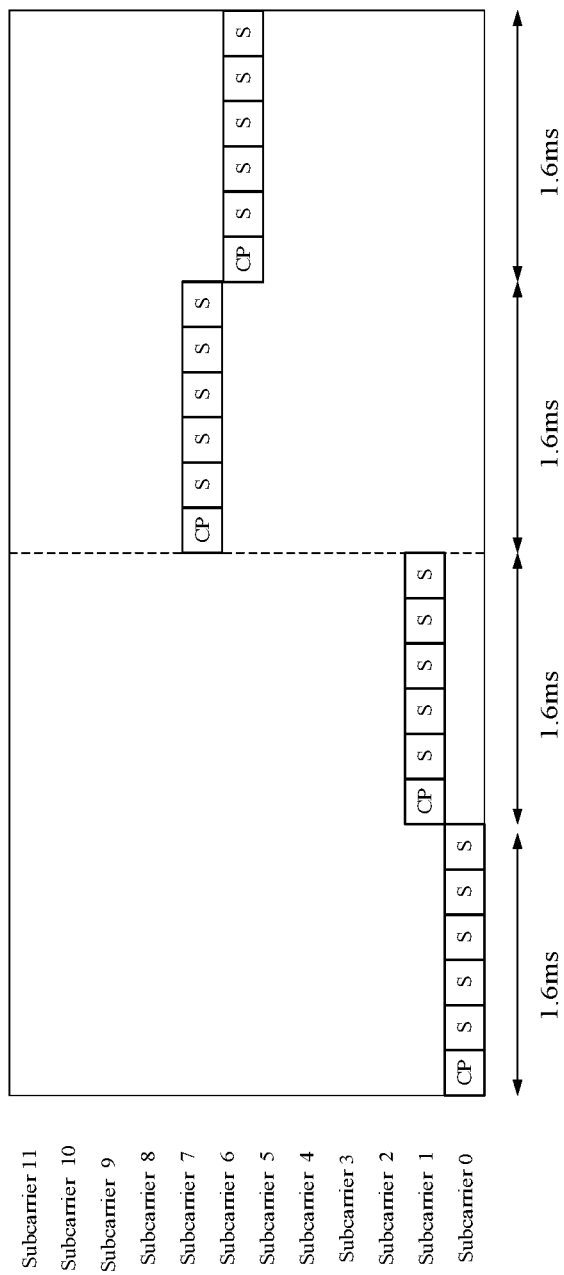
FIG. 29 is diagram 3 showing a structure of transmission of preamble elementary units according to an embodiment of the present disclosure.

In the NB-IoT system, the uplink system bandwidth is 180 kHz. As shown in FIG. 29, in this embodiment, the uplink bandwidth occupied by a random access channel (PRACH) configured by the base station is 45 kHz, a PRACH sub-carrier spacing $\Delta f$ is 3.75 kHz, and a total of 12 PRACH sub-carriers are configured, i.e., Subcarrier0~Subcarrier11.

$Group_1$~$Group_4$ are defined as elementary units that form a random access signal (Preamble). $Group_1$~$Group_4$ are transmitted over different sub-carriers Each Group includes one cyclic prefix (CP) and five Preamble symbols, and one Preamble symbol has a time-domain symbol length of $$T_k = \frac{1}{\Delta f} = 0.2667 \text{ ms.}$$

When CP has a length of 0.2667 ms, each Group has a length of 0.2667+0.2667*5=1.6 ms, and Unit has a length of 1.6*4=6.4 ms.

When CP has a length of 0.0667 ms, each Group has a length of 0.0667+0.2667*5=1.4 ms, and Unit has a length of 1.4*4=5.6 ms.

In this embodiment, CP has a length of 0.2667 ms, and then Unit has a length of 6.4 ms.

Indices of sub-carriers corresponding to Group$_2$, Group$_3$ and Group$_4$ can be determined based on an index of a sub-carrier corresponding to Group$_1$. When a terminal selects Subcarrier0 for transmitting Group$_1$, Group$_2$ is transmitted over Subcarrier1, Group$_3$ is transmitted over Subcarrier7, and Group$_4$ is transmitted over Subcarrier6, as shown in FIG. 29.

A time length T_Unit1 of elementary units of a random access signal (Preamble) is 6.4 ms.

A random access signal (Preamble) transmitted in PRACH can have a transmission period of 1280 ms.

A start position offset of transmitting the preamble is 128 ms.

A number, R1, of repetitive transmissions of elementary units of transmitting the preamble is selected from {1, 2, 4, 8, 16, 32, 64, 128}. In this embodiment, R1=64.

Guard Time, GT1, for transmitting the preamble is 1.2 ms, i.e., GT1=1.2 ms.

In this embodiment, 64 repetitive transmissions of elementary units of transmitting the preamble have a total length of 409.6 ms.

Figure 30:
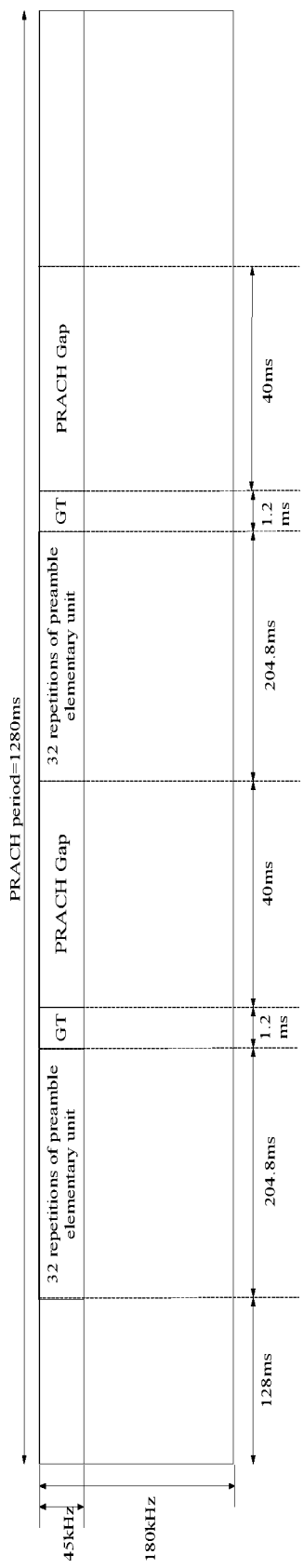
FIG. 30 is diagram 9 showing a structure of 64 repetitive transmissions of preamble elementary units according to an embodiment of the present disclosure.

When the number of repetitive transmissions of elementary units of transmitting the preamble is larger than R1set, after R1set transmissions of elementary units of Preamble are completed, it is needed to introduce a transmission gap, Gap1, for Preamble. During Gap1, Preamble is not transmitted. In this embodiment, R1set=32, Gap1=40 ms, and then a structure of the 64 repetitive transmissions of elementary units of Preamble is illustrated in FIG. 30. A time length, T_Length1, of the 64 repetitive transmissions of elementary units of Preamble can be calculated as the following formula:

$$T\_Length1 = \Sigma_{j=1}^{j=Num}(T\_Unit1 \times R1\_subset_j + GT1_j + Gap1_j),$$

where Num=R1/R1set=64/32=2;
R1_subset$_j$=R1set, where j=1~Num; and
Gap1$_j$=Gap1, where j=1~Num.

Figure 31:
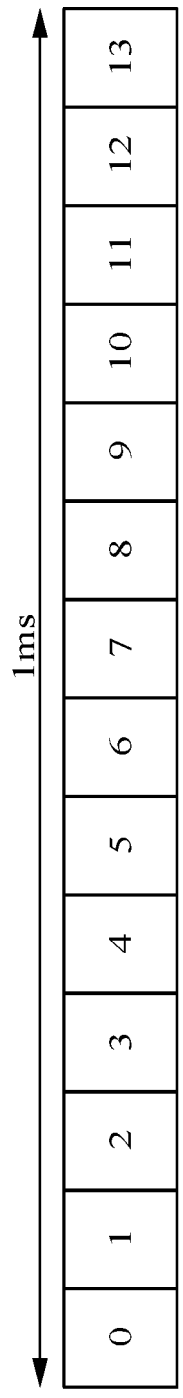
FIG. 31 is diagram2 showing a slot structure according to an embodiment of the present disclosure.

When a time length of transmission of the uplink traffic channel (PUSCH) is larger than or equal to X slots, it is needed to introduce a transmission gap, Gap2, of PUSCH. Gap2 has a length of Y slots. During Gap2, PUSCH is not transmitted. When a sub-carrier spacing used by PUSCH is 15 kHz, a slot has a length of 1 ms. FIG. 31 shows a slot structure. As shown, one slot contains 14 symbols (symbol0-symbol13). In this embodiment, X=100 and Y=20.

The physical uplink shared channel (PUSCH) configured for a terminal by the base station is transmitted by using a single sub-carrier. A sub-carrier spacing is 15 kHz.

The physical uplink shared channel (PUSCH) configured for a terminal by the base station is transmitted can occupy one resource unit (RU). Each RU has a size of one sub-carrier*8 ms. That is, a time-domain length of RU is 8slots. In this embodiment, PUSCH requires 16repetitive transmissions, that is, a time-domain length of PUSCH transmission is 8*16=128slots.

Figure 32:
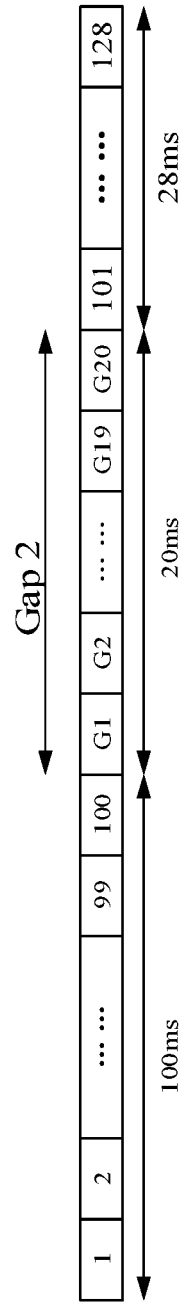
FIG. 32 is diagram 2 showing a structure of transmission of PUSCH according to an embodiment of the present disclosure.

In this embodiment, since the time-domain length of PUSCH transmission is larger than X=100 slots, it is needed to introduce a transmission gap, Gap2, of PUSCH. Gap2 has a length of Y=20 slots. FIG. 32 shows a structure of PUSCH transmission.

Figure 33:
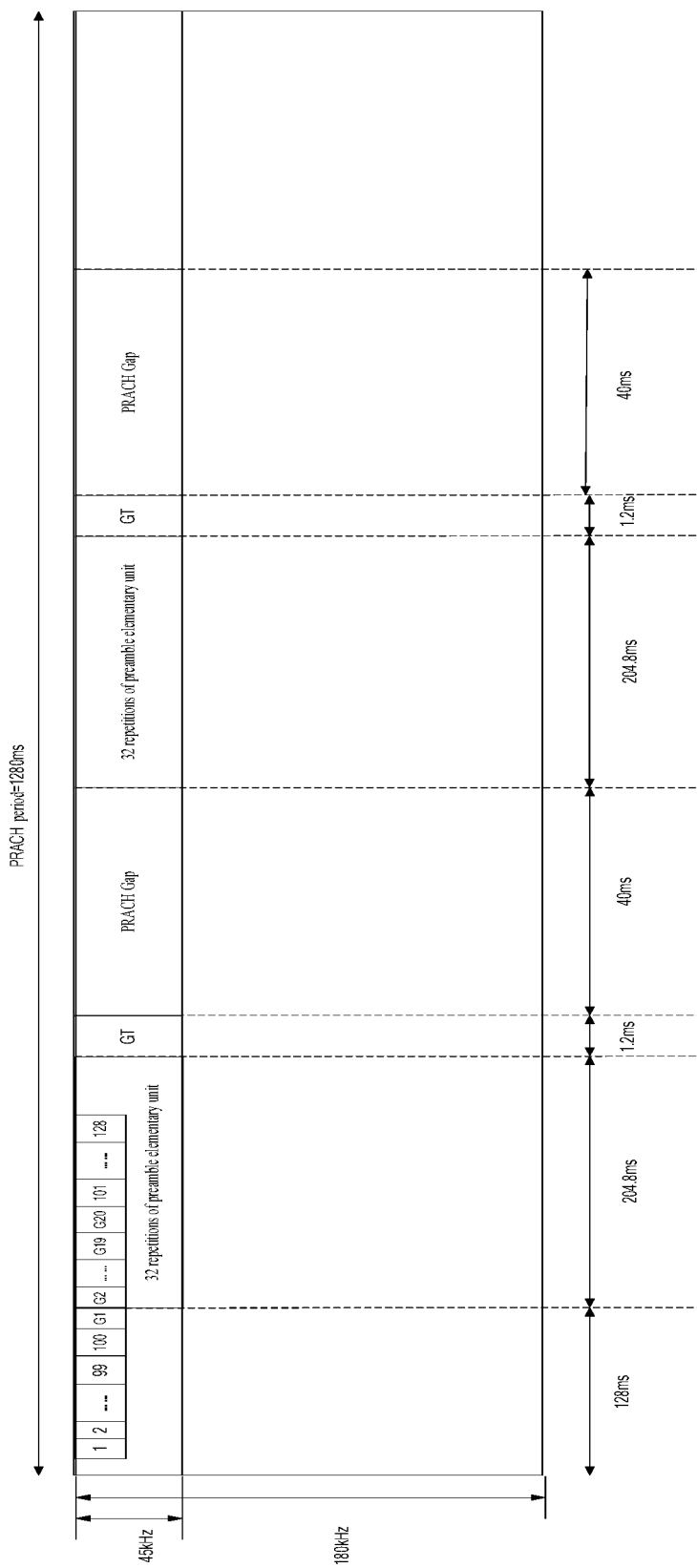
FIG. 33 is diagram 2 showing resources occupied by PUSCH and PARCH transmissions according to an embodiment of the present disclosure.

In this embodiment, resources occupied by PUSCH and PARCH transmissions are illustrated in FIG. 33.

Figure 34:
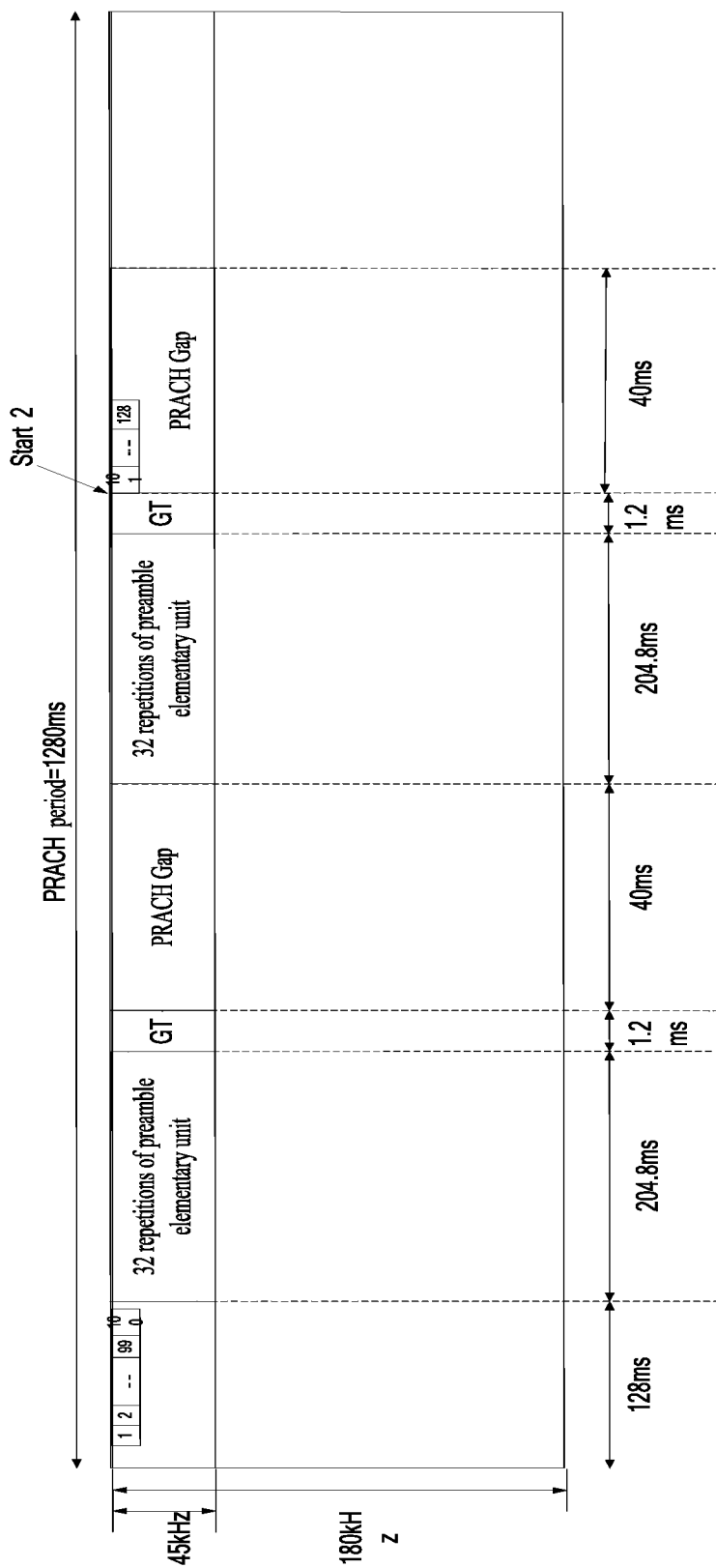
FIG. 34 is diagram 7 showing postponed PUSCH transmission according to an embodiment of the present disclosure.

Since slot101-slot128 in the resources for PUSCH and resources for PRACH overlap, transmission of slot101-slot128 is to be postponed. FIG. 34 shows the postponed PUSCH transmission. Start time of the postponed transmission of slot101-slot128 is Start2, which is the first timing having an integer number of milliseconds after the last GT or is start time of the first slot after the last GT.

Figure 35:
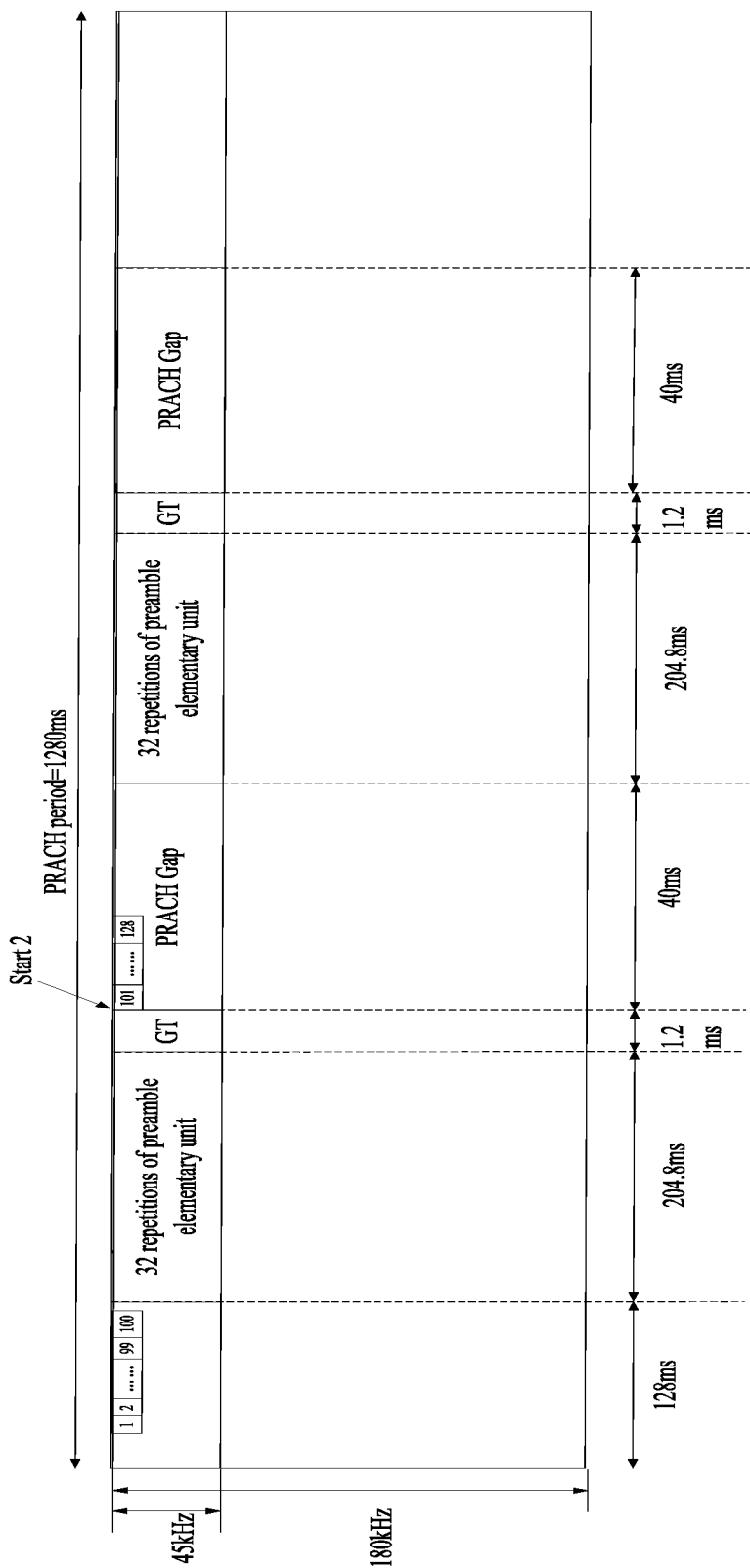
FIG. 35 is diagram 2 showing postponed transmission of slot99~slot128 according to an embodiment of the present disclosure.

In addition to this embodiment, FIG. 35 shows postponed transmission of slot101-slot128. As shown, start time of the postponed transmission of slot101-slot128 is Start2, which is the first timing having an integer number of milliseconds after the first GT or is start time of the first slot after the first GT.

Embodiment 14

Figure 36:
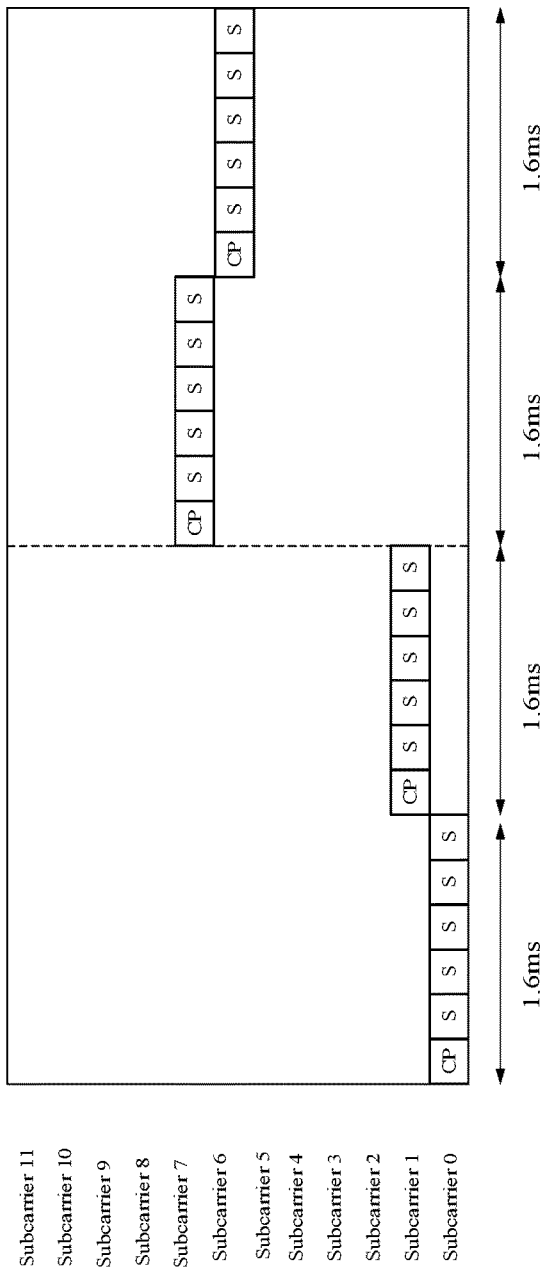
FIG. 36 is diagram 4 showing a structure of transmission of preamble elementary units according to an embodiment of the present disclosure.

In the NB-IoT system, the uplink system bandwidth is 180 kHz. As shown in FIG. 36, in this embodiment, the uplink bandwidth occupied by a random access channel (PRACH) configured by the base station is 45 kHz, a PRACH sub-carrier spacing Δf is 3.75 kHz, and a total of 12 PRACH sub-carriers are configured, i.e., Subcarrier0~Subcarrier11.

Group$_1$~Group$_4$ are defined as elementary units that form a random access signal (Preamble). Group$_1$~Group$_4$ are transmitted over different sub-carriers Each Group includes one cyclic prefix (CP) and five Preamble symbols, and one Preamble symbol has a time-domain symbol length of $$T_k = \frac{1}{\Delta f} = 0.2667 \text{ ms}.$$

When CP has a length of 0.2667 ms, each Group has a length of 0.2667+0.2667*5=1.6 ms, and Unit has a length of 1.6*4=6.4 ms.

When CP has a length of 0.0667 ms, each Group has a length of 0.0667+0.2667*5=1.4 ms, and Unit has a length of 1.4*4=5.6 ms.

In this embodiment, CP has a length of 0.2667 ms, and then Unit has a length of 6.4 ms.

Indices of sub-carriers corresponding to Group$_2$, Group$_3$ and Group$_4$ can be determined based on an index of a sub-carrier corresponding to Group$_1$. When a terminal selects Subcarrier0 for transmitting Group$_1$, Group$_2$ is transmitted over Subcarrier1, Group$_3$ is transmitted over Subcarrier7, and Group$_4$ is transmitted over Subcarrier6, as shown in FIG. 36.

A time length T_Unit1 of elementary units of a random access signal (Preamble) is 6.4 ms.

A random access signal (Preamble) transmitted in PRACH can have a transmission period of 1280 ms.

A start position offset of transmitting the preamble is 128 ms.

A number, R1, of repetitive transmissions of elementary units of transmitting the preamble is selected from {1, 2, 4, 8, 16, 32, 64, 128}. In this embodiment, R1=64.

Guard Time, GT1, for transmitting the preamble is 1.2 ms, i.e., GT1=1.2 ms.

In this embodiment, 64 repetitive transmissions of elementary units of transmitting the preamble have a total length of 409.6 ms.

Figure 37:
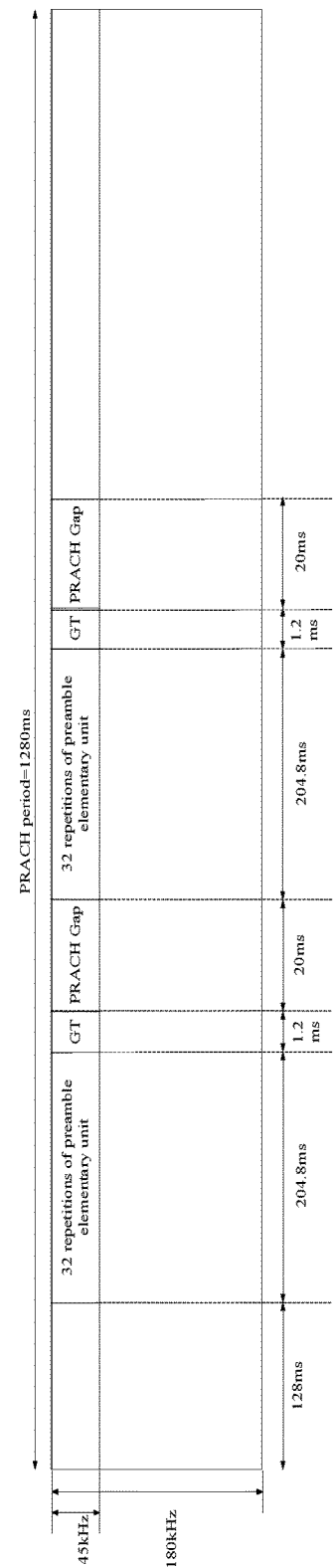
FIG. 37 is diagram 10 showing a structure of 64 repetitive transmissions of preamble elementary units according to an embodiment of the present disclosure.

When the number of repetitive transmissions of elementary units of transmitting the preamble is larger than R1set, after R1set transmissions of elementary units of Preamble are completed, it is needed to introduce a transmission gap, Gap1, for Preamble. During Gap1, Preamble is not transmitted. In this embodiment, R1set=32, Gap1=20 ms, and then a structure of the 64 repetitive transmissions of elementary units of Preamble is illustrated in FIG. 37. A time length, T_Length1, of the 64 repetitive transmissions of elementary units of Preamble can be calculated as the following formula:

$$T\_Length1 = \Sigma_{j=1}^{j=Num}(T\_Unit1 \times R1\_subset_j + GT1_j + Gap1_j),$$

where Num=R1/R1set=64/32=2;
R1_subset$_j$=R1set, where j=1~Num; and
Gap1$_j$=Gap1, where j=1~Num.

Figure 38:
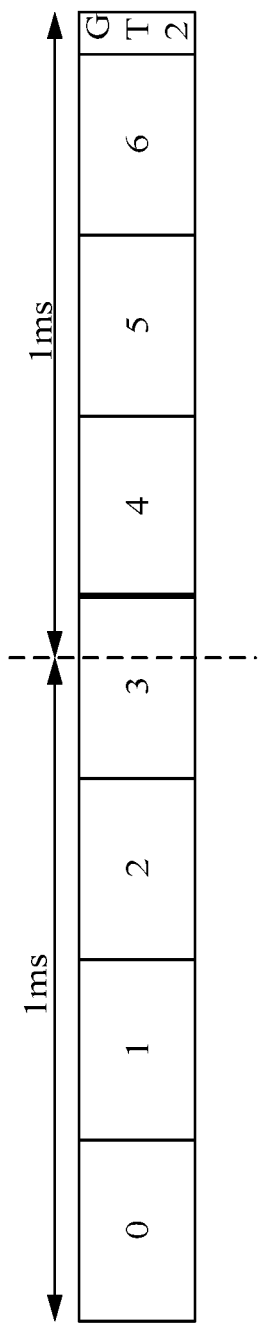
FIG. 38 is diagram 3 showing a slot structure according to an embodiment of the present disclosure.

When a time length of transmission of the uplink physical shared channel (PUSCH) is larger than or equal to X slots, it is needed to introduce a transmission gap, Gap2, of PUSCH. Gap2 has a length of Y slots. During Gap2, PUSCH is not transmitted. When a sub-carrier spacing used by PUSCH is 3.75 kHz, a slot has a length of 2 ms. FIG. 38 shows a slot structure. As shown, one slot contains 7 symbols (symbol0-symbol6). In this embodiment, X=100 and Y=10.

The uplink physical shared channel (PUSCH) configured for a terminal by the base station is transmitted by using a single sub-carrier. A sub-carrier spacing is 3.75 kHz.

The uplink physical shared channel (PUSCH) configured for a terminal by the base station is transmitted can occupy one resource unit (RU). Each RU has a size of one sub-carrier*32 ms. That is, a time-domain length of RU is 8slots. In this embodiment, PUSCH requires 8repetitive transmissions, that is, a time-domain length of PUSCH transmission is 16*8=128slots.

Figure 39:
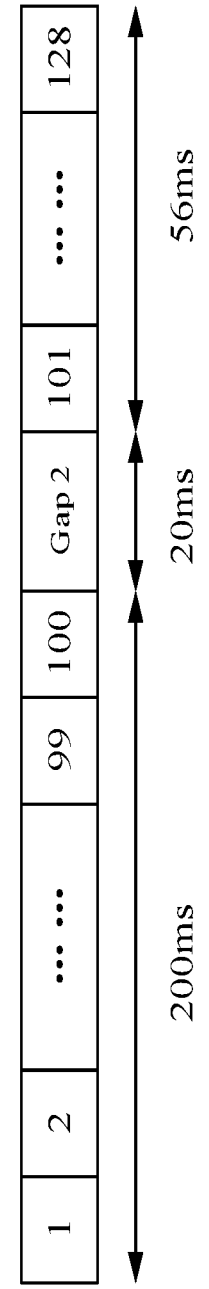
FIG. 39 is diagram3 showing a structure of transmission of PUSCH according to an embodiment of the present disclosure.

In this embodiment, since the time-domain length of PUSCH transmission is larger than X=100slots, it is needed to introduce a transmission gap, Gap2, of PUSCH. Gap2 has a length of Y=10slots. FIG. 39 shows a structure of PUSCH transmission.

Figure 40:
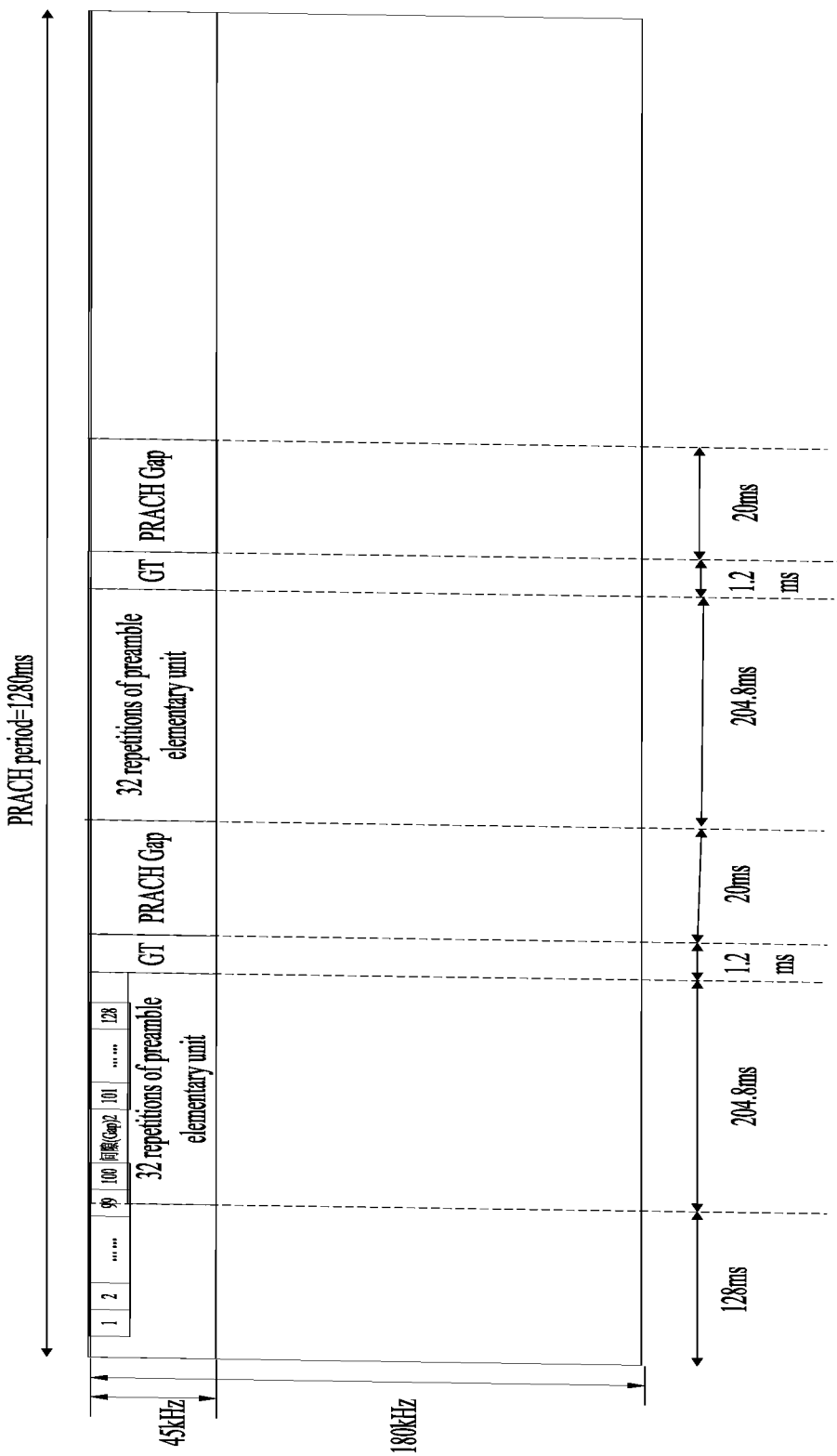
FIG. 40 is diagram 3 showing resources occupied by PUSCH and PARCH transmissions according to an embodiment of the present disclosure.

In this embodiment, resources occupied by PUSCH and PARCH transmissions are illustrated in FIG. 40.

Figure 41:
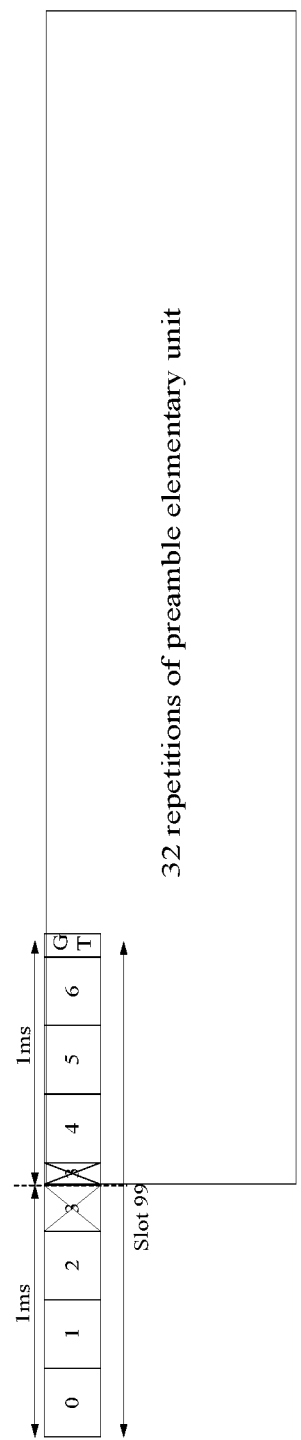
FIG. 41 is a diagram showing overlapping between slot99 and PRACH resources according to an embodiment of the present disclosure.
Figure 42:
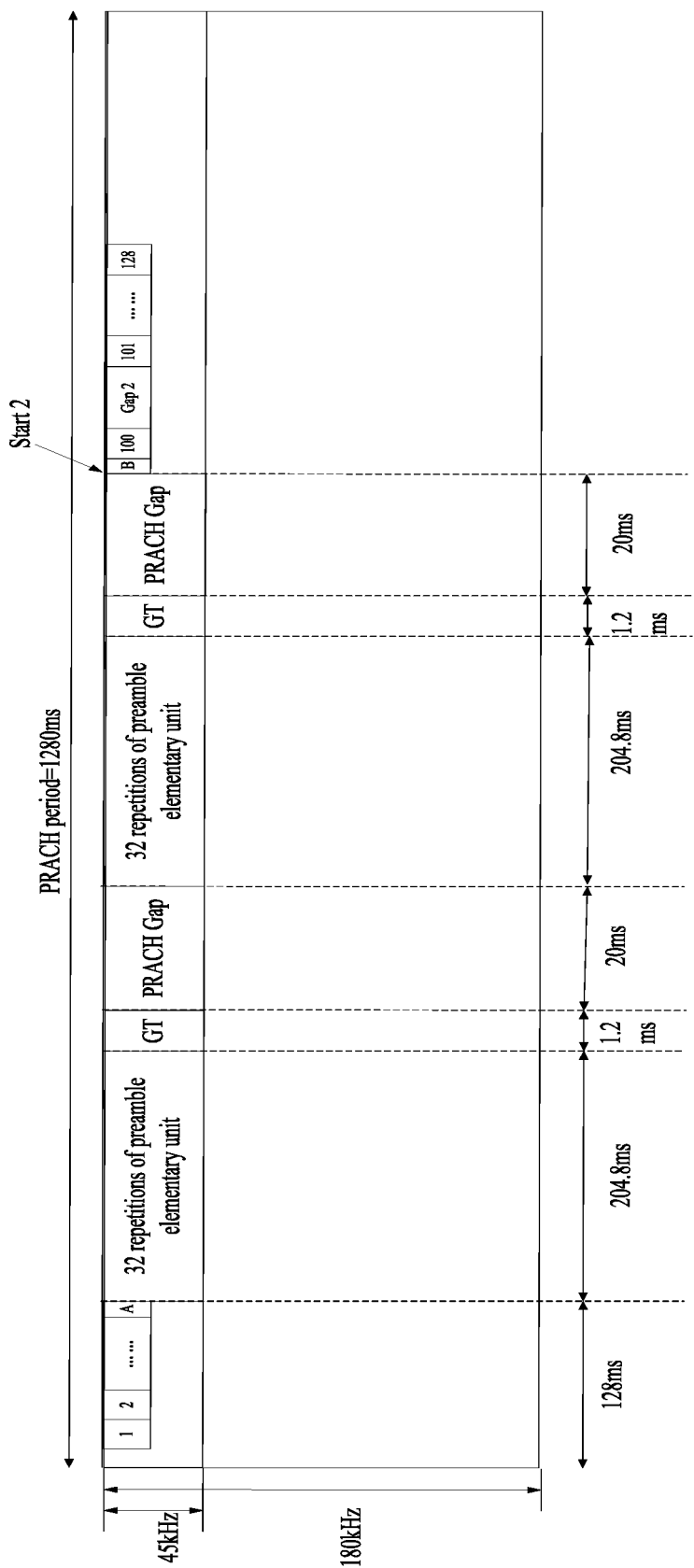
FIG. 42 is diagram 8 showing postponed PUSCH transmission according to an embodiment of the present disclosure.

Since slot100-slot128 in the resources for PUSCH and resources for PRACH overlap and half of slot99 and resources for PRACH overlap, as illustrated in FIG. 41, transmission of the second half of slot99 and slot100-slot128 is to be postponed. FIG. 42 shows the postponed PUSCH transmission. Start time of the postponed transmission of the second half of slot99 and slot100-slot128 is Start2, which is the first timing having an integer number of milliseconds after the last PRACH Gap.

In FIG. 42, Slot A has the same structure as that of the first 1 ms of slot99 as shown in FIG. 41, and symbol 3 is not transmitted.

In FIG. 42, Slot B has the same structure as that of the second 1 ms of slot99 as shown in FIG. 41, and symbol 3 is not transmitted.

Embodiment 15

When resources for PUSCH and resources for PRACH do not overlap, but a gap between the frequency-domain position at which the resources for PUSCH are located and the frequency-domain position at which the resources for PRACH are located is smaller than (or smaller than or equal to) A Hz, it is needed to postpone transmission of the resources for PUSCH at the same time-domain position as the resources for PRACH. The solution for postponing the transmission can be the same as those described in Embodiments 7-14.

A is a number, n, of a sub-carrier spacing, S1, of PRACH, where n is configured to be 1 or 2 by defaultor n has a value configured via signaling and selected from {10, 1, 2, 3}, or from {0, 1, 2, 4}, or from {1, 2, 3, 4}.

In this embodiment, S1=3.75 kHz.

In addition to this embodiment, A can be a number, n, of a sub-carrier spacing, S2, of PUSCH, where n is configured to be 1 or 2 by defaultor n has a value configured via signaling and selected from {0, 1, 2, 3}, or from {0, 1, 2, 4}, or from {1, 2, 3, 4}.

In this embodiment, S2=3.75 kHz.

In addition to this embodiment, A can be a number, n, of a sub-carrier spacing, S2, of PUSCH, where n is configured to be 1 or 2 by default or n has a value configured via signaling and selected from {0, 1}, or from {1, 2}.

In this embodiment, S2=15 kHz.

Embodiment 16

When resources for PUSCH and resources for PRACH partially overlap, it is needed to postpone transmission of the resources for PUSCH having the same time-domain positions as those of the resources for PRACH. The postponing is the same as those of Embodiments 7-14.

Embodiment 17

Figure 43:
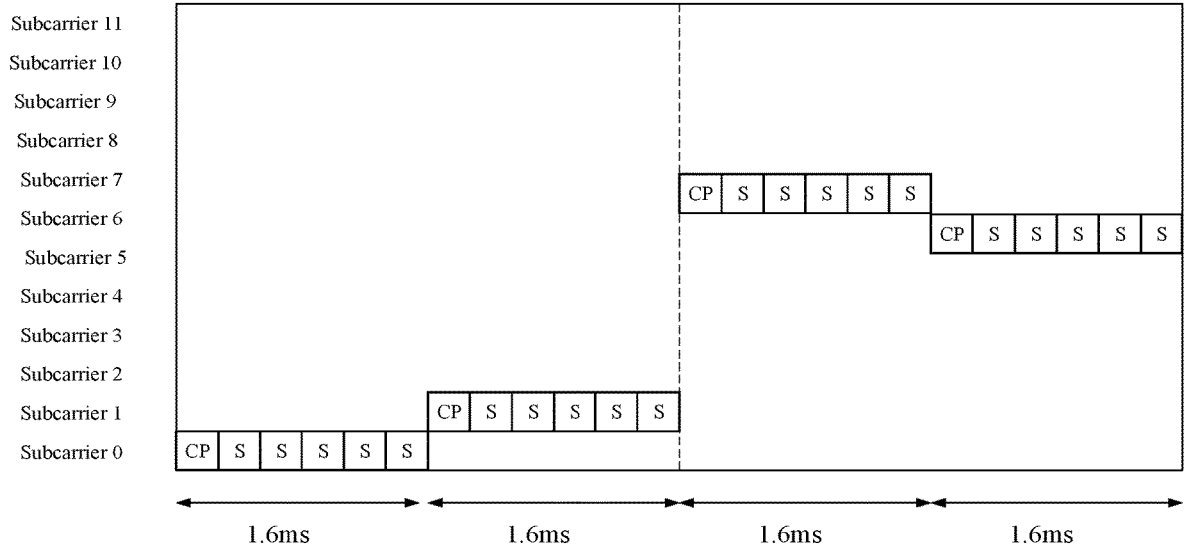
FIG. 43 is diagram 5 showing a structure of transmission of preamble elementary units according to an embodiment of the present disclosure.

In the NB-IoT system, the uplink system bandwidth is 180 kHz. As shown in FIG. 43, in this embodiment, the uplink bandwidth occupied by a random access channel (PRACH) configured by the base station is 45 kHz, a PRACH sub-carrier spacing Δf is 3.75 kHz, and a total of 12 PRACH sub-carriers are configured, i.e., Subcarrier0~Subcarrier11.

Group$_1$~Group$_4$ are defined as elementary units that form a random access signal (Preamble). Group$_1$~Group$_4$ are transmitted over different sub-carriers Each Group includes one cyclic prefix (CP) and five Preamble symbols, and one Preamble symbol has a time-domain symbol length of $$T_k = \frac{1}{\Delta f} = 0.2667 \text{ ms.}$$

When CP has a length of 0.2667 ms, each Group has a length of 0.2667+0.2667*5=1.6 ms, and Unit has a length of 1.6*4=6.4 ms.

When CP has a length of 0.0667 ms, each Group has a length of 0.0667+0.2667*5=1.4 ms, and Unit has a length of 1.4*4=5.6 ms.

In this embodiment, CP has a length of 0.2667 ms, and then Unit has a length of 6.4 ms.

Indices of sub-carriers corresponding to Group$_2$, Group$_3$ and Group$_4$ can be determined based on an index of a sub-carrier corresponding to Group$_1$. When a terminal selects Subcarrier0 for transmitting Group$_1$, Group$_2$ is transmitted over Subcarrier1, Group$_3$ is transmitted over Subcarrier7, and Group$_4$ is transmitted over Subcarrier6, as shown in FIG. 43.

A time length T_Unit1 of elementary units of a random access signal (Preamble) is 6.4 ms.

A random access signal (Preamble) transmitted in PRACH can have a transmission period of 1280 ms.

A start position offset of transmitting the preamble is 128 ms.

A number, R1, of repetitive transmissions of elementary units of transmitting the preamble is selected from {1, 2, 4, 8, 16, 32, 64, 128}. In this embodiment, R1=16.

Guard Time, GT1, for transmitting the preamble is 0.6 ms, i.e., GT1=0.6 ms.

Figure 44:
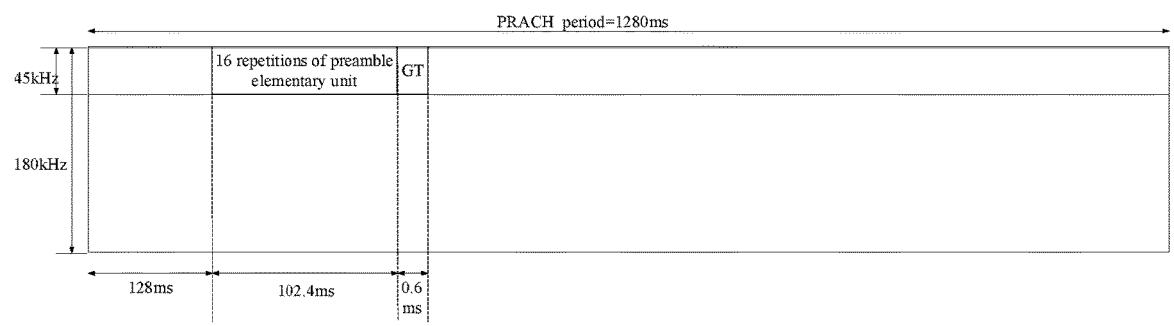
FIG. 44 is diagram 1 showing a structure of 16 repetitive transmissions of preamble elementary units according to an embodiment of the present disclosure.

In this embodiment, 16 repetitive transmissions of elementary units of transmitting the preamble have a total length of 102.4 ms, and a structure thereof is illustrated in FIG. 44.

Figure 45:
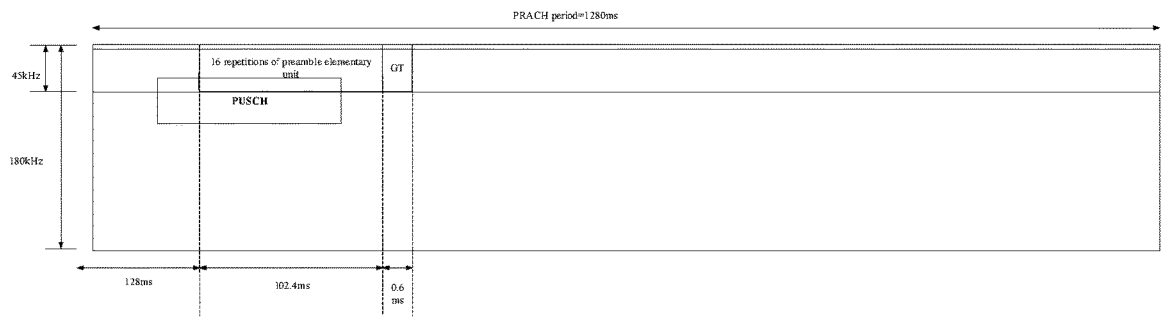
FIG. 45 is a diagram showing positions of resources for PUSCH transmission when a modulation and coding scheme for data carried in PUSCH is QPSK1/2 according to an embodiment of the present disclosure.

FIG. 45 shows positions of resources for PUSCH transmission when a modulation and coding scheme for data carried in PUSCH is QPSK1/2. As shown, the resources for PUSCH and the resources for PRACH partially overlap. In this embodiment, the portion of the resources for PUSCH that does not overlap the resources for PRACH can be used for transmission of the data carried in PUSCH. Due to the reduced amount of available resources for PUSCH, rate matching is required to adjust the modulation and coding scheme of PUSCH for the data to be carried. In this embodiment, the modulation and coding scheme can be adjusted to be QPSK3/4.

Embodiment 18

Figure 46:
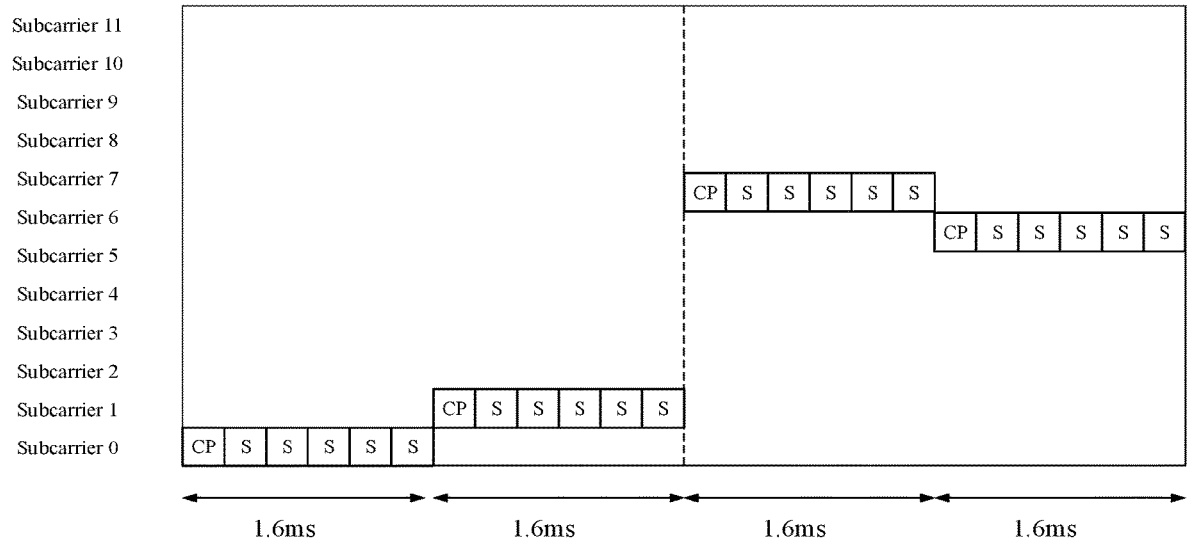
FIG. 46 is diagram 6 showing a structure of transmission of preamble elementary units according to an embodiment of the present disclosure.

In the NB-IoT system, the uplink system bandwidth is 180 kHz. As shown in FIG. 46, in this embodiment, the uplink bandwidth occupied by a random access channel (PRACH) configured by the base station is 45 kHz, a PRACH sub-carrier spacing Δf is 3.75 kHz, and a total of 12 PRACH sub-carriers are configured, i.e., Subcarrier0~Subcarrier11.

$Group_1$~$Group_4$ are defined as elementary units that form a random access signal (Preamble). $Group_1$~$Group_4$ are transmitted over different sub-carriers Each Group includes one cyclic prefix (CP) and five Preamble symbols, and one Preamble symbol has a time-domain symbol length of $$T_k = \frac{1}{\Delta f} = 0.2667 \text{ ms.}$$

When CP has a length of 0.2667 ms, each Group has a length of 0.2667+0.2667*5=1.6 ms, and Unit has a length of 1.6*4=6.4 ms.

When CP has a length of 0.0667 ms, each Group has a length of 0.0667+0.2667*5=1.4 ms, and Unit has a length of 1.4*4=5.6 ms.

In this embodiment, CP has a length of 0.2667 ms, and then Unit has a length of 6.4 ms.

Indices of sub-carriers corresponding to $Group_2$, $Group_3$ and $Group_4$ can be determined based on an index of a sub-carrier corresponding to $Group_1$. When a terminal selects Subcarrier0 for transmitting $Group_1$, $Group_2$ is transmitted over Subcarrier1, $Group_3$ is transmitted over Subcarrier7, and $Group_4$ is transmitted over Subcarrier6, as shown in FIG. 46.

A time length T_Unit1 of elementary units of a random access signal (Preamble) is 6.4 ms.

A random access signal (Preamble) transmitted in PRACH can have a transmission period of 1280 ms.

A start position offset of transmitting the preamble is 128 ms.

A number, R1, of repetitive transmissions of elementary units of transmitting the preamble is selected from {1, 2, 4, 8, 16, 32, 64, 128}. In this embodiment, R1=16.

Guard Time, GT1, for transmitting the preamble is 0.6 ms, i.e., GT1=0.6 ms.

Figure 47:
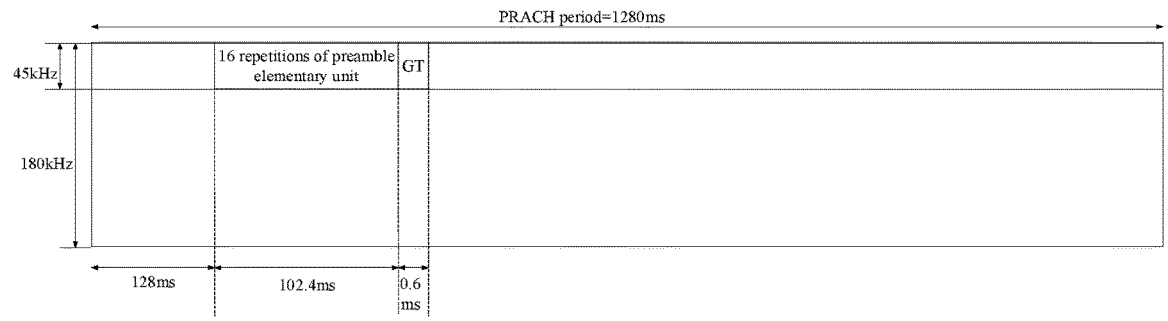
FIG. 47 is diagram 2 showing a structure of 16 repetitive transmissions of preamble elementary units according to an embodiment of the present disclosure.

In this embodiment, 16 repetitive transmissions of elementary units of transmitting the preamble have a total length of 102.4 ms, and a structure thereof is illustrated in FIG. 47.

When the modulation and coding scheme for the data carried in PUSCH is QPSK1/2, the resources for PUSCH occupy N RUs each having a size of 3sub-carriers*4 ms, with a sub-carrier spacing of 15 kHz. When the ratio of the overlapping portion between the frequency-domain bandwidth for PUSCH and the frequency-domain resources for PRACH to the frequency-domain bandwidth of the PUSCH is smaller than or equal to c %, the portion of the resources for PUSCH that does not overlap the resources for PRACH can be used for transmission of the data carried in PUSCH. Due to the reduced amount of available resources for PUSCH, rate matching is required to adjust the modulation and coding scheme of PUSCH for the data to be carried. In this embodiment, the modulation and coding scheme can be adjusted to be QPSK3/4.

When the modulation and coding scheme for the data carried in PUSCH is QPSK1/2, the resources for PUSCH occupy N RUs each having a size of 3 sub-carriers*4 ms, with a sub-carrier spacing of 15 kHz. When the ratio of the overlapping portion between the frequency-domain bandwidth for PUSCH and the frequency-domain resources for PRACH to the frequency-domain bandwidth of the PUSCH is larger than c %, it is needed to postpone transmission of the resources for PUSCH at the same time-domain position as the resources for PRACH (over all the frequency-domain resources for PUSCH). The solution for postponing the transmission can be the same as those described in Embodiments 7-14.

Embodiment 19

Figure 48:
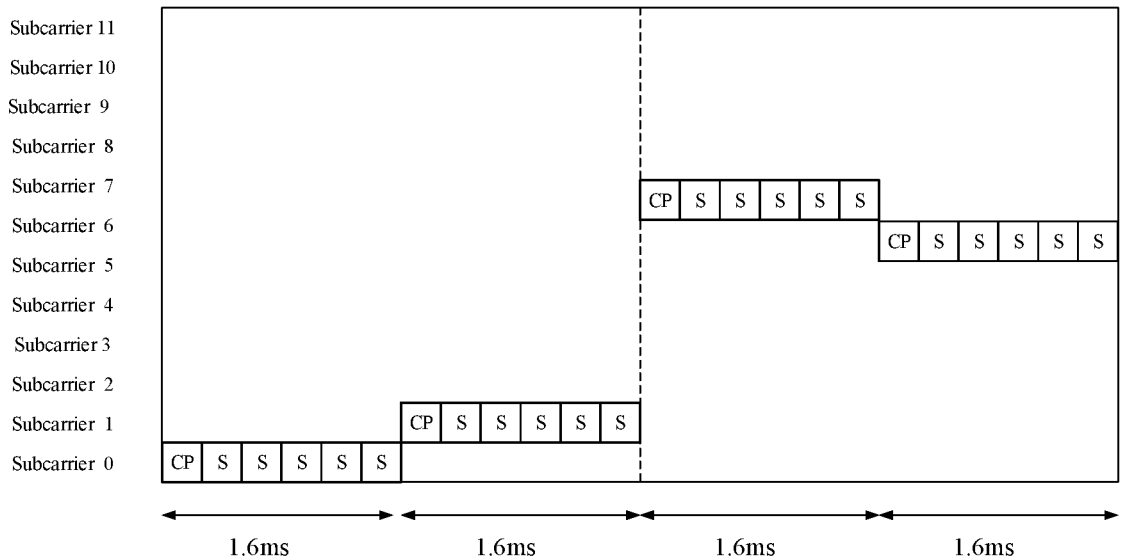
FIG. 48 is diagram 7 showing a structure of transmission of preamble elementary units according to an embodiment of the present disclosure.

In the NB-IoT system, the uplink system bandwidth is 180 kHz. As shown in FIG. 48, in this embodiment, the uplink bandwidth occupied by a random access channel (PRACH) configured by the base station is 45 kHz, a PRACH sub-carrier spacing Δf is 3.75 kHz, and a total of 12 PRACH sub-carriers are configured, i.e., Subcarrier0~Subcarrier11.

$Group_1$~$Group_4$ are defined as elementary units that form a random access signal (Preamble). $Group_1$~$Group_4$ are transmitted over different sub-carriers Each Group includes one cyclic prefix (CP) and five Preamble symbols, and one Preamble symbol has a time-domain symbol length of $$T_k = \frac{1}{\Delta f} = 0.2667 \text{ ms.}$$

When CP has a length of 0.2667 ms, each Group has a length of 0.2667+0.2667*5=1.6 ms, and Unit has a length of 1.6*4=6.4 ms.

When CP has a length of 0.0667 ms, each Group has a length of 0.0667+0.2667*5=1.4 ms, and Unit has a length of 1.4*4=5.6 ms.

In this embodiment, CP has a length of 0.2667 ms, and then Unit has a length of 6.4 ms.

Indices of sub-carriers corresponding to $Group_2$, $Group_3$ and $Group_4$ can be determined based on an index of a sub-carrier corresponding to $Group_1$. When a terminal selects Subcarrier0 for transmitting $Group_1$, $Group_2$ is transmitted over Subcarrier1, $Group_3$ is transmitted over Subcarrier7, and $Group_4$ is transmitted over Subcarrier6, as shown in FIG. 48.

A time length T_Unit1 of elementary units of a random access signal (Preamble) is 6.4 ms.

A random access signal (Preamble) transmitted in PRACH can have a transmission period of 1280 ms.

A start position offset of transmitting the preamble is 128 ms.

A number, R1, of repetitive transmissions of elementary units of transmitting the preamble is selected from {1, 2, 4, 8, 16, 32, 64, 128}. In this embodiment, R1=64.

Guard Time, GT1, for transmitting the preamble is 1.2 ms, i.e., GT1=1.2 ms.

In this embodiment, 64 repetitive transmissions of elementary units of transmitting the preamble have a total length of 409.6 ms.

Figure 49:
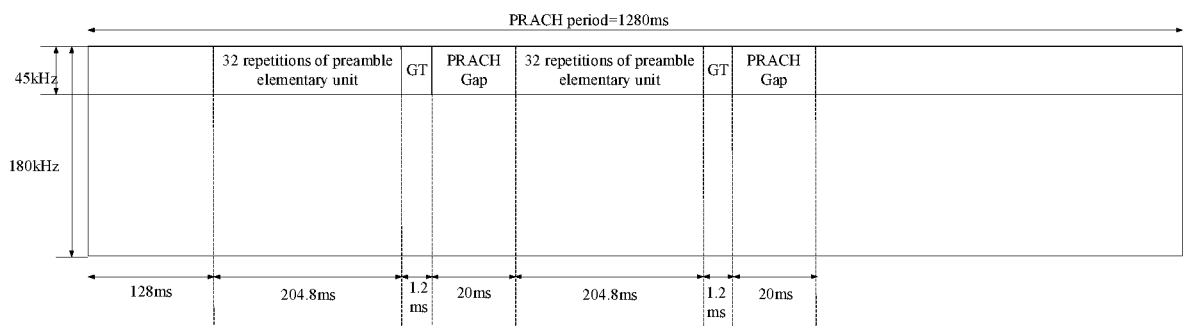
FIG. 49 is diagram 11 showing a structure of 64 repetitive transmissions of preamble elementary units according to an embodiment of the present disclosure.

When the number of repetitive transmissions of elementary units of transmitting the preamble is larger than R1set, after R1set transmissions of elementary units of Preamble are completed, it is needed to introduce a transmission gap, Gap1, for Preamble. During Gap1, Preamble is not transmitted. In this embodiment, R1set=32, Gap1=20 ms, and then a structure of the 64 repetitive transmissions of elementary units of Preamble is illustrated in FIG. 49. A time length, T_Length1, of the 64 repetitive transmissions of elementary units of Preamble can be calculated as the following formula:

$$T\_Length1 = \Sigma_{j=1}^{j=Num}(T\_Unit1 \times R1\_subset_j + GT1_j + Gap1_j),$$

where Num=R1/R1set=64/32=2;
R1_subset$_j$=R1set, where j=1~Num; and
Gap1$_j$=Gap1, where j=1~Num.

Figure 50:
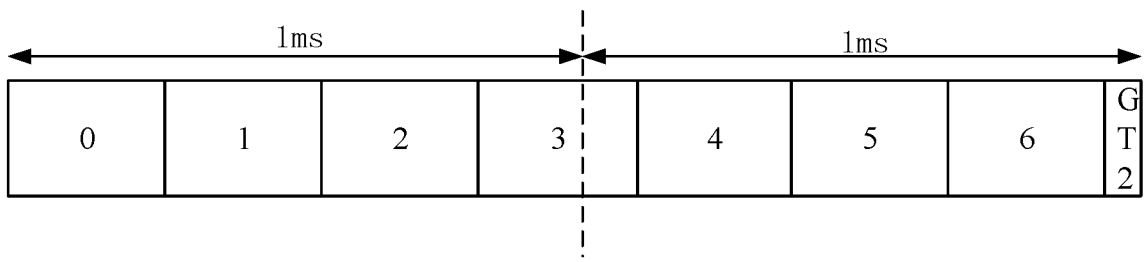
FIG. 50 is diagram 4 showing a slot structure according to an embodiment of the present disclosure.

When a time length of transmission of the uplink traffic channel (PUSCH) is larger than or equal to X slots, it is needed to introduce a transmission gap, Gap2, of PUSCH. Gap2 has a length of Y slots. During Gap2, PUSCH is not transmitted. When a sub-carrier spacing used by PUSCH is 3.75 kHz, a slot has a length of 2 ms. FIG. 50 shows a slot structure. As shown, one slot contains 7 symbols (symbol0-symbol6). In this embodiment, X=100 and Y=10.

The uplink traffic channel (PUSCH) configured for a terminal by the base station is transmitted by using a single sub-carrier. A sub-carrier spacing is 3.75 kHz.

The uplink traffic channel (PUSCH) configured for a terminal by the base station is transmitted can occupy one resource unit (RU). Each RU has a size of one sub-carrier*32 ms. That is, a time-domain length of RU is 16slots. In this embodiment, PUSCH requires 8repetitive transmissions, that is, a time-domain length of PUSCH transmission is 16*8=128slots.

Figure 51:
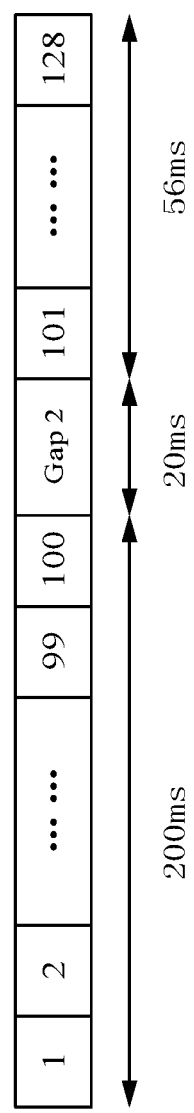
FIG. 51 is diagram 4 showing a structure of transmission of PUSCH according to an embodiment of the present disclosure.

In this embodiment, since the time-domain length of PUSCH transmission is larger than X=100slots, it is needed to introduce a transmission gap, Gap2, of PUSCH. Gap2 has a length of Y=10slots. FIG. 51 shows a structure of PUSCH transmission.

Figure 52:
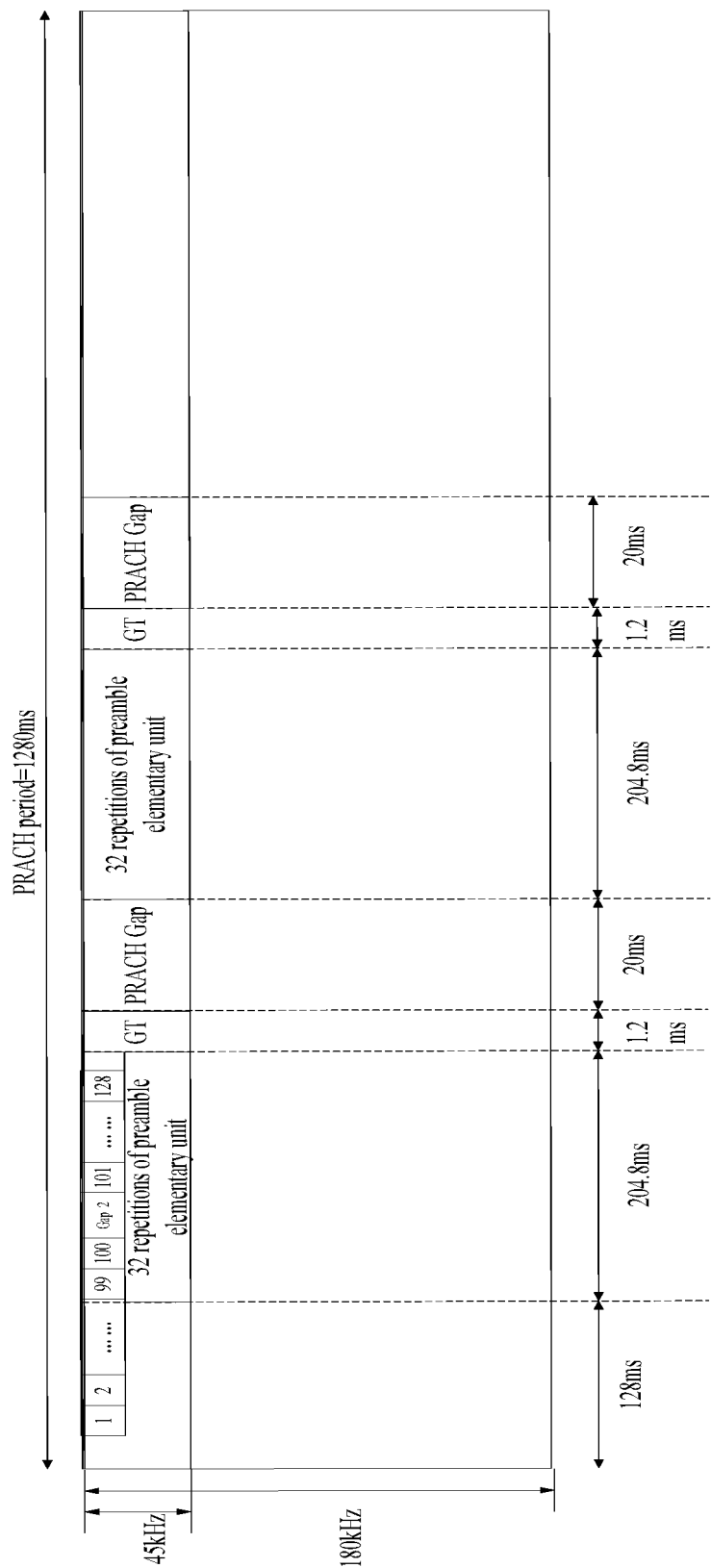
FIG. 52 is diagram 4 showing resources occupied by PUSCH and PARCH transmissions according to an embodiment of the present disclosure.

In this embodiment, resources occupied by PUSCH and PARCH transmissions are illustrated in FIG. 52.

Figure 53:
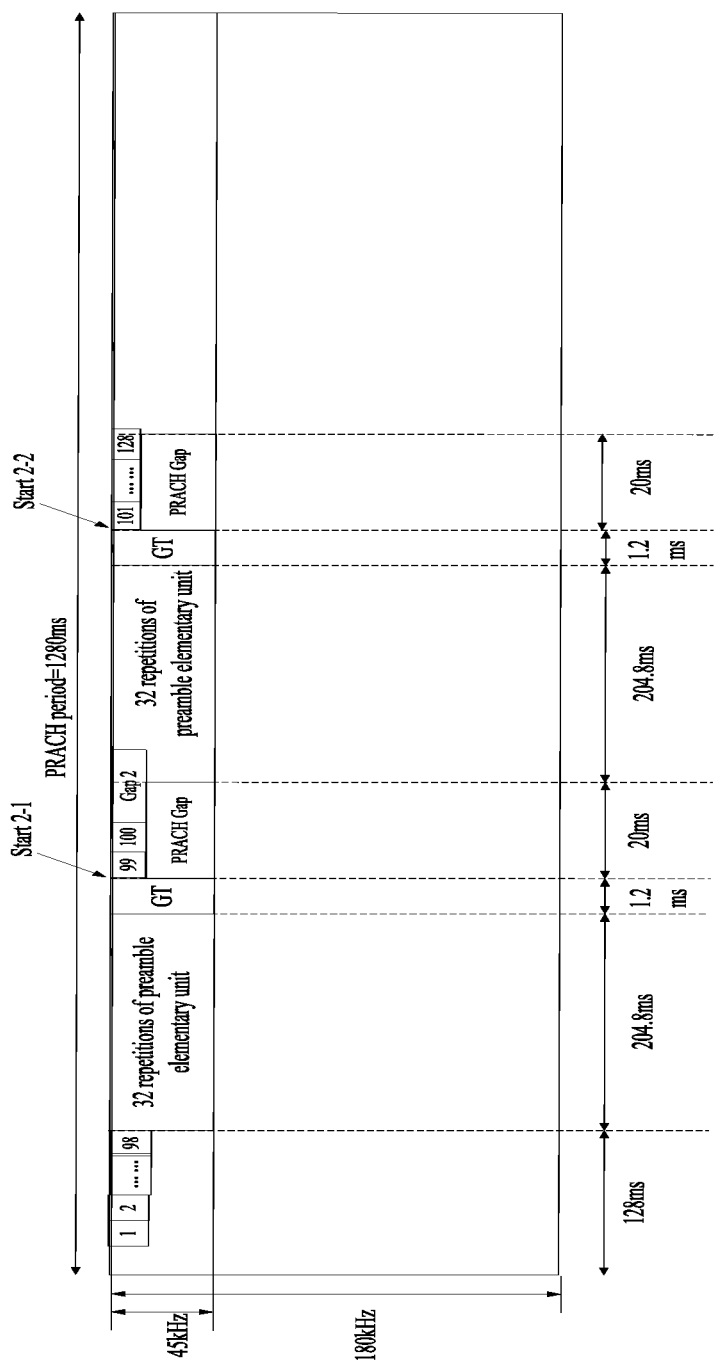
FIG. 53 is diagram 9 showing postponed PUSCH transmission according to an embodiment of the present disclosure.

Since slot99-slot128 in the resources for PUSCH and resources for PRACH overlap, it is needed to postpone transmission of slot99-slot128. FIG. 53 shows the postponed PUSCH transmission. The start time of the postponed transmission of slot99-slot128 is Start2-1, which is the start time of the first slot in the first PRACH gap after slot99, the start time of the first complete millisecond in the first PRACH gap after slot99, the start time of the first slot after the end time of the first GT after slot99, or the start time of the first complete millisecond after the end time of the first GT after slot99.

In this embodiment, only 2 slots, i.e., slot99 and slot100, can be transmitted in the first PRACH gap since Start2-1. Thus, the start time of the postponed transmission of slot101-slot128 is Start2-2, which is the start time of the first slot in the second PRACH gap after slot99, the start time of the first complete millisecond in the second PRACH gap after slot99, the start time of the first slot after the end time of the second GT after slot99, or the start time of the first complete millisecond after the end time of the second GT after slot99.

Embodiment 20

Figure 54:
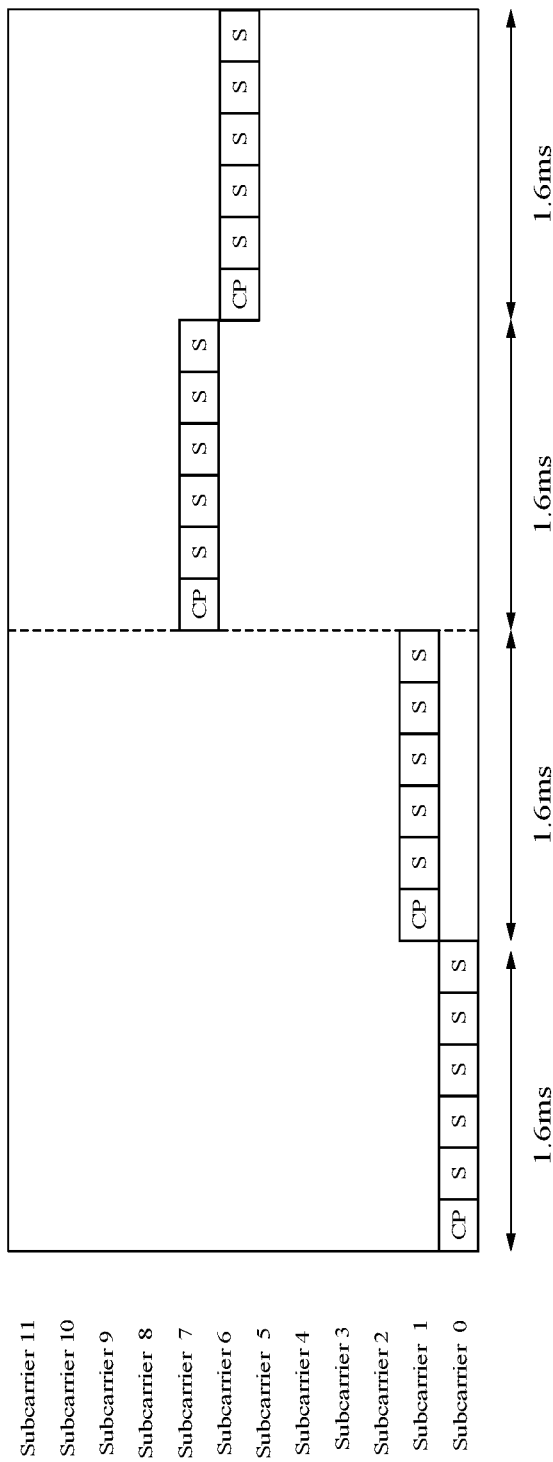
FIG. 54 is diagram 8 showing a structure of transmission of preamble elementary units according to an embodiment of the present disclosure.

In the NB-IoT system, the uplink system bandwidth is 180 kHz. As shown in FIG. 54, in this embodiment, the uplink bandwidth occupied by a random access channel (PRACH) configured by the base station is 45 kHz, a PRACH sub-carrier spacing Δf is 3.75 kHz, and a total of 12 PRACH sub-carriers are configured, i.e., Subcarrier0~Subcarrier11.

Group$_1$~Group$_4$ are defined as elementary units that form a random access signal (Preamble). Group$_1$~Group$_4$ are transmitted over different sub-carriers Each Group includes one cyclic prefix (CP) and five Preamble symbols, and one Preamble symbol has a time-domain symbol length of $$T_k = \frac{1}{\Delta f} = 0.2667 \text{ ms.}$$

When CP has a length of 0.2667 ms, each Group has a length of 0.2667+0.2667*5=1.6 ms, and Unit has a length of 1.6*4=6.4 ms.

When CP has a length of 0.0667 ms, each Group has a length of 0.0667+0.2667*5=1.4 ms, and Unit has a length of 1.4*4=5.6 ms.

In this embodiment, CP has a length of 0.2667 ms, and then Unit has a length of 6.4 ms.

Indices of sub-carriers corresponding to Group$_2$, Group$_3$ and Group$_4$ can be determined based on an index of a sub-carrier corresponding to Group$_1$. When a terminal selects Subcarrier0 for transmitting Group$_1$, Group$_2$ is transmitted over Subcarrier1, Group$_3$ is transmitted over Subcarrier7, and Group$_4$ is transmitted over Subcarrier6, as shown in FIG. 54.

A time length T_Unit1 of elementary units of a random access signal (Preamble) is 6.4 ms.

A random access signal (Preamble) transmitted in PRACH can have a transmission period of 1280 ms.

A start position offset of transmitting the preamble is 128 ms.

A number, R1, of repetitive transmissions of elementary units of transmitting the preamble is selected from {1, 2, 4, 8, 16, 32, 64, 128}. In this embodiment, R1=64.

Guard Time, GT1, for transmitting the preamble is 1.2 ms, i.e., GT1=1.2 ms.

In this embodiment, 64 repetitive transmissions of elementary units of transmitting the preamble have a total length of 409.6 ms.

Figure 55:
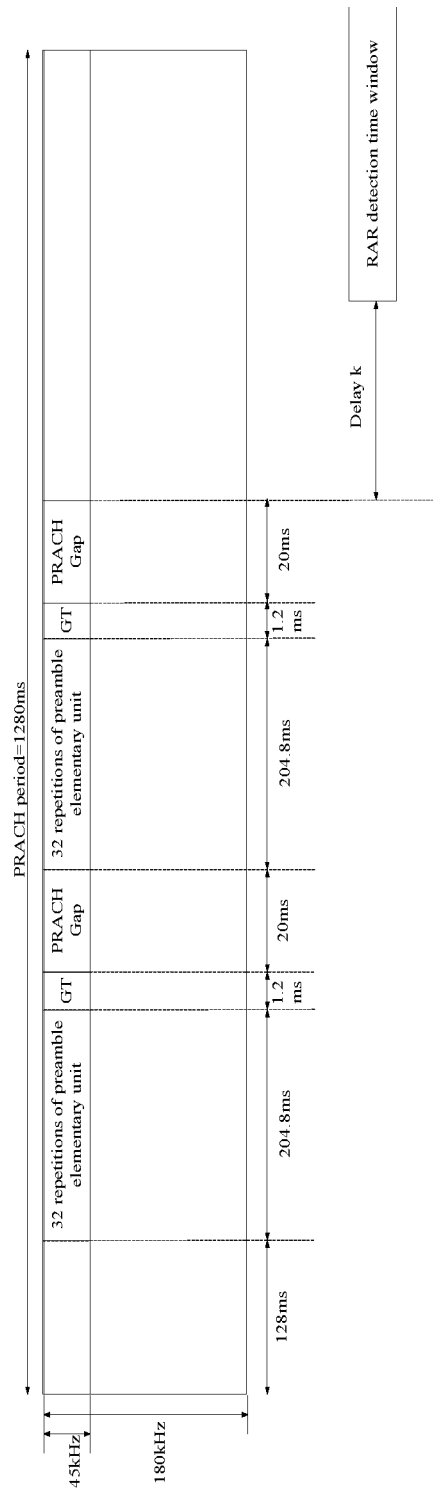
FIG. 55 is diagram 12 showing a structure of 64 repetitive transmissions of preamble elementary units according to an embodiment of the present disclosure.

When the number of repetitive transmissions of elementary units of transmitting the preamble is larger than R1set, after R1set transmissions of elementary units of Preamble are completed, it is needed to introduce a transmission gap, Gap1, for Preamble. During Gap1, Preamble is not transmitted. In this embodiment, R1set=32, Gap1=20 ms, and then a structure of the 64 repetitive transmissions of elementary units of Preamble is illustrated in FIG. 55. A time length, T_Length1, of the 64 repetitive transmissions of elementary units of Preamble can be calculated as the following formula:

$$T\_Length1 = \Sigma_{j=1}^{j=Num}(T\_Unit1 \times R1\_subset_j + GT1_j + Gap1_j),$$

where Num=R1/R1set=64/32=2;
R1_subset$_j$=R1set, where j=1~Num; and
Gap 1$_j$=Gap1, where j=1~Num.

In this embodiment, after the terminal has transmitted the random access signal over the random access channel, it will detect a Random Access Response (RAR) message, as shown in FIG. 55, where "RAR Detection Time Window" is the position at which the base station transmits the RAR message or control information for scheduling the RAR message. Here, there is a gap of k ms between the start position of the "RAR Detection Time Window" and the end position of the resources for PRACH. When the transmission gap 1 is configured at the end of the PRACH, the k ms refers to a gap between the start position of the "RAR Detection Time Window" and the transmission gap 1 configured at the end of the PRACH.

Embodiment 21

According to an embodiment of the present disclosure, a storage medium is also provided. The storage medium is configured to store program code for performing the following steps of: performing, when resources for a first type of channel allocated to a first terminal and resources for a second type of channel allocated to a second terminal satisfy a specified condition, a postpone process on a time-domain position at which a first resource among the resources for the second type of channel is located.

Alternatively, in the present embodiment, the above-described storage medium can include, but not limited to, a USB disk, a Read-Only Memory (ROM), a Random Access Memory (RAM), a mobile hard disk, a magnetic Disc or CD-ROM and other media that can store program code.

Optionally, in the present embodiment, the processor executes the method steps of the above embodiments in accordance with the program code stored in the storage medium.

It will be apparent to those skilled in the art that the above-described modules or steps of the present disclosure can be implemented by means of a general purpose computing device, and can be placed at a single computing device or distributed over a network of multiple computing devices. Optionally, they can be implemented by means of program code executable by the computing device, so that they can be stored in a storage device and executed by a computing device, and in some cases, they can be performed in a different order from the steps shown or described here, or they can be made separately into individual integrated circuit modules, or can be implemented by making multiple modules or steps therein into a single integrated circuit module. Thus, the present disclosure is not limited to any particular hardware, software, and the combination thereof.

The foregoing is merely illustrative of the preferred embodiments of the present disclosure and is not intended to limit the present disclosure. Various changes and modifications can be made by those skilled in the art. Any modifications, equivalent substitutions, improvements, and the like within the spirit and principles of the disclosure are intended to be included within the scope of the present disclosure.

INDUSTRIAL APPLICABILITY

According to an embodiment of the present disclosure, when resources for a first type of channel and resources for a second type of channel of different terminals satisfy a specified condition, a postpone process is performed on a time-domain position at which a first resource among the resources for the second type of channel is located. This can avoid performing simultaneous processing on resources configured for different terminals. In this way, the problem associated with avoiding collision occurred between channel resources configured for different terminals in the related art can be solved, thereby avoiding collisions of channel resources and improving the communication efficiency.

What is claimed is:

1. A method for resource configuration, comprising:
   determining, based on one or more configured resources on the PRACH, that resource elements for a transmission on a narrowband Physical Uplink Shared Channel (PUSCH) include a resource element that overlaps with the one or more configured resources on the PRACH;
   performing, according to the determining, a mapping of resource elements for the transmission on the narrowband PUSCH, wherein a portion of the transmission on the narrowband PUSCH is postponed until a unit in time domain not overlapping with the one or more configured resources on the PRACH; and
   inserting, when a length of the transmission on the narrowband PUSCH is equal to or greater than a predetermined threshold, a gap after the mapping of resource elements for the transmission on the narrowband PUSCH.

2. The method of claim 1, wherein the unit in time domain includes a first slot not overlapping with the one or more configured resources on the PRACH.

3. The method of claim 1, wherein the unit in time domain is an integer number of milliseconds after the one or more configured resources on the PRACH.

4. The method of claim 1, further comprising:
   inserting, when a length of the transmission on the PRACH is equal to or greater than a predetermined threshold, a gap after the one or more configured resources on the PRACH.

5. The method of claim 4, wherein the unit in time domain includes a first slot in the gap.

6. An apparatus for resource configuration, comprising:
   a processor configured to (1) determine, based on one or more configured resources on the PRACH, that resource elements for a transmission on a narrowband Physical Uplink Shared Channel (PUSCH) include a resource element that overlaps with the one or more configured resources on the PRACH; (2) perform a mapping of resource elements for the transmission on the narrowband PUSCH, wherein a portion of the transmission on the narrowband PUSCH is postponed until a unit in time domain not overlapping with the one or more configured resources on the PRACH; and (3) insert, when a length of the transmission on the narrowband PUSCH is equal to or greater than a predetermined threshold, a gap after the mapping of resource elements for the transmission on the narrowband PUSCH; and
   a transmitter configured to perform the transmission on the narrowband PUSCH.

7. The apparatus of claim 6, wherein the unit in time domain includes a first slot not overlapping with the one or more configured resources on the PRACH.

8. The apparatus of claim 6, wherein the unit in time domain is an integer number of milliseconds after the one or more configured resources on the PRACH.

9. The apparatus of claim 6, wherein the processor is further configured to insert, when a length of the transmission on the PRACH is equal to or greater than a predetermined threshold, a gap after the one or more configured resources on the PRACH.

10. The apparatus of claim 9, wherein the unit in time domain includes a first slot in the gap.

11. A non-transitory computer readable medium having code stored thereon, the code when executed by a processor, causing the processor to implement a method that comprises:
   determining, based on one or more configured resources on the PRACH, that resource elements for a transmission on a narrowband Physical Uplink Shared Channel (PUSCH) include a resource element that overlaps with the one or more configured resources on the PRACH;
   performing, according to the determining, a mapping of resource elements for the transmission on the narrowband PUSCH,
   wherein a portion of the transmission on the narrowband PUSCH is postponed until a unit in time domain not overlapping with the one or more configured resources mapped for the transmission on the PRACH; and
   inserting, when a length of the transmission on the narrowband PUSCH is equal to or greater than a predetermined threshold, a gap after the mapping of resource elements for the transmission on the narrowband PUSCH.

12. The non-transitory computer readable medium of claim 11, wherein the unit in time domain includes a first slot not overlapping with the one or more configured resources on the PRACH.

13. The non-transitory computer readable medium of claim 11, wherein the unit in time domain is an integer number of milliseconds after the one or more configured resources on the PRACH.

14. The non-transitory computer readable medium of claim 11, wherein the method further comprises:
   inserting, when a length of the transmission on the PRACH is equal to or greater than a predetermined threshold, a gap after the one or more resources on the PRACH.

15. The non-transitory computer readable medium of claim 14, wherein the unit in time domain includes a first slot in the gap.

* * * * *